(12) United States Patent
Deore et al.

(10) Patent No.: US 12,427,714 B2
(45) Date of Patent: Sep. 30, 2025

(54) FUNCTIONALIZED PRODUCT FABRICATED FROM A RESIN COMPRISING A FUNCTIONAL COMPONENT AND A POLYMERIC RESIN, AND METHOD OF MAKING THE SAME

(71) Applicant: NATIONAL RESEARCH COUNCIL OF CANADA, Ottawa (CA)

(72) Inventors: Bhavana Deore, Ottawa (CA); Chantal Paquet, Ottawa (CA); Patrick Roland Lucien Malenfant, Ottawa (CA); Thomas Lacelle, Ottawa (CA); Stephane Denommee, Gatineau (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 382 days.

(21) Appl. No.: 17/285,555

(22) PCT Filed: Oct. 18, 2019

(86) PCT No.: PCT/IB2019/058923
§ 371 (c)(1),
(2) Date: Apr. 15, 2021

(87) PCT Pub. No.: WO2020/079669
PCT Pub. Date: Apr. 23, 2020

(65) Prior Publication Data
US 2022/0040914 A1 Feb. 10, 2022

Related U.S. Application Data

(60) Provisional application No. 62/895,218, filed on Sep. 3, 2019, provisional application No. 62/747,757, filed on Oct. 19, 2018.

(51) Int. Cl.
*B29C 64/124* (2017.01)
*B22F 10/12* (2021.01)
(Continued)

(52) U.S. Cl.
CPC ............ *B29C 64/124* (2017.08); *B33Y 40/20* (2020.01); *B33Y 70/00* (2014.12); *B33Y 70/10* (2020.01);
(Continued)

(58) Field of Classification Search
CPC ..... B29C 64/10; B29C 64/124; B29C 64/386; B22F 10/12; B22F 3/10; B33Y 40/20; B33Y 70/00; B33Y 1080/00
See application file for complete search history.

(56) References Cited

U.S. PATENT DOCUMENTS 7,463,214 B2    12/2008   Winsor et al.
9,316,341 B2 *   4/2016   Kusinski ................. C22C 38/26
(Continued)

FOREIGN PATENT DOCUMENTS

CA        2915409 A1    12/2014
CN        108274738 B    7/2018
(Continued)

OTHER PUBLICATIONS

Balouiri, M. et al., Methods for In Vitro Evaluating Antimicrobial Activity: A Review, Journal of Pharmaceutical Analysis, (2016), vol. 6, pp. 71-79.
(Continued)

*Primary Examiner* — Nahida Sultana
(74) *Attorney, Agent, or Firm* — Aird & McBurney LP

(57) ABSTRACT

Functional and/or functional precursor products, formulations for making the products, methods of making the products (e.g. functional coatings, concentrated gradients, and/or composites), and uses thereof are provided. In an aspect, a method for making a product is provided, the method comprising: a) combining at least one first component and at least one polymerizable component to form a composition; and b) polymerizing the at least one polymer-
(Continued)

izable component to form at least one polymer, wherein at least two phases are formed from the at least one first component and the at least one polymer. The at least one first component comprises at least one functional component, at least one functional precursor component, or combinations thereof, and the product is a functional product, a functional precursor product, or a combination of a functional and functional precursor product.

17 Claims, 17 Drawing Sheets

(51) Int. Cl.
```
B29K 33/00      (2006.01)
B33Y 10/00      (2015.01)
B33Y 40/20      (2020.01)
B33Y 70/00      (2020.01)
B33Y 70/10      (2020.01)
B33Y 80/00      (2015.01)
C08F 220/18     (2006.01)
C08F 220/22     (2006.01)
C08F 220/32     (2006.01)
C08K 5/56       (2006.01)
```

(52) U.S. Cl.
CPC ........ *B33Y 80/00* (2014.12); *C08F 220/1802* (2020.02); *C08F 220/22* (2013.01); *C08F 220/325* (2020.02); *C08K 5/56* (2013.01); *B22F 10/12* (2021.01); *B29K 2033/08* (2013.01); *B33Y 10/00* (2014.12)

(56) References Cited

U.S. PATENT DOCUMENTS

| | | | |
|---|---|---|---|
| 9,469,773 B2 | 10/2016 | Walker et al. | |
| 9,644,107 B2 | 5/2017 | Williams | |
| 9,771,490 B2 | 9/2017 | Weber et al. | |
| 9,859,624 B2 | 1/2018 | Roan et al. | |
| 9,882,271 B2 | 1/2018 | Lam et al. | |
| 9,944,021 B2 | 4/2018 | Easter et al. | |
| 11,874,070 B2 * | 1/2024 | Abu Al-Rub | F28D 7/08 |
| 2005/0012247 A1 * | 1/2005 | Kramer | B33Y 10/00 264/401 |
| 2005/0049739 A1 * | 3/2005 | Kramer | B33Y 10/00 700/198 |
| 2009/0025638 A1 * | 1/2009 | Inoue | A61C 13/0013 118/712 |
| 2011/0263446 A1 * | 10/2011 | Le Foll | B01J 20/268 530/344 |
| 2014/0265049 A1 | 9/2014 | Burris et al. | |
| 2015/0201499 A1 | 7/2015 | Shinar et al. | |
| 2015/0366073 A1 | 12/2015 | Magdassi et al. | |
| 2016/0263823 A1 | 9/2016 | Espiau et al. | |
| 2016/0304402 A1 | 10/2016 | Kriven et al. | |
| 2017/0253751 A1 | 9/2017 | Busbee et al. | |
| 2017/0253781 A1 * | 9/2017 | Kashio | C09J 11/04 |
| 2017/0321037 A1 | 11/2017 | Mason et al. | |
| 2018/0088462 A1 | 3/2018 | Vyatskikh et al. | |
| 2018/0143147 A1 | 5/2018 | Milner et al. | |
| 2018/0217411 A1 | 8/2018 | Karlsen et al. | |
| 2018/0321659 A1 | 11/2018 | Dasappa et al. | |
| 2018/0345374 A1 | 12/2018 | Snis | |
| 2018/0356642 A1 | 12/2018 | Leger et al. | |
| 2019/0033719 A1 * | 1/2019 | Cole | G03F 7/2004 |
| 2019/0110366 A1 | 4/2019 | Gavagnin et al. | |
| 2019/0160739 A1 * | 5/2019 | Olson | C08L 35/02 |
| 2019/0168445 A1 | 6/2019 | Jara Rodelgo et al. | |
| 2019/0210278 A1 | 7/2019 | Hikmet et al. | |
| 2019/0232551 A1 | 8/2019 | Van Zak et al. | |
| 2019/0257943 A1 | 8/2019 | Beers | |
| 2019/0277475 A1 | 9/2019 | Hikmet et al. | |
| 2019/0305435 A1 | 10/2019 | Robinson et al. | |
| 2020/0254542 A1 * | 8/2020 | Huang | B21D 19/005 |
| 2022/0334291 A1 * | 10/2022 | Deore | G02B 1/04 |

FOREIGN PATENT DOCUMENTS

| | | | | |
|---|---|---|---|---|
| EP | 2952072 A1 | 8/2014 | | |
| KR | 101690871 B1 | 11/2015 | | |
| KR | 101837652 B1 | 7/2017 | | |
| RU | 2641134 C1 | 1/2018 | | |
| WO | WO-2004074328 A1 * | 9/2004 | | C08F 2/50 |
| WO | 2011/018783 A2 | 2/2011 | | |
| WO | 2016/145309 A1 | 9/2016 | | |
| WO | WO-2018130827 A1 * | 7/2018 | | B29C 64/30 |
| WO | 2018/194583 A1 | 10/2018 | | |

OTHER PUBLICATIONS

Belkhair, S. et al., Silver Zeolite-Loaded Silicone Elastomers: A Multidisciplinary Approach to Synthesis and Antimicrobial Assessment, RSC Adv., (2015) vol. 5, pp. 40932-40939.

Cooperstein, I. et al., 3D Printing of Porous Structures by UV-Curable O/W Emulsion for Fabrication of Conductive Objects, J. Mater Chem. C., (2015), vol. 3, pp. 2040-2044.

Fantino, E. et al., 3D Printing of Conductive Complex Structures with in Situ Generation of Silver Nanoparticles, Adv. Mater., (2016), vol. 28, pp. 3712-3717.

Fantino, E. et al., In Situ Thermal Generation of Silver Nanoparticles in 3D Printed Polymeric Structures, Materials, (2016), vol. 9, No. 589.

Hernandez-Serrano, A. I. et al., Fabrication of Gradient-Refractive-Index Lenses for Terahertz Applications by Three-Dimensional Printing, Journal of the Optical Society of America B, (2016), vol. 33, pp. 928-931.

Isakov, D. et al., 3D-Printed High Dielectric Contrast Gradient Index Flat Lens for a Directive Antenna with Reduced Dimensions, Adv. Mater, Technol., (2016), vol. 1, 1600072.

Kim, T. Y. et al., Fabrication of Thermally Stable Silver-Organic Complex (TS-SOC) Based Conductible Filament Materials for 3D Printing, Adv. Mater. Technol., (2017), vol. 2, 1700079.

Patel, D. et al., Highly Stretchable and UV Curable Elastomers for Digital Light Processing Based 3D Printing, Adv. Mater. (2017), vol. 29, 1606000.

Sciancalepore, C. et al., Acrylate-Based Silver Nanocomposite by Simultaneous Polymerization-Reduction Approach via 3D Stereolithograpy, Composites Communications, (2017), vol. 6, pp. 11-16.

Valentine, A. D. et al., Hybrid 3D Printing of Soft Electronics, Adv. Mater, (2017), vol. 29, 1703817.

Vyatskikh, A. et al., Additive Manufacturing of 3D Nano-Architected Metals, Nat Communications, (2018), vol. 9, No. 593.

Xin, H. et al., 3D Printed Microwave and THz Devices Using Polymer Jetting Techniques, Proceedings of the IEEE, (2017), vol. 105, pp. 737-755.

Zaier, M. et al., Generating Highly Reflective and Conductive Metal Layers Through a Light-Assisted Synthesis and Assembling of Silver Nanoparticles in a Polymer Matrix, Scientific Reports, (2017), vol. 7, No. 12410.

Extended European search report dated Jun. 17, 2022, including the Supplementary European Search Report, issued for corresponding EP Application No. 19873531.8.

Vyatskikh, A. et al., Additive Manufacturing of 3D Nano-Architected Metals, Nature Communications, (2018), vol. 9, No. 593, pp. 1-8.

Zaier, M. et al., Generating Highly Reflective and Conductive Metal Layers Through a Light-Assisted Synthesis and Assembling of Silver Nanoparticles in a Polymer Matrix, Scientific Reports, (2017), vol. 7, No. 12410, pp. 1-10.

Office Action dated Aug. 10, 2023 issued in corresponding TW Application No. 108137911, including English translation.

Office Action dated Nov. 21, 2023 issued in corresponding CA Application No. 3116845.

(56) References Cited

OTHER PUBLICATIONS

Office Action dated May 13, 2024 issued in corresponding TW Application No. 108137911, including English translation.
Office Action dated Jan. 17, 2025 issued in corresponding CA Application No. 3116845.
Taormina et al., " Special Resins for Stereolithography: In Situ Generation of Silver Nanoparticles". Polymers, 10(2), 212., Feb. 22, 2018 (Feb. 22, 2018), pp. 1-14. DOI: https://doi.org/10.3390/polym10020212. < https://www.mdpi.com/2073-4360/10/2/212>.
Schmidleithner et al.: "Stereolithography". 3D Printing., Oct. 10, 2018 (Oct. 10, 2018), pp. 1-10. DOI: 10.5772/intechopen.78147. <https://www.researchgate.net/publication/328192100_Stereolithography>.
Taormina et al., " 3D printing processes for photocurable polymeric materials: technologies, materials, and future trends". Journal of Applied Biomaterials & Functional Materials, vol. 16(3), 151-160. Apr. 2, 2018 (Feb. 4, 2018). DOI: 10.1177/2280800018764770. <https://journals.sagepub.com/doi/full/10.1177/2280800018764770>.
Deore, B. et al., Formulation of Screen-Printable Cu Molecular Ink for Conductive/Flexible/Solderable Cu Traces, ACS Appl. Mater. Interfaces, (2019), vol. 11, pp. 38880-38894.
Kell, A.J. et al., Versatile Molecular Silver Ink Platform for Printed Flexible Electronics, ACS Appl. Mater. Interfaces, (2017), vol. 9, pp. 17226-17237.
Lefebvre J. et al., High-Purity Semiconducting Single-Walled Carbon Nanotubes: A Key Enabling Material in Emerging Electronics, Acc. Chem. Res., (2017), vol. 50, pp. 2479-2486.
Li, A et al., Decomposable s-Tetrazine Copolymer Enables Single-Walled Carbon Nanotube Thin Film Transistors and Sensors with Improved Sensitivity, Advanced Functional Materials, (2018), vol. 28, No. 1705568, pp. 1-8.
Lopinski, G. et al., Cyanoethylated Pullulan as a High-k Solution Processable Polymer Gate Dielectric for SWCNT TFTs, Organic Electronics 42, (2017), pp. 329-336.
Ouyang, J. et al., Sorting of Semiconducting Single-Walled Carbon Nanotubes in Polar Solvents with an Amphiphilic Conjugated Polymer Provides General Guidelines for Enrichment, ACS Nano, (2018), vol. 12, pp. 1910-1919.
Paquet, C., et al., Pyridine-Copper(II) Formates for the Generation of High Conductivity Copper Films at Low Temperatures, Chem. Commun., (2016), vol. 52, pp. 2605-2608.
Paquet, C. et al., The Role of Amine Ligands in Governing Film Morphology and Electrical Properties of Copper Films Derived from Copper Formate-Based Molecular Inks, Nanoscale, (2018), vol. 10, pp. 6911-6921.
Wang, X. et al., 3DPrinting of Polymer Matrix Composites: A Review and Prospective; Composites Part B, (2017) vol. 110, pp. 442-458.
Halil, L., et al., Highly Oriented Carbon Fiber-Polymer Composites Via Additive Manufacturing, Composites Science and Technology, (2014) vol. 105, pp. 144-150.
Safka, J. et al., Use of Composite Materials for FDM 3D Print Technology, Materials Science Forum, (2016), vol. 862, pp. 174-181.
Xia, B. et al., Fiber Encapsulation Additive Manufacturing: Materials for Electrical Junction Fabrication, Solid Freeform Fabrication: Proceedings of the 27th Annual International Solid Freeform Fabrication Symposium—An Additive Manufacturing Conference, (2016) pp. 1345-1358.
European Examination Report dated Jul. 17, 2025 issued for corresponding EP Application No. 19873531.8.

\* cited by examiner

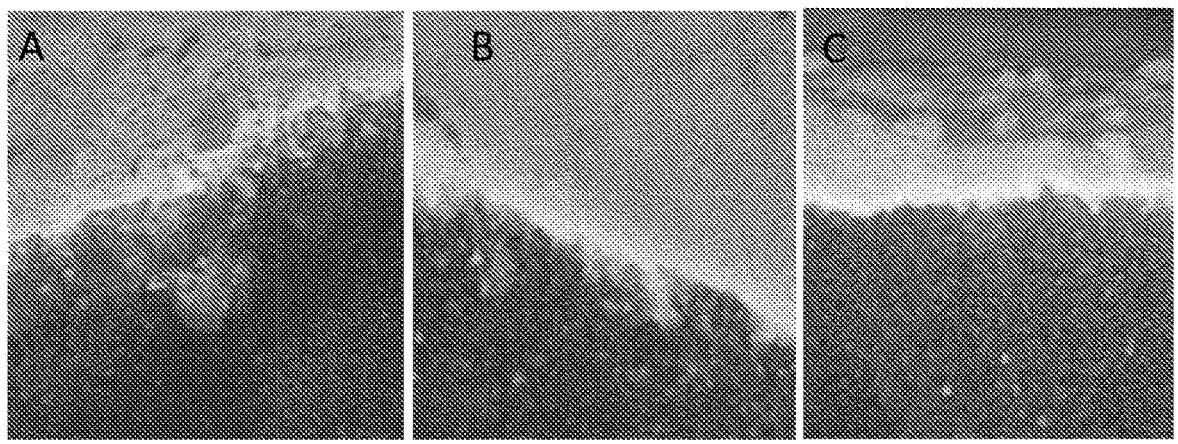
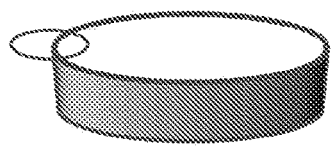
Figures 3A-3D

FUNCTIONALIZED PRODUCT FABRICATED FROM A RESIN COMPRISING A FUNCTIONAL COMPONENT AND A POLYMERIC RESIN, AND METHOD OF MAKING THE SAME

RELATED APPLICATIONS

The present application is a U.S. National Stage filing under 35 U.S.C. § 371 of International Application No. PCT/IB2019/058923 filed 18 Oct. 2019, which claims priority to U.S. Provisional Application No. 62/747,757 filed 19 Oct. 2018 and U.S. Provisional Application No. 62/895,218 filed 3 Sep. 2019, the contents of which are incorporated herein by reference in their entireties.

FIELD

The disclosure relates to functional and/or functional precursor products, formulations for making the products, methods of making the products, and uses thereof.

BACKGROUND

Functional products are products that perform at least one function. In the traditional sense, it would encompass a product that has, for example, one or more chemical, mechanical, magnetic, thermal, electrical, optical, electrochemical, protective, and catalytic properties. It could also, or instead, include a product that has an aesthetically pleasing property.

3D printing is an emerging technology poised to transform manufacturing of functional products. A challenge faced with 3D printing, in general, is the availability of feedstock materials, particularly for functional products. Stereolithographic (SLA) printing is one of a number of 3D printing techniques that faces this problem. The bulk of the feedstock materials are based on polymer resins and as a result the technique is limited to generating products with basic function (e.g. structural). New formulations that incorporate functionality would allow a 3D printing technique to generate structural components with specific functions (e.g. electrical conduction).

At present, most methods use multi-steps and lengthy processes to generate, for example, conductive 3D printed structures. For instance, 3D printed elastomeric structures were formed by digital light processing (DLP), once printed and processed, the structure is subsequently immersed in a solution of silver nanoparticles and exposed to hydrogen chloride vapors. (Magdassi, S. et al., *Highly Stretchable and UV Curable Elastomers for Digital Light Processing Based 3D Printing*, Adv. Mater. 2017, 29, 1606000).

A polymer based ink was developed that prints a porous structure. The porous structure was put under vacuum and dipped in a dispersion of silver nanoparticles. The structure was then sintered. (Magdassi, S. et al., *3D Printing of Porous Structures by UV-curable O/W Emulsion for Fabrication of Conductive Objects*, J. Mater Chem. C. 2015, 3, 2040).

The drawbacks of available 3D printing feedstock materials (e.g. resin or filament) is that the materials require multiple and lengthy steps post-printing to generate, for example, a functional 3D structure.

The background herein is included solely to explain the context of the disclosure. This is not to be taken as an admission that any of the material referred to was published, known, or part of the common general knowledge as of the priority date.

SUMMARY

In accordance with an aspect, there is provided a method for making a product, the method comprising: a) combining at least one first component and at least one polymerizable component to form a composition; and b) polymerizing the at least one polymerizable component to form at least one polymer, wherein at least two phases are formed from the at least one first component and the at least one polymer, wherein the at least one first component comprises at least one functional component, at least one functional precursor component, or combinations thereof, and wherein the product is a functional product, a functional precursor product, or a combination of a functional and functional precursor product.

In aspects of the method described herein, wherein the polymerizing in b) comprises photopolymerization. In another aspect, wherein the composition further comprises at least one photoinitiator. In another aspect, wherein the polymerizing in b) is achieved via 3D printing. In another aspect, wherein the 3D printing uses photoactivation. In another aspect, wherein the 3D printing is vat polymerization. In another aspect, wherein the 3D printing is stereolithographic (SLA) printing, digital light processing (DLP) or volumetric 3D printing. In another aspect, wherein the composition is substantially homogeneous. In another aspect, wherein the composition is a substantially homogeneous mixture. In another aspect, further comprising c) sintering and/or pyrolyzing. In another aspect, wherein the at least one first component comprises the at least one functional precursor component, the method further comprising c) converting the at least one functional precursor component into at least one second functional component. In another aspect, wherein the at least one second functional component is different from the at least one functional component. In another aspect, wherein the converting comprises sintering and/or pyrolyzing. In another aspect, wherein, upon polymerization, the at least one first component phase separates and migrates towards an area where the concentration of the at least one polymerizable component is greater. In another aspect, wherein the at least two phases is two phases. In another aspect, wherein the two phases comprises a first phase and a second phase, wherein the first phase comprises the at least one polymer and the second phase comprises the at least one first component. In another aspect, wherein the at least two phases further comprises an interface between the first phase and the second phase, wherein the interface has a concentration gradient of the at least one first component, whereby the concentration of the at least one first component decreases with distance away from the second phase towards the first phase. In another aspect, wherein each of the phases comprise concentration gradients, composites, and/or coatings. In another aspect, wherein at least one of the phases is a coating. In another aspect, wherein the at least two phases is a concentration gradient. In another aspect, wherein the at least two phases is a composite. In another aspect, wherein each of the phases is a discrete phase. In another aspect, wherein the at least one polymerizable component comprises at least one monomer and/or at least one oligomer. In another aspect, wherein the at least one monomer and/or at least one oligomer is selected from acrylates. In another aspect, wherein the at least one monomer and/or at least one oligomer is ethyleneglycol methyl ether acrylate, N,N-diisobutyl-acrylamide, N-vinyl-pyrrolidone, (meth)acryloyl morpholine, 7-amino-3,7-dimethyloctyl, (meth) acrylate, isobutoxymethyl (meth)acrylamide, isobornyloxyethyl (meth)acrylate, isobornyl (meth) acrylate, 2-ethylhexyl acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth) acrylate, N, N-dimethyl (meth)acrylamide tetrachlorophenyl (meth)acrylate, 2-tetrachlorophenoxyethyl (meth)acrylate, tetrahydrofurfuryl (meth)acrylate, tetrabromophenyl (meth) acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth) acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth) acrylate, alkoxylated alkyl phenol acrylate, (poly)caprolactone acrylate ester from methylol-tetrahydrofuran, (poly) caprolactone acrylate ester from alkylol-dioxane, ethylene glycol phenyl ether acrylate, and/or methacryloxypropyl terminated polydimethylsiloxane. In another aspect, wherein the at least one monomer and/or at least one oligomer is 2-ethylhexyl acrylate and/or ethyleneglycol methyl ether acrylate. In another aspect, wherein the at least one polymerizable component further comprises at least one cross-linking agent. In another aspect, wherein the at least one polymerizable component comprises at least one cross-linking agent. In another aspect, wherein the at least one polymerizable component comprises from about 10% to about 99% by weight of the at least one cross-linking agent based on the weight of the composition without the at least one first component, optionally, from about 15% to about 99% by weight of the at least one cross-linking agent based on the weight of the composition without the at least one first component. In another aspect, wherein the at least one polymerizable component comprises from about 1% to about 90% by weight of the at least one monomer and/or at least one oligomer and about 10% to about 99% by weight of the at least one cross-linking agent based on the weight of the composition without the at least one first component, optionally, from about 1% to about 85% by weight of the at least one monomer and/or at least one oligomer and about 15% to about 99% by weight of the at least one cross-linking agent based on the weight of the composition without the at least one first component. In another aspect, wherein the at least one cross-linking agent is 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, diacrylic urethane oligomers (reaction products of isocyanate terminate polyol and 2-hydroethylacrylate), tris(2-hydroxyethyl)isocyanurate trimethacrylate, tris(2-hydroxyethyl)isocyanurate triacrylate, trimethylolpropane trimethacrylate, trimethylolpropane triacrylate, pentaerythritol triacrylate, pentaerythritol tetraacrylate, di(trimethylolpropane) tetraacrylate, ethoxylated pentaerythritol tetraacrylate, dipentaerythritol pentaacrylate, pentaacrylate ester, ethylene glycol di(meth) acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth)acrylate, EO modified trimethylolpropane tri(meth)acrylate, PO modified trimethylolpropane tri(meth)acrylate, tripropylene glycol di(meth) acrylate, neopentyl glycol di(meth)acrylate, both terminal (meth)acrylic acid adduct of bisphenol A diglycidyl ether, 1,4-butanediol di(meth)acrylate, 1,6-hexanediol di(meth) acrylate, pentaerythritol tri(meth)acrylate, pentaerythritol tetra(meth)acrylate, polyester di(meth)acrylate, polyethylene glycol di(meth)acrylate, dipentaerythritol hexa(meth) acrylate, dipentaerythritolpenta(meth)acrylate, dipentaerythritol tetra(meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, and/or triethylene glycol dithiol. In another aspect, wherein the at least one cross-linking agent is ethylene glycol diacrylate, polyethylene glycol diacrylate, tetraethyleneglycol diacrylate, butanediol diacrylate, hexanediol diacrylate, and/or di(trimethylolpropane) tetraacrylate. In another aspect, wherein the at least one cross-linking agent has two or more functional groups, optionally, di-, tri-, or tetra-functional groups. In another aspect, wherein the concentration of the at least one cross-linking agent and the rate at which the at least one monomer polymerizes is selected such that a product comprising a composite is formed. In another aspect, wherein the concentration of the at least one cross-linking agent is from about 80% to about 99% mol based on the mol of the composition. In another aspect, wherein the concentration of the at least one cross-linking agent and the rate at which the at least one monomer polymerizes is selected such that the at least one monomer and the at least one first component diffuse towards the surface of the product to form a product comprising a coating. In another aspect, wherein the concentration of the at least one crosslinking agent is less than about 35% mol based on the mol of the composition, wherein the concentration of the at least one crosslinking agent is about 10% to about 35% mol based on the mol of the composition, or wherein the concentration of the at least one crosslinking agent is about 15% to about 35% mol based on the mol of the composition. In another aspect, wherein the concentration of the at least one cross-linking agent and the rate at which the at least one monomer polymerizes is selected such that a product comprising a concentration gradient is formed. In another aspect, wherein the concentration of the at least one cross-linking agent is from about 35% to about 80% mol based on the mol of the composition. In another aspect, wherein the at least one polymerizable component comprises at least one resin, optionally, at least one acrylate based-resin. In another aspect, wherein the method is a 2D or 3D printing method. In another aspect, wherein the 3D printing is vat polymerization. In another aspect, wherein the 3D printing is stereolithographic (SLA) printing, digital light processing (DLP) or volumetric 3D printing. In another aspect, wherein the at least one polymer has a modulus range of about 0.1 MPa to about 8000 MPa. In another aspect, wherein the amount of the at least one polymerizable component is from about 10% to about 99% by weight based on the weight of the composition. In another aspect, wherein the at least one first component is substantially soluble in the at least one polymerizable component and is substantially insoluble when the at least one polymerizable component polymerizes. In another aspect, wherein the at least one first component comprises the at least one functional component and the product is the functional product. In another aspect, wherein the at least one first component comprises the at least one functional precursor component and the product is the functional precursor product. In another aspect, wherein the at least one first component comprises the at least one functional component and the at least one functional precursor component and the product is the combination of the functional and functional precursor product. In another aspect, wherein the at least one first component is selected from the group consisting of functional monomers, functional polymers, metal precursors, carbon nanotubes (CNT), graphene, metal alloy precursors, metalloid precursors, and combinations thereof. In another aspect, wherein the at least one first component comprises at least one functional monomer. In another aspect, wherein the at least one functional monomer has a hydrophobic property. In another aspect, wherein the at least one functional monomer is at least one fluorinated monomer. In another aspect, wherein the at least one fluorinated monomer comprises at least one fluorinated methacrylate. In another aspect, wherein the at least one first component comprises at least one functional polymer. In another aspect, wherein the at least one first component is selected from the group consisting of metal carboxylates, metalloid carboxylates, and combinations thereof. In another aspect, wherein the metal carboxylates comprise from 8 to 12 carbon atoms. In another aspect, wherein the carboxylate group of the metal carboxylates is an alkanoate. In another aspect, wherein the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof. In another aspect, wherein the metal is selected from a transition metal. In another aspect, wherein the metal is selected from the group consisting of aluminum, silver, gold, platinum, titanium, and copper In another aspect, wherein the at least one first component is selected from nanowires, microparticles, nanoparticles, or combinations thereof. In another aspect, wherein the at least one first component comprises graphene. In another aspect, wherein the amount of the at least one first component is from about 0.1% to about 20% by weight based on the weight of the composition. In another aspect, wherein the product is a 3D printable product. In another aspect, wherein the product has at least one functional property selected from chemical properties, mechanical properties, magnetic properties, optical properties, protective properties (e.g. heat, radiation, mechanical abrasion), electrical properties, electrochemical, catalytic properties, and/or combinations thereof. In another aspect, wherein the product is at least one of stretchable, flexible, lightweight, porous, conductive, non-conductive, surface durable, increased surface area, hydrophobic, biocompatible, antibacterial, mould resistant, wear-resistant, heat resistant, cold resistant, improved surface properties (antifouling), reduce flame retardancy, and combinations thereof. In another aspect, the composition further comprising at least one additive, optionally, selected from the group consisting of fillers, inhibitors, adhesion promoters, absorbers, dyes, pigments, anti-oxidants, carrier vehicles, heat stabilizers, flame retardants, thixotropic agents, flow control additives, dispersants, and/or combinations thereof, optionally, nanoparticles. In another aspect, wherein the product is an antenna.

In accordance with an aspect, there is provided a product made by the method described herein.

In accordance with an aspect, there is provided a product comprising: i) a first phase comprising at least one polymer; and ii) a second phase comprising at least one first component, wherein the at least one first component comprises at least one functional component, at least one functional precursor component, or combinations thereof, and wherein the product is a functional product, a functional precursor product, or a combination of a functional and functional precursor product.

In aspects of the product described herein, wherein the product further comprises iii) an interface between the first phase and the second phase, wherein the interface has a concentration gradient of the at least one first component, whereby the concentration of the at least one first component decreases with distance away from the second phase towards the first phase. In another aspect, wherein the product is a 2D or 3D printed product. In another aspect, wherein the 3D printed product was printed via stereolithographic (SLA) printing, digital light processing (DLP) or volumetric 3D printing. In another aspect, wherein the product has two phases. In another aspect, wherein each of the phases comprise concentration gradients, composites, and/or coatings, optionally, at least one of the phases is a coat. In another aspect, wherein at least one of the phases of the product is a coat. In another aspect, wherein the product is a concentration gradient. In another aspect, wherein the product is a composite. In another aspect, wherein each of the phases is a discrete phase. In another aspect, wherein the at least one polymer is formed from at least one resin, optionally, at least one acrylate based-resin. In another aspect, wherein the at least one polymer has a modulus range of about 0.1 MPa to about 8000 MPa. In another aspect, wherein the amount of the at least one polymer is from about 80% to about 99.9% by weight based on the weight of the product. In another aspect, wherein the at least one first component comprises the at least one functional component and the product is the functional product. In another aspect, wherein the at least one first component comprises the at least one functional precursor component and the product is the functional precursor product. In another aspect, wherein the at least one first component comprises the at least one functional component and the at least one functional precursor component and the product is the combination of the functional and functional precursor product. In another aspect, wherein the at least one first component is selected from the group consisting of functional monomers, functional polymers, metal precursors, carbon nanotubes (CNT), graphene, metal alloy precursors, metalloid precursors, and combinations thereof. In another aspect, wherein the at least one first component comprises at least one functional monomer. In another aspect, wherein the at least one functional monomer has a hydrophobic property. In another aspect, wherein the at least one functional monomer is at least one fluorinated monomer. In another aspect, wherein the at least one fluorinated monomer comprises at least one fluorinated methacrylate. In another aspect, wherein the at least one first component comprises at least one functional polymer. In another aspect, wherein the at least one first component is selected from the group consisting of metal carboxylates, metalloid carboxylates, and combinations thereof. In another aspect, wherein the metal carboxylates comprise from 8 to 12 carbon atoms. In another aspect, wherein the carboxylate group of the metal carboxylates is an alkanoate. In another aspect, wherein the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof. In another aspect, wherein the metal is selected from a transition metal. In another aspect, wherein the metal is selected from the group consisting of aluminum, silver, gold, platinum, titanium, and copper. In another aspect, wherein the at least one first component is selected from nanowires, microparticles, nanoparticles, or combinations thereof. In another aspect, wherein the at least one first component comprises graphene. In another aspect, wherein the amount of the at least one first component is from about 0.1% to about 20% by weight based on the weight of the composition. In another aspect, wherein the second phase is a coating. In another aspect, wherein the product has at least one functional property selected from chemical properties, mechanical properties, magnetic properties, optical properties, protective properties (e.g. towards heat, radiation, mechanical abrasion), properties, electrical properties, electrochemical, catalytic properties, and/or combinations thereof. In another aspect, wherein the product is an antenna.

In accordance with another aspect, there is provided a device comprising the product described herein. In accordance with a further aspect, there is provided a device comprising the product made by the method described herein. In accordance with an aspect, wherein the device is an electronic device. In another aspect, wherein the electronic device is selected from a conductor, a sensor, a strain sensor, a semiconductor, a thin film transistor, an electrode, photocell, circuit, and/or combinations thereof.

Formulations for making the product described herein are also described and the uses thereof.

It is understood that one or more of the aspects described herein (and above) may be combined in any suitable manner. It should be understood that the detailed description and the specific examples presented, while indicating certain aspects, are provided for illustration purposes only because various changes and modifications within the spirit and scope will become apparent to those of skill in the art from the detailed description and claims that follow.

BRIEF DESCRIPTION OF THE DRAWINGS

Embodiments of the present invention are described in detail below with reference to the Figures, wherein:

FIGS. 3A-3D shows scanning electron microscope (SEM) images of examples of 3D printed cylinders (FIGS. 3A-3C) and a perspective view (FIG. 3D) of where the SEM images were taken on the cylinders (see circle). The formulation used to make these cylinders is described in Example 4.

DETAILED DESCRIPTION OF CERTAIN ASPECTS

Definitions

Figure 1:
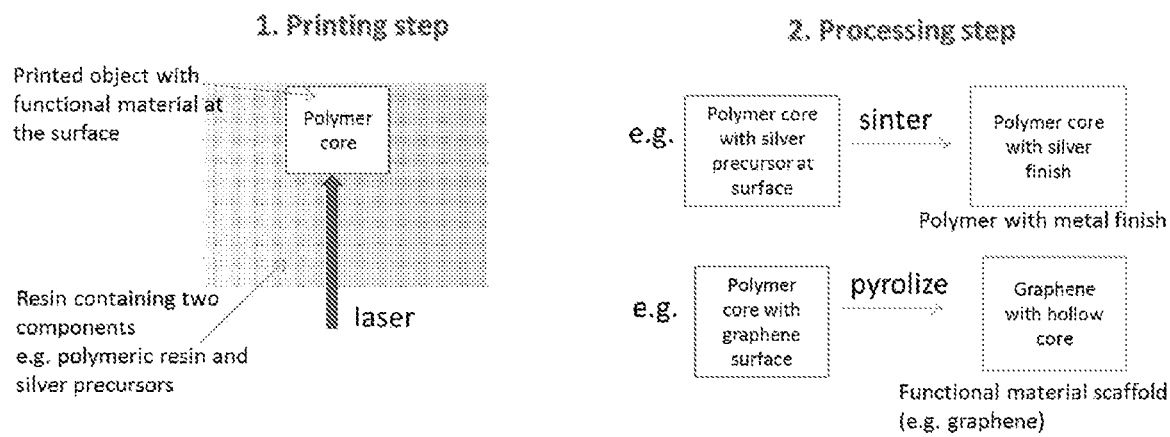
FIG. 1 shows a schematic of some embodiments of a method.

Unless otherwise explained, all technical and scientific terms used herein have the same meaning as commonly understood by one of ordinary skill in the art to which this disclosure belongs. Although any methods and materials similar or equivalent to those described herein can be used in the practice for testing of the present invention, the typical materials and methods are described herein. In describing and claiming the present invention, the following terminology will be used.

It is also to be understood that the terminology used herein is for the purpose of describing particular aspects only, and is not intended to be limiting. Patent applications, patents, and publications are cited herein to assist in understanding the aspects described. All such references cited herein are incorporated herein by reference in their entirety and for all purposes to the same extent as if each individual publication or patent or patent application was specifically and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "the" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. For example, a composition defined using the phrase "consisting essentially of" encompasses any known acceptable additive, excipient, diluent, carrier, and the like. Typically, a composition consisting essentially of a set of components will comprise less than 5% by weight, typically less than 3% by weight, more typically less than 1%, and even more typically less than 0.1% by weight of non-specified component(s).

It will be understood that any component defined herein as being included may be explicitly excluded from the claimed invention by way of proviso or negative limitation.

In addition, all ranges given herein include the end of the ranges and also any intermediate range points, whether explicitly stated or not.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The abbreviation, "e.g." is derived from the Latin exempli gratia, and is used herein to indicate a non-limiting example. Thus, the abbreviation "e.g." is synonymous with the term "for example." The word "or" is intended to include "and" unless the context clearly indicates otherwise.

The phrase "at least one of" is understood to be one or more. The phrase "at least one of . . . and . . . " is understood to mean at least one of the elements listed or a combination thereof, if not explicitly listed. For example, "at least one of A, B, and C" is understood to mean A alone or B alone or C alone or a combination of A and B or a combination of A and C or a combination of B and C or a combination of A, B, and C. "At least one of at least one of A, at least one of B, and at least one of C" is understood to mean at least one of A alone or at least one of B alone or at least one of C alone or a combination of at least one of A and at least one of B or a combination of at least one of A and at least one of C or a combination of at least one of B and at least one of C or a combination of at least one of A, at least one of B, and at least one of C.

The term "composition" is understood to mean having two or more components/elements.

The term "a substantially homogeneous mixture" is understood to mean a substantially uniform mixture or combination of components.

The term "morphology" is understood to mean a shape and size of an area or a volume (e.g. the texture or topography of a surface; the habit of a crystal; the distribution of phases in a material).

The term "phase" is interchangeably used herein with "morphology", "layer", "zone", and/or "structure". These terms are understood to mean a region of a functional product and/or a functional precursor product having an area or volume of material with relatively uniform chemical and/or physical properties. For example, one phase or region may have uniform chemical and/or physical properties and another phase or region may have different uniform chemical and/or physical properties. It is understood that a given phase or region having relatively uniform chemical and/or physical properties can, but does not necessarily require, homogeneity throughout the phase. An interface between phases may also constitute a distinct phase. For example, a phase may have a component present in amounts falling within a desired concentration range. Alternatively, there may be a variation in the degree of polymer cross-linking in a phase to provide a desired level of flexibility, rigidity or other property to a functional product. Phases may arise from printing using distinct formulations, in sequence, to produce distinct regions, or may arise out of polymerization processes designed to result in product component phase separation, or a concentration gradient. In this regard, phases may be characterized according to one or more chemical and/or physical properties having regard to one or more components in order to delineate between phases/regions of a functional product and/or a functional precursor product. A combination of one or more phases/regions may be considered a single concentration gradient. In the context of an intermediate or final product structure, there may be one or more phases.

The term "resin" is understood to be a solid or viscous material which provides a polymer after polymerization via, for example, curing.

The term "concentration gradient" is understood to be spatial positioning of one or more molecules/ions from a region having a higher concentration of the one or more molecules/ions to a region having a lower concentration of the one or more molecules/ions.

The term "functional product" is considered herein to be a product that performs at least one function. It may encompass a product that has, for example, one or more chemical, mechanical (including structural), magnetic, thermal, electrical, optical, electrochemical, protective, and catalytic properties. It could also, or instead, include a product that has an aesthetically pleasing property. Functional products can include a functional material such as a functionally graded material (FGM), and more specifically, a functionally graded composite material (FGCM). FGMs may be applied in a variety of industries, including, for example, aerospace, automobile, biomedical, defence, electrical/electronic, energy, marine, mining, opto-electronics, thermoelectronics, dentistry, and sports. FGMs may be used under a variety of conditions, including extreme temperature and wear conditions.

The term "interface", "functional interface" or "functional precursor interface" refers to a region or surface of a functional and/or functional precursor product, which can include a surface of an intermediate product in or comes into contact with another region/phase/material. For example, the interface may be a functional and/or functional precursor coating on the product (eg at an exterior surface) or as a layer/region within the product. The product may be an intermediate product, which is further processed (e.g. further layered/coated) such that the exterior surface now acts as an interface between the intermediate product and the additional layer/coating. In another example, the interface may be a graded functional and/or functional precursor material, the interface may be the region of the product where there is a certain concentration range of functional and/or functional precursor components to provide a function of the product. In a further example, the interface may be a functional and/or functional precursor composite material, the interface may be the region of the product where the composite provides a function of the product.

The term "particle" refers to a particle with any suitable size. In embodiments, the particle has an average particle size of about 10 nm to about 150 µm in diameter, for example, ranging from about 10 nm to about 100 µm; about 25 nm to about 100 µm; about 10 nm to about 50 µm; about 25 nm to about 50 µm; about 10 nm to about 25 µm; about 25 nm to about 25 µm; about 10 nm to about 10 µm; about 25 nm to about 10 µm; about 10 nm to about 5 µm; about 25 nm to about 5 µm; about 10 nm to about 2.5 µm; about 25 nm to about 2.5 µm; about 10 nm to about 500 nm; about 25 nm to about 500 nm; about 10 nm to about 250 nm; about 25 nm to about 250 nm; about 10 nm to about 100 nm; about 25 nm to about 100 nm; or about 50 nm to about 100 nm. The term "particle" as used herein thus includes "nanoparticle," which is considered herein to be a particle having a diameter less than about 1000 nm, and "microparticle," considered herein to be a particle having a diameter ranging from about 1 µm to about 1000 µm. In some embodiments, the particles described herein can be any shape, including generally spherical.

The term "coating" refers to a substantially homogenous layer (2D or 3D) or region within or on a product.

The term "functional coating" or "functional precursor coating" refers to a substantially homogenous layer (2D or 3D) or region of one or more functional and/or functional precursor components within or on a functional and/or functional precursor product. For example, the coating is a substantially homogenous layer (2D or 3D) of one or more functional and/or functional precursor components at or is an interface of the product. In another example, the coating of functional and/or functional precursor component(s) may be layered on a polymer (e.g. matrix or scaffold) but the coating (e.g. nanoparticles or a distinct polymer coating of functional and/or functional precursor components) itself is not per se distributed within (e.g. incorporated in) the polymer.

The term "graded" refers to the presence of a concentration gradient of one or more components. For example, a concentration gradient of one or more functional and/or functional precursor components, where the highest concentration of one or more of the functional and/or functional precursor components is at an interface of a product. In embodiments, the components of a concentration gradient are distributed within a polymer (e.g. matrix or scaffold) of the product and such non-homogenous graded functional and/or functional precursor material may exhibit changes in microstructures and/or composition through different regions of the product. The concentration gradient of a given component may change uniformly or change from shallow to steeper gradients (and vice-versa) through different regions of a product.

The term "composite" refers to a material made from two or more different components having different physical and/or chemical properties that, when combined, produce a material with characteristics different from the individual components themselves. The individual components remain as individual components within the product. For example, the functional and/or functional precursor products may have regions (e.g. functional and/or functional precursor interface) or phases of one or more functional and/or functional precursor components that are not phase separated from a polymer (e.g. matrix or scaffold), and that are not distributed in a polymer as a concentration gradient. In another example, the functional and/or functional precursor products may have regions (e.g. functional and/or functional precursor interface) or phases of one or more functional and/or functional precursor components at a functional interface that are not phase separated from a polymer (e.g. matrix or scaffold), and that are not distributed in a polymer as a concentration gradient. In certain embodiments, composite concentrations and distributions of functional and/or functional precursor components are substantially the same as the starting composition of components prior to polymerization of a polymerizable component (e.g. resin) to form the polymer (e.g. matrix or scaffold) of the product.

The term "functional group" refers to a specific group of atoms that has its own characteristic properties, regardless of the other atoms present in a compound. Common examples are alkenes, alkynes, alcohols, amines, amides, carboxylic acids, ketones, esters, epoxides, and ethers.

It is further to be understood that all amounts are approximate and are provided for description. Although methods and materials similar or equivalent to those described herein can be used in the practice or testing of this disclosure, suitable methods and materials are described below.

Methods

In general, the method is directed to making a product. The product can be a functional product, a functional precursor product, or a combination of a functional and functional precursor product.

The method comprises: a) combining at least one first component and at least one polymerizable component to form a composition and b) polymerizing the at least one polymerizable component to form at least one polymer, wherein at least two phases are formed from the at least one first component and the at least one polymer. The at least one first component comprises at least one functional component, at least one functional precursor component, or combinations thereof. In embodiments, the method described herein is capable of providing products that have multi-functionality. Each of the phases described herein may comprise concentration gradients, composites, and/or coatings. The method described herein may be a 2D or 3D printing method.

In an embodiment, the at least one first component comprises at least one functional component and the product is the functional product. In another embodiment, the at least one first component comprises at least one functional precursor component and the product is the functional precursor product. In a further embodiment, the at least one first component comprises at least one functional component and at least one functional precursor component and the product is the combination of the functional and functional precursor product.

In embodiments, the product formed from the method described herein comprises: i) a first phase comprising at least one polymer and ii) a second phase comprising at least one first component. The at least one first component comprises at least one functional component, at least one functional precursor component, or combinations thereof. The product is a functional product, a functional precursor product, or a combination of a functional and functional precursor product. In additional embodiments, it is understood that the first phase may further comprise other component(s), such as a first component (e.g. same or different from the first component in the second phase). It is similarly understood that the second phase may further comprise other component(s), such as a polymer (e.g. same or different from the polymer in the first phase). In typical embodiments, the first component in the first phase is the same as the first component in the second phase and/or the polymer in the first phase is the same as the polymer in the second phase. With respect to these above described embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one area of the product to another area of the product, whereby the concentration of the first component increases from the first phase to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) the first and second phases form a gradient; 4) one phase comprises a composite and another comprises a composite (e.g. similar or different); or 5) one phase comprises a composite and another comprises a coating.

In other embodiments, a product formed from the method described herein comprises: i) a first phase comprising at least one polymer; ii) a second phase comprising at least one first component; and iii) an interface between the first phase and the second phase. The interface has a concentration gradient of the at least one first component, whereby the concentration of the at least one first component decreases with distance away from the second phase towards the first phase. The at least one first component comprises at least one functional component, at least one functional precursor component, or combinations thereof. The product is a functional product, a functional precursor product, or a combination of a functional and functional precursor product. In additional embodiments, it is understood that the first phase may further comprise other component(s), such as a first component (e.g. same or different from the first component in the second phase). It is similarly understood that the second phase may further comprise other component(s), such as a polymer (e.g. same or different from the polymer in the first phase). In typical embodiments, the first component in the first phase is the same as the first component in the second phase and/or the polymer in the first phase is the same as the polymer in the second phase. With respect to these embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one area of the product to another area of the product, whereby the concentration of the first component increases from the first phase, through the interface, to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) one phase comprises a composite and another comprises a composite (e.g. similar or different); or 4) one phase comprises a composite and another comprises a coating.

In embodiments, the method further comprises c) sintering the product formed from b), pyrolyzing the product formed from b), or sintering and pyrolyzing the product formed from b). In more specific embodiments, sintering is thermal sintering, UV-VIS radiation sintering, laser sintering or any combination thereof. In typical embodiments, minimum thermal sintering temperatures are selected based on a minimum temperature for converting the functional precursor to the functional product. Maximum thermal sintering temperatures may be selected based on a maximum temperature that the functional precursor and/or the functional product may be heated to without causing substantive decomposition or degradation. With respect to thermal sintering, the temperature ranges include, but are not limited thereto, from about 50° C. to about 300° C., or about 50° C. to about 280° C., or about 100° C. to about 280° C., or about 100° C. to about 270° C., or about 150° C. to about 280° C., or about 160° C. to about 270° C., or about 180° C. to about 250° C., or about 230° C. to about 250° C. Thermal sintering may occur under air or under inert condition(s), such as nitrogen. Thermal sintering may be performed for a time in ranges of about 15 minutes to about 180 minutes, or about 30 minutes to about 120 minutes, or about 45 minutes to about 60 minutes. In typical embodiments, sintering occurs under nitrogen with about 500 ppm oxygen. With respect to UV-VIS radiation sintering, sintering energies may range from about 1 J/cm$^2$ to about 30 J/cm$^2$, or about 2 J/cm$^2$ to about 10 J/cm$^2$, or about 2.5 J/cm$^2$ to about 5 J/cm$^2$, or about 2.4 J/cm$^2$ to about 3.1 J/cm$^2$. In certain embodiments, the pulse widths are about 500 μs to about 5000 μs, or about 1000 μs to about 4000 μs, or about 2500 μs to about 3000 μs. In typical embodiments, UV-VIS radiation sintering occurs under air. With respect to pyrolyzing, the temperature ranges include, but are not limited thereto, from about 350° C. to about 1200° C., or about 400° C. to about 900° C., or about 600° C. to about 800° C., or about 700° C. to about 800° C. Pyrolyzing may be performed for a time in a range of about 1 to about 60 minutes. Pyrolyzing may occur under air or under inert condition(s), such as nitrogen.

In another embodiment, the method comprises c) converting the at least one functional precursor component into at least one second functional component. In an embodiment, the at least one second functional component is different from the at least one functional component. In another embodiment, the at least one second functional component is the same as the at least one functional component. The converting may comprise sintering and/or pyrolyzing, for example, as described above. In some embodiments, the at least one functional precursor component is capable of being converted into at least one second functional component via sintering. The sintering may be at least one of thermal sintering, UV-VIS radiation sintering, and laser sintering. In embodiments, sintering may occur during or after printing. In some embodiments, the method may thus comprise an additional step of converting a metal precursor into a metal form which may thereafter be sintered.

In another embodiment, the product has two phases. The two phases comprise a first phase and a second phase. The first phase has the at least one polymer and the second phase has at least one first component. In still another embodiment, the product has three phases. The three phases comprise a first phase, a second phase, and a third phase. The first phase has the at least one polymer, the second phase has the at least one polymer and the at least one first component, and the third phase has the at least one first component. In other embodiments, the product can have a concentration gradient. Moreover, in various embodiments, at least one of the phases is a composite.

In embodiments, thicknesses of the phase(s) having the at least one first component may be from about 10 nm to about 1000 μm, or from about 100 nm to about 1000 μm, or from about 10 nm to about 500 μm, or from about 100 nm to about 500 μm, or from about 100 nm to about 50 μm, or from about 500 nm to about 50 μm, or from about 500 nm to about 10 μm, or from about 500 nm to about 2 μm. Such phase(s) may be coating(s), in typical embodiments, the coating(s) may have thicknesses from about 10 nm to about 100 μm, from about 10 nm to about 50 μm, from about 10 nm to about 20 μm, from about 100 nm to about 50 μm, from about 100 nm to about 20 μm, from about 100 nm to about 10 μm, or from about 100 nm to about 1 μm.

With respect to the polymerizing in b), the polymerizing may be achieved by exposing the composition (e.g. substantially homogeneous composition or substantially homogeneous mixture) to a radiation and/or a heat source capable of initiating polymerization of the at least one polymerizable component. The radiation and/or heat source may be selected from a UV-Vis source, a laser, an electron beam, a gamma-radiation, an IR (heat) source, LED, microwave radiation, plasma and thermal treatment.

In embodiments, the polymerizing may comprise photopolymerization (e.g. photoinduced polymerization). In embodiments, the composition (e.g. substantially homogeneous composition or substantially homogeneous mixture) further comprises at least one photoinitiator. In another embodiment, the composition (e.g. substantially homogeneous composition or substantially homogeneous mixture) comprises at least one polymerizable component, which includes at least one cross-linking agent. This embodiment may also comprise a photoinitator. Polymerization may also occur via free-radical polymerization without a photoinitiator.

The polymerizing in b) may be achieved via 3D printing and more particularly by vat polymerization 3D printing methods. In an embodiment, the 3D printing uses photoactivation and may be selected from stereolithographic (SLA) printing, digital light processing (DLP), and volumetric printing. In embodiments, a coating of the at least one first component is formed during the printing stage. In embodiments, the polymerizing in b) may be performed for a time period sufficient for the polymerizable component(s) to substantially polymerize (e.g. solidify or reach a substantial gel-point), which will depend on the type of polymerizable component(s). One skilled in the art would be able to determine the time period. In typical embodiments, time periods are selected such that at least about 15% of the polymerizable component(s) convert to polymer(s), or at least about 30% of the polymerizable component(s) convert to polymer(s), or at least about 40% of the polymerizable component(s) convert to polymer(s), or at least about 50% of the polymerizable component(s) convert to polymer(s), or at least about 60% of the polymerizable component(s) convert to polymer(s), or about 40% to about 60% of the polymerizable component(s) convert to polymer(s). These percentage are based on the total weight of the at least one polymerizable component. In typical embodiments, there is sufficient polymerization for the polymerizable component(s) to generate, for example, a 3D-product.

Upon polymerization, the at least one first component phase can separate and migrate towards an area where the concentration of the at least one polymerizable component is greater. In an embodiment, the at least one first component forms a coating. In other embodiments, the product comprises a core and a coating. The core comprises the at least one polymer and the coating comprises the at least one first component. In further embodiments, between the at least one polymer and the at least one first component is an interface having a concentration gradient of the at least one first component, wherein a concentration of the at least one first component decreases with distance away from a surface of the product towards the polymer core. In yet another embodiment, with increasing volume of the product, the thickness of the coating increases.

In embodiments, the product comprises at least about 0.1% by weight of the at least one first component, or at least about 1% by weight of the at least one first component, or at least about 3% by weight of the at least one first component, or at least about 5% by weight of the at least one first component, or at least about 7% by weight of the at least one first component, or at least about 10% by weight of the at least one first component, or at least about 15% by weight of the at least one first component, or at least about 20% by weight of the at least one first component, or at least about 25% by weight of the at least one first component, or at least about 30% by weight of the at least one first component, based on the total weight of the product. In typical embodiments, the product comprises about 0.1 wt % to about 30 wt % by weight of the at least one first component, or about 3 wt % to about 25 wt % by weight of the at least one first component, or about 5 wt % to about 20 wt % by weight of the at least one first component, or about 5 wt % to about 15 wt % by weight of the at least one first component, based on the total weight of the product. In typical embodiments, the product comprises a functional material. The functional material may be a functionally graded material (FGM). The FGM may be a functionally graded composite material (FGCM).

With respect to the amount of the at least one polymerizable component that may be used in embodiments, any suitable amount can be used. One embodiment includes from about 10% to about 99% by weight based on the weight of the composition (e.g. substantially homogeneous composition or substantially homogeneous mixture). In some embodiments, the amount is from about 20% to about 99% by weight, from about 30% to about 99% by weight, from about 40% to about 99% by weight, from about 50% to about 99% by weight, from about 60% to about 99% by weight, from about 70% to about 99% by weight, or from about 80% to about 99% by weight based on the weight of the composition (e.g. substantially homogeneous composition or substantially homogeneous mixture).

The product may be any suitable structure/object. The product may be a 3D- or 2D-product. The product may have one or more phases. In embodiments, the product is a film or a 3D-product. The product may have any desired geometry (e.g. shape). Various 3D structures and functional high aspect ratio coatings and functional patterns in devices, such as sensors, optoelectronic devices, solar cells, electrodes, RFID tags, antennas, electroluminescent devices, power sources and connectors for circuit boards may be fabricated. The product may have at least one functional property selected from the group consisting of chemical properties, mechanical properties, magnetic properties, optical properties, insulating or protective properties (e.g. towards heat, radiation, mechanical abrasion), properties, electrical properties, electrochemical, catalytic properties, and combinations thereof. In other embodiments, the product is at least one of stretchable, flexible, lightweight, porous, conductive, non-conductive, surface durable, increased surface area, hydrophobic, biocompatible, anti-bacterial, mould resistant, wear-resistant, heat resistant, cold resistant, improved surface properties (antifouling), reduce flame retardancy, and combinations thereof. In typical embodiments, the surface of the functional product (e.g. coating itself, coating of 3D-product, etc.) imparts the product with the functionality. In embodiments, the product is multifunctional and/or is a precursor product that is a precursor to a multifunctional product. The product may be used for various applications, including metal/semiconductor, catalysis, sensing, electrochemical detection, EMI shielding, actuators and energy devices.

In embodiments, the product is conductive. The product may be selected to be any suitable conductivity. For example, it may have a conductivity (e.g. resistance) of at least about 1 $\Omega$/cm; at least about 2 $\Omega$/cm; at least about 5 $\Omega$/cm; at least about 10 $\Omega$/cm; at least about 15 $\Omega$/cm; or at least about 20 $\Omega$/cm. In other examples, the conductivity may be from about 1 to about 50 $\Omega$/cm; from about 2 to about 50 $\Omega$/cm; from about 5 to about 50 $\Omega$/cm; from about 10 to about 50 $\Omega$/cm; from about 15 to about 50 $\Omega$/cm; from about 20 to about 50 $\Omega$/cm; from about 1 to about 40 $\Omega$/cm; from about 2 to about 40 $\Omega$/cm; from about 5 to about 40 $\Omega$/cm; from about 10 to about 40 $\Omega$/cm; from about 15 to about 40 $\Omega$/cm; from about 20 to about 40 $\Omega$/cm; from about 1 to about 30 $\Omega$/cm; from about 2 to about 30 $\Omega$/cm; from about 5 to about 30 $\Omega$/cm; from about 10 to about 30 $\Omega$/cm; from about 15 to about 30 $\Omega$/cm; from about 20 to about 30 $\Omega$/cm; from about 1 to about 25 $\Omega$/cm; from about 2 to about 25 $\Omega$/cm; from about 5 to about 25 $\Omega$/cm; from about 10 to about 25 $\Omega$/cm; from about 15 to about 25 $\Omega$/cm; from about 20 to about 25 $\Omega$/cm; from about 10 to about 23 $\Omega$/cm; or about 18 to about 23 $\Omega$/cm.

Some embodiments of the method are shown in a schematic in FIG. 1.

In embodiments, the at least one polymer has a weight average molecular weight of about 10,000 to about 10,000,000, or about 10,000 to about 5,000 000, or about 10,000 to about 1,000,000, or about 50,000 to about 1,000,000, or about 50,000 to about 500,000. It is understood that the weight average molecular weight may approach infinity and includes cross-linked polymeric network(s).

With respect to the at least one polymerizable component, it may comprise at least one monomer and/or at least one oligomer. The at least one polymerizable component may comprise at least one liquid monomer and/or at least one liquid oligomer. In a certain embodiment, the at least one polymerizable component comprises at least one resin. Some examples include resins based on epoxies, vinyl ethers, acrylates, urethane-acrylates, methacrylates, acrylamides, thiol-ene based resins, styrene, siloxanes, silicones, and any functionalized derivatives thereof (e.g. fluorinated methacrylates, PEG-functionalized methacrylates or epoxies). The at least one resin may comprise at least one commercial resin. In particular, typical examples of the at least one resin comprises at least one commercial resin for 3D printing such as, and without being limited thereto, 3D printing via photoactivation (e.g. stereolithographic (SLA) printing, digital light processing (DLP), or volumetric printing). In further embodiments, the at least one resin may comprise at least one acrylate based-resin. The monomer resins may be elastomers or pre-ceramic polymers.

In embodiments, the monomers and oligomers are selected according to their physico-chemical and chemical properties, such as monomer viscosity and/or surface tension, and/or polymer elasticity and/or hardness, number of polymerizable groups, and according to the printing method and the polymerization reaction type, e.g., the radiation source or heat source of choice. With respect to elasticity or hardness, some embodiments include modulus value ranges of from about 0.1 MPa to about 8000 MPa. In some embodiments, the monomers are selected from acid containing monomers, acrylic monomers, amine containing monomers, cross-linking acrylic monomers, dual reactive acrylic monomers, epoxides/anhydrides/imides, fluorescent acrylic monomers, fluorinated acrylic monomers, high or low refractive index monomers, hydroxy containing monomers, mono and difunctional glycol oligomeric monomers, styrenic monomers, vinyl and ethenyl monomers. In some embodiments, the monomers can polymerize to yield conductive polymers such as polypyrole and polyaniline. In some embodiments, the at least one monomer is selected from dipentaerythnitol hexaacrylate (DPHA) and trimethylolpropane triacrylate (TMPTA). In some embodiments, the at least one oligomer is selected from the group consisting of acrylates and vinyl containing molecules.

In other embodiments, the monomer can be any monomeric compound having a functional group, such as an activatable photopolymerizable group (photoinduced polymerization) that can propagate, for example, carbon-carbon, carbon-oxygen, carbon-nitrogen, or carbon-sulfur bond formation. In certain embodiments, the monomer is selected from mono-functional monomers (e.g. monomers with one functional group). During polymerization, the radical of the monofunctional monomer is formed and it will react with other monomers present to form oligomers and polymers. The resultant oligomers and polymers can have different properties depending on its structure. Some monomers may be selected depending on their flexibility, viscosity, curing rate, reactivity or toxicity. In one embodiment, the monomer is polymerized to form a polyacrylate such as polymethylmethacrylate, an unsaturated polyester, a saturated polyester, a polyolefin (polyethylenes, polypropylenes, polybutylenes, and the like), an alkyl resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybenzoxazoles, polybenzthiazoles, polyfluorocarbones, polyphenylene ethers, polyarylates, cyanate ester polymers, polystyrenes, polyacrylamide, polyvinylethers, copolymers of two or more thereof, and the like. In other embodiments, polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxylethylacrylate, poly-2-phenoxyethylmethacrylate, poly-2-ethylbutylmethacrylate, poly-9-anthracenylmethylmethacrylate, poly-4-chlorophenylacrylate, polycyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy)ethylester, and polyfurfurylmethacrylate, poly(ethylene glycol)methacrylate, polyacrylic acid and poly (propylene glycol)methacrylate.

Monomers and oligomers that may be used, for example, include acrylic monomers such as monoacrylics, diacrylics, triacrylics, tetraacrylics, pentacrylics, etc. Examples of other monomers include ethyleneglycol methyl ether acrylate, N,N-diisobutyl-acrylamide, N-vinyl-pyrrolidone, (meth)acryloyl morpholine, 7-amino-3,7-dimethyloctyl, (meth)acrylate, isobutoxymethyl (meth)acrylamide, isobornyloxyethyl (meth)acrylate, isobornyl (meth)acrylate, 2-ethylhexyl acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth) acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl(meth)acrylate, 2-tribromophenoxyethyl (meth)acrylate, 2-hydroxyethyl (meth)acrylate, 2-hydroxypropyl (meth)acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth)acrylate, alkoxylated alkyl phenol acrylate, (poly)caprolactone acrylate ester from methylol-tetrahydrofuran, (poly)caprolactone acrylate ester from alkylol-dioxane, ethylene glycol phenyl ether acrylate, and methacryloxypropyl terminated polydimethylsiloxane.

Other monomers that may be used, for example, include epoxide monomers such as 3,4-epoxyclyclohexylmethyl 3,4-epoxycylcohexanecarboxylate, and/or epoxycyclohexylethyl terminated polydimethylsiloxane.

With respect to the amount of the at least one monomer that may be used in embodiments, any suitable amount can be used depending on the desired functional and/or functional precursor product. One embodiment includes from about 1% to about 90% by weight of the at least one monomer based on the weight of the composition without the at least one first component. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the composition without the at least one first component.

With respect to the amount of the at least one monomer that may be used in embodiments based on the weight of the at least one polymerizable component itself, includes from about 1% to about 90% by weight of the at least one monomer. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the at least one polymerizable component.

In other embodiments, the at least one polymerizable component comprises or further comprises at least one ceramic precursor.

With respect to the at least one cross-linking agent, the at least one polymerizable component comprises at least one cross-linking agent or comprises at least one monomer/oligomer and at least one cross-linking agent. Cross-linking agents may have one or more functional groups and, typically, have two or more functional groups (e.g. di-, tri-, tetra-, etc. functional cross-linking agents). In certain embodiments, the functional groups may be present at both ends of the cross-linking agent, forming branched polymerization, whereby the cross-linking agent may react with two or more polymers. In certain embodiments, a 2D product is formed with a monofunctional cross-linking agent and a 3D product is formed with a multifunctional cross-linking agent.

In embodiments, the morphology of a functional and/or functional precursor product (e.g. 3D printed product) may depend on the concentration (e.g. amount) of cross-linking agent. The concentration of the cross-linking agent may control the rate at which a polymer network forms. In one embodiment, when the cross-linking agent concentration is high, the rate at which the monomers form polymer networks (e.g. branched polymerization) are high. High rates of polymer network formation may limit the diffusion of slower reacting or non-polymerizing components and provide more uniform compositions such as composites. Conversely, in other embodiments, when cross-linking agent concentrations are low and the rates of polymer network formations are low, slower polymerizing monomers or non-polymerizing components (e.g. silver salt, nanoparticles, etc.) can diffuse towards areas where their solubilities are higher. Their solubilities may be higher towards the surface of the printed product, where the polymer concentration is low and the monomer concentration is high. Therefore, formulations with low cross-linking agent concentrations may lead to printed products (e.g. objects) where the slower polymerizing monomer or non-polymerizing component forms a coating. In other embodiments, intermediate cross-linking agent concentrations can generate graded compositions in the products. In embodiments, therefore, the morphology of the functional and/or functional precursor product can be a function of cross-linking agent concentrations in compositions (e.g. substantially homogeneous compositions or substantially homogeneous mixtures) containing non-polymerizing functional and/or functional precursor components.

In embodiments, the amount of functional and/or functional precursor component at the surface of the functional and/or functional precursor product decreases with increased concentration of cross-linking agent. The concentration of functional and/or functional precursor component at the surface can determine the resistance value of the printed product. As the concentration of cross-linking agent increases, the resistance of the functional and/or functional precursor component at the surface (e.g. coating) increases in view of the lower concentration of the functional and/or functional precursor component at the surface.

With respect to the amount of the at least one cross-linking agent that may be used in embodiments, any suitable amount can be used depending on the desired functional and/or functional precursor product. For example, the amount of the at least one cross-linking agent can be used to tune the morphology of the functional and/or functional precursor product. One embodiment includes from about 10% to about 99% mol based on the mol of the composition without the at least one first component (e.g. total mol of cross-linking agent+monomer). In some embodiments, the amount is from about 80% to about 99% mol, from about 85% to about 99% mol, from about 90% to about 99% mol, from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 50% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition without the at least one first component.

In some embodiments, the functional and/or functional precursor product is a composite. The amount of the at least one crosslinking agent used to make the product is from about 80% to about 99% mol, from about 85% to about 99% mol, or from about 90% to about 99% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded and/or coated product. The amount of the at least one crosslinking agent used to make the product is from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 50% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded product. The amount of the at least one crosslinking agent used to make the product is from about 35% to about 80% mol, from about 35% to about 75% mol, from about 35% to about 65% mol, from about 35% to about 55% mol, from about 35% to about 50% mol, from about 40% to about 80% mol, from about 45% to about 80% mol, from about 50% to about 80% mol, from about 55% to about 80% mol, from about 60% to about 80% mol, from about 65% to about 80% mol, or from about 70% to about 80% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent.

In some embodiments, the functional and/or functional precursor product is a coated product. The amount of the at least one crosslinking agent used to make the product is less than about 35% mol, less than about 30% mol, less than about 25% mol, less than about 20% mol, less than about 15% mol, less than about 10% mol, from about 1% to about 35% mol, from about 1% to about 30% mol, from about 1% to about 25% mol, or from about 1% to about 20% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a composite. The amount of the at least one crosslinking agent used to make the product is from about 80% to about 99% by weight, from about 85% to about 99% by weight, or from about 90% to about 99% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded and/or coated product. The amount of the at least one crosslinking agent used to make the product is from about 10% to about 80% by weight, from about 10% to about 70% by weight, from about 10% to about 60% by weight, from about 10% to about 50% by weight, from about 10% to about 40% by weight, from about 10% to about 35% by weight, from about 20% to about 80% by weight, from about 25% to about 80% by weight, from about 30% to about 80% by weight, from about 35% to about 80% by weight, from about 40% to about 80% by weight, from about 45% to about 80% by weight, from about 50% to about 80% by weight, from about 55% to about 80% by weight, from about 60% to about 80% by weight, from about 65% to about 80% by weight, from about 70% to about 80% by weight, from about 35% to about 75% by weight, from about 35% to about 70% by weight, from about 35% to about 65% by weight, from about 35% to about 60% by weight, from about 35% to about 55% by weight, from about 35% to about 50% by weight, from about 15% to about 50% by weight, from about 15% to about 45% by weight, from about 15% to about 40% by weight, or from about 15% to about 35% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded product. The amount of the at least one crosslinking agent used to make the product is from about 35% to about 80% by weight, from about 35% to about 75% by weight, from about 35% to about 65% by weight, from about 35% to about 55% by weight, from about 35% to about 50% by weight, from about 40% to about 80% by weight, from about 45% to about 80% by weight, from about 50% to about 80% by weight, from about 55% to about 80% by weight, from about 60% to about 80% by weight, from about 65% to about 80% by weight, or from about 70% to about 80% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent.

In some embodiments, the functional and/or functional precursor product is a coated product. The amount of the at least one crosslinking agent used to make the product is less than about 35% by weight, less than about 30% by weight, less than about 25% by weight, less than about 20% by weight, less than about 15% by weight, less than about 10% by weight, from about 1% to about 35% by weight, from about 1% to about 30% by weight, from about 1% to about 25% by weight, or from about 1% to about 20% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

With respect to the amount of the at least one cross-linking agent, based on the weight of the composition without the at least one first component, that may be used in embodiments, any suitable amount can be used. One embodiment includes from about 10% to about 99% by weight of the at least one cross-linking agent based on the weight of the composition without the at least one first component. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the composition without the at least one first component.

With respect to the amount of the at least one cross-linking agent that may be used in embodiments based on the weight of the at least one polymerizable component, includes from about 10% to about 99% by weight of the at least one cross-linking agent. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the at least one polymerizable component (e.g. resin).

In an embodiment, the at least one polymerizable component comprises from about 10% to about 99% by weight of at least one cross-linking agent based on the weight of the composition without the at least one first component. In another embodiment, the at least one polymerizable component comprises from about 15% to about 99% by weight of at least one cross-linking agent based on the weight of the composition without the at least one first component. In another embodiment, the at least one polymerizable component comprises from about 1% to about 90% by weight of at least one monomer and/or oligomer and from about 10% to about 99% by weight of at least one cross-linking agent based on the weight of the composition without the at least one first component. In another embodiment, the at least one polymerizable component comprises from about 1% to about 85% by weight of at least one monomer and/or oligomer and from about 15% to about 99% by weight of at least one cross-linking agent based on the weight of the composition without the at least one first component.

In embodiments, the cross-linking agent is a radical reactive cross-linking agent. Examples of the radical reactive cross-linking agent include a methacrylic compound, an acrylic compound, a vinyl compound, and an allyl compound. Examples of suitable cross-linking agents which can be used to form polyacrylates include 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, and diacrylic urethane oligomers (reaction products of isocyanate terminate polyol and 2-hydroethylacrylate). Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di(trimethylolpropane) tetraacrylate, and ethoxylated pentaerythritol tetraacrylate. Examples of pentaacrylates include dipentaerythritol pentaacrylate and pentaacrylate ester. Other examples of cross-linking agents include: ethylene glycol di(meth)acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth) acrylate, EO modified trimethylolpropane tri(meth)acrylate, PO modified trimethylolpropane tri(meth)acrylate, tripropylene glycol di(meth)acrylate, neopentyl glycol di(meth)acrylate, both terminal (meth)acrylic acid adduct of bisphenol A diglycidyl ether, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa(meth)acrylate, dipentaerythritolpenta(meth)acrylate, dipentaerythritol tetra(meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N, N'-methylenebisacrylamide, N, N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, triethylene glycol dithiol, and combinations thereof.

With respect to the photoinitiators, in some embodiments, the radiation source employed for initiating the polymerization is selected based on the type of photoinitiator used. Generally, the photoinitiator is a chemical compound that decomposes into free radicals when exposed to light. There are a number of photoinitiators known in the art. For example, suitable photoinitiators include, but are not limited to, ethyl (2,4,6-trimethylbenzoyl) phenylphosphinate, 7-diethylamino-2-coumarin, acetophenone, p-tert-butyltrichloro acetophenone, chloro acetophenone, 2-2-diethoxy acetophenone, hydroxy acetophenone, 2,2-dimethoxy-2'-phenyl acetophenone, 2-amino acetophenone, dialkylamino acetophenone, benzil, benzoin, benzoin methyl ether, benzoin ethyl ether, benzoin isopropyl ether, benzoin isobutyl ether, 1-hydroxycyclohexyl phenyl ketone, 2-hydroxy-2-methyl-1-phenyl-2-methylpropane-1-one, 1-(4-isopropylphenyl)-2-hydroxy-2-methylpropane-1-one, benzyl dimethyl ketal, benzophenone, benzoylbenzoic acid, methyl benzoyl benzoate, methyl-o-benzoyl benzoate, 4-phenyl benzophenone, hydroxy benzophenone, hydroxypropyl benzophenone, acrylic benzophenone, 4-4'-bis(dimethylamino)benzophenone, perfluoro benzophenone, thioxanthone, 2-chloro thioxanthone, 2-methyl thioxanthone, diethyl thioxanthone, dimethyl thioxanthone, 2-methyl anthraquinone, 2-ethyl anthraquinone, 2-tert-butyl anthraquinone, 1-chloro anthraquinone, 2-amyl anthraquinone, acetophenone dimethyl ketal, benzyl dimethyl ketal, α-acyl oxime ester, benzyl-(o-ethoxycarbonyl)-α-monoxime, diphenyl(2,4,6-trimethylbenzoyl)phosphine oxide, phenylbis(2,4,6-trimethylbenzoyl)phosphine oxide, bis(2,6-dimethoxybenzoyl)(2,4,4-trimethylpentyl)phosphine oxide, bis(4-methoxybenzoyl) diethylgermanium, tetrabenzoylgermane, tetramesitoylgermane, glyoxy ester, 3-keto coumarin, 2-ethyl anthraquinone, camphor quinone, tetramethylthiuram sulfide, azo bis isobutyl nitrile, benzoyl peroxide, dialkyl peroxide, tert-butyl peroxy pivalate, perfluoro tert-butyl peroxide, perfluoro benzoyl peroxide, etc. Further, it is possible to use these photoinitiator alone or in combination of two or more.

A skilled person would understand a suitable amount of photoinitiator(s) that may be used to initiate a photopolymerization reaction herein. One embodiment includes less than about 0.5% by weight of the at least one photoinitiator based on the weight of the composition without the at least one first component. In some embodiments, the amount is less than about 0.4% by weight, less than about 0.3% by weight, or less than about 0.1% by weight based on the weight of the composition without the at least one first component.

With respect to the amount of the at least one photoinitiator that may be used in embodiments based on the weight of the at least one polymerizable component itself, includes less than about 2% by weight of the at least one photoinitiator. In some embodiments, the amount is less than about 1.8% by weight, less than about 1.5% by weight, or less than about 1% by weight based on the weight of based on the weight of the at least one polymerizable component (e.g. resin).

It is understood that various ratios of the components may be used in the method of making the product. Depending on the ratios, different functional products result. For example, with respect to a larger proportion of photoinitiator, the method may form more radicals causing a larger concentration of the monomers to polymerize quickly, forming a more fragile product. With respect to larger amounts of monomer compared to cross-linking agent, fewer points of branching may result in a product with higher fragility. An excess of cross-linking agent may also cause the monomer to gel quickly, creating an inelastic structure. In examples, higher cross-linking agent percentages may provide products having greater tensile strength and lower cross-linking agent percentages may provide products having lower resistivities. In certain examples, higher cross-linking agent percentages may provide products having greater tensile strength with graded and composite products and lower cross-linking agent percentages may provide products having lower resistivities with functionally coated phase separated products.

With respect to the ratios of the components of the at least one polymerizable component, any suitable ratios can be used depending on the desired functional and/or functional precursor product. With respect to the at least one polymerizable component comprising at least one monomer and at least one cross-linking agent, in embodiments, the ratio of the at least one monomer to at least one cross-linking agent includes about 9:1 to about 0:10 based on % by weight. In some embodiments, the amount is about 9:1 to about 1:9 based on % by weight, about 8:2 to about 2:8 based on % by weight, about 7:3 to about 3:7 based on % by weight, about 6:4 to about 4:6 based on % by weight, about 5:5 to about 5:5 based on % by weight, about 4:6 to about 6:4 based on % by weight, about 3:7 to about 7:3 based on % by weight, about 2:8 to about 8:2 based on % by weight, or about 1:10 to about 9:1 based on % by weight.

With respect to the at least one polymerizable component comprising at least one monomer, at least one cross-linking agent, and at least one photoinitiator, in embodiments, the ratio of the at least one monomer to at least one cross-linking agent to at least one photoinitiator includes about 8.9:1:0.1 to about 0:9.9:0.1 based on % by weight.

To design functional products, and tune the chemical and/or physical properties, the attractive and repulsive forces (hydrophobic/hydrophilic interactions) between components may be leveraged to control the placement of functional components. When components have similar hydrophilic or hydrophobic properties, the components will have less of a driving force to phase separate upon polymerization. If the components differ in their hydrophobicity or hydrophilicity, the functional component will have a larger driving force to separate from the composition (e.g. polymerizing monomer/cross-linking agent mixture). The resulting product may be used as a scaffold for receiving metallic functional components (e.g. through electroplating) and as barrier type coatings (e.g. hydrophobic), dielectrics or insulating material, and may be selected for the desired flexibility and strength needed in the final product.

With respect to the at least one first component, in embodiments, the at least one first component is substantially soluble in the at least one polymerizable component and is substantially insoluble when the at least one polymerizable component polymerizes. The at least one first component may be selected from the group consisting of functional monomers, functional polymers, metal precursors, carbon nanotubes (CNT), graphene, metal alloy precursors, metalloid precursors, and combinations thereof.

In embodiments, the at least one first component is at least one functional monomer. The at least one functional monomer may be fluorinated monomers such as, and without being limited thereto, fluorinated methacrylates. The fluorinated functional monomers may contribute hydrophobic properties to the functional product. In embodiments utilizing the functional monomer, the at least one polymerizable component is selectively polymerized (e.g. temperature/wavelength used) without substantially polymerizing the at least one functional monomer such that, for example, the functional monomer and the at least one polymer form at least two phases. In embodiments, the functional monomer may polymerize somewhat with the at least one polymerizable component; however, at least two phases form.

In other embodiments, the at least one first component may be at least one functional polymer such as, and without being limited thereto, PEG. In embodiments utilizing the functional polymer, the at least one polymerizable component is polymerized such that, for example, the functional polymer and the at least one polymer form at least two phases.

In embodiments, the at least one first component is selected from the group consisting of metal salts, metal coordination compounds, organometallic compounds, organometalloid compounds, and combinations thereof. In typical embodiments, the at least one first component is selected from the group consisting of metal salts, metalloid salts, and combinations thereof. In certain embodiments, the at least one first component is selected from the group consisting of metal carboxylates, metalloid carboxylates, and combinations thereof. The metal carboxylates may comprise from 1 to 20 carbon atoms, from 6 to 15 carbon atoms, or from 8 to 12 carbon atoms. The carboxylate group of the metal carboxylates may be an alkanoate. Examples of the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof.

With respect to the metal precursors: the metal ion may be selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $NO^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $OS^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ir$, $Ni^{3+}$, $Ni^{2+}$, $Ni^+$, $Ni$, $Pd^{4+}$, $Pd^{2+}$, $Pd^+$, $Pd$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Zn$, $Cd^{2+}$, $Cd^+$, $Hg^{4+}$, $Hg^{2+}$, $Hg^+$, $B^{3+}$, $B^{2+}$, $B^+$, $Al^+$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Ge$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$ and alloys of any of the foregoing.

The at least one first component used in the method may be selected amongst nanoparticles and/or microparticles of at least one first component described herein. In certain embodiments, the nanoparticles and/or microparticles may be metal precursors such as metal ions, metal salts, metal oxides, and/or metal complexes which may be convertible to metal. More broadly, the at least one first component may be any suitable inorganic particle that can separate into at least two phases from the at least one polymer, including nanoparticles and/or microparticles.

In some embodiments, the nanoparticles or microparticles are composed of a metal or combinations of metals selected from metals of Groups IIA, IIIA, IIIB, IVB, VB, VIB, VIIB, VIIIB, IB or IIB of block d of the Periodic Table of Elements. In other embodiments, the metallic nanoparticles or microparticles are selected from Ba, Al, Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Al, Sn, In, Ga, Ir, and combinations thereof. In some other embodiments, the metallic nanoparticles or microparticles are selected from Ba, Al, Cu, Ni, Ag, Au, Pt, Pd, Al, Fe, Co, Ti, Zn, In, Sn, Ga and combinations thereof. In yet other embodiments, the metallic nanoparticles or microparticles are selected from Al, Cu, Ni, Ti, Zn, Ag, and combinations thereof.

In some embodiments, the metallic nanoparticles or microparticles are selected from Ag, Cu, and Ag and Cu nanoparticles. In other embodiments, the metallic nanoparticles or microparticles are Ag nanoparticles. In some embodiments, the at least one first component is a metal precursor selected to be convertible in-situ into a metal by a chemical or electrochemical process. The metal precursor may also be reduced into corresponding metal by reduction of the metal precursor in the presence of, for example, a suitable photoinitiator and a radiation source, a reducing agent (e.g. oxazolines such as 2-methyl-2-oxazoline, 2-ethyl-2-oxazoline, etc.), etc. Thus, in some embodiments, the metal precursor is selected to be convertible into any one of the metals recited hereinabove. In some embodiments, the metal precursor is a salt form of any one metal recited hereinabove.

In some embodiments, the metal salt is comprised of an inorganic or organic anion and an inorganic or organic cation. In some embodiments, the anion is inorganic. Non-limiting examples of inorganic anions include $HO^-$, $F^-$, $Cl^-$, $Br^-$, $I^-$, $NO_2^-$, $NO_3^-$, $ClO_4^-$, $SO_4^{2-}$, $SO_3^-$, $PO_4^-$ and $CO_3^{2-}$. In some embodiments, the anion is organic. Non-limiting examples of organic anions include acetate ($CH_3COO^-$), formate ($HCOO^-$), citrate ($C_3H_5O(COO)_3$ acetylacetonate, lactate ($CH_3CH(OH)COO^-$), oxalate (($COO)_2^{-2}$) and any derivative of the aforementioned. In some embodiments, the metal salt is not a metal oxide. In some embodiments, the metal salt is a metal oxide. In some embodiments, the metal salt is a salt of copper. Non-limiting examples of copper metal salts include copper formate, copper citrate, copper acetate, copper nitrate, copper acetylacetonate, copper perchlorate, copper chloride, copper sulfate, copper carbonate, copper hydroxide, copper sulfide or any other copper salt and the combinations thereof.

In some embodiments, the metal salt is a salt of nickel. Non-limiting examples of nickel metal salts include nickel formate, nickel citrate, nickel acetate, nickel nitrate, nickel acetylacetonate, nickel perchlorate, nickel chloride, nickel sulfate, nickel carbonate, nickel hydroxide or any other nickel salts and the combinations thereof.

In some embodiments, the metal salt is a salt of silver. Non-limiting examples of silver metal salts include silver carboxylates, silver lactate, silver nitrate, silver formate or any other silver salt and their mixtures. Typically, silver carboxylates may be used and comprise a silver ion and an organic group containing a carboxylate group. The carboxylate group may comprise from 1 to 20 carbon atoms, typically from 6 to 15 carbon atoms, more typically from 8 to 12 carbon atoms, for example 10 carbon atoms. The carboxylate group is typically an alkanoate. Some non-limiting examples of preferred silver carboxylates are silver ethylhexanoate, silver neodecanoate, silver benzoate, silver phenylacetate, silver isobutyrylacetate, silver benzoylacetate, silver oxalate, silver pivalate and any combinations thereof. In a typical embodiment, silver neodecanoate is used.

In other embodiments, the metal salt is selected from indium(III) acetate, indium(III) chloride, indium(III) nitrate; iron(II) chloride, iron(III) chloride, iron(II) acetate, gallium (III) acetylacetonate, gallium(II) chloride, gallium(III) chloride, gallium(III) nitrate; aluminum(III) chloride, aluminum (III) stearate; silver nitrate, silver chloride; dimethlyzinc, diethylzinc, zinc chloride, tin(II) chloride, tin(IV) chloride, tin(II) acetylacetonate, tin(II) acetate; lead(II) acetate, lead (II) acetylacetonate, lead(II) chloride, lead(II) nitrate and PbS.

In other embodiments, the at least one first component is selected from metal oxides such as those mentioned above, including nanoparticles and/or microparticles. In certain embodiments, the metal oxides are selected from alumina, silica, barium titanate, transition metal oxides (e.g. zinc oxide, titanium oxide), and combinations thereof.

In other embodiments, the at least one first component is selected from nanowires, microparticles, nanoparticles, or combinations thereof, including any of the suitable at least one first component mentioned herein. In still other embodiments, the at least one first component comprises graphene.

With respect to the amount of the at least one first component, the amount of the at least one first component may be any suitable amount. For example, the amount may be from about 0.1% to about 90% by weight based on the weight of the composition. In some embodiments, the amount of the at least one first component in the composition may be from about 0.1% to about 80% by weight, from about 0.1% to about 70% by weight, from about 0.1% to about 60% by weight, from about 0.1% to about 50% by weight, from about 0.1% to about 40% by weight, from about 0.1% to about 30% by weight, or from about 0.1% to about 20% by weight based on the weight of the composition.

In other embodiments of the method, various additives may be added. Additives can be included, for example, to increase the solubility of the at least one first component in the at least one polymer component. Various additives include, without being limited thereto, fillers, inhibitors, adhesion promoters, absorbers, dyes, pigments, anti-oxidants, carrier vehicles, heat stabilizers, flame retardants, thixotropic agents, flow control additives, dispersants, or combinations thereof. In typical embodiments, extending fillers, reinforcing fillers, dispersants, or combinations thereof are added. The additives can be microparticles or nanoparticles.

Products

In embodiments, there is provided a product made by the method described herein. In other embodiments, a product comprises: i) a first phase comprising at least one polymer and ii) a second phase comprising at least one first component. The at least one first component comprises at least one functional component, at least one functional precursor component, or combinations thereof. The product is a functional product, a functional precursor product, or a combination of a functional and functional precursor product. In additional embodiments, it is understood that the first phase may further comprise other component(s), such as a first component (e.g. same or different from the first component in the second phase). It is similarly understood that the second phase may further comprise other component(s), such as a polymer (e.g. same or different from the polymer in the first phase). In typical embodiments, the first component in the first phase is the same as the first component in the second phase and/or the polymer in the first phase is the same as the polymer in the second phase.

With respect to these above described embodiments, i) the concentration of the polymer is higher compared to the concentration of the first component in the first phase; and ii) the concentration of the polymer is lower compared to the concentration of the first component in the second phase. In these embodiments, the phases can form a concentration gradient from one area of the product to another area of the product, whereby the concentration of the first component increases from the first phase to the second phase.

Each of the phases described herein may comprise concentration gradients, composites, and/or coatings. For example, 1) one phase comprises a gradient and another phase comprises a composite; 2) one phase comprises a gradient and another phase comprises a coating; 3) the first and second phases form a gradient; 4) one phase comprises a composite and another comprises a composite (e.g. similar or different); or 5) one phase comprises a composite and another comprises a coating.

In other embodiments, a product comprises: i) a first phase comprising at least one polymer; ii) a second phase comprising at least one first component; and iii) an interface between the first phase and the second phase. The interface has a concentration gradient of the at least one first component, whereby the concentration of the at least one first component decreases with distance away from the second phase towards the first phase. The at least one first component comprises at least one functional component, at least one functional precursor component, or combinations thereof. The product is a functional product, a functional precursor product, or a combination of a functional and functional precursor product. In additional embodiments, it is understood that the first phase may further comprise other component(s), such as a first component (e.g. same or different from the first component in the second phase). It is similarly understood that the second phase may further comprise other component(s), such as a polymer (e.g. same or different from the polymer in the first phase). In typical embodiments, the first component in the first phase is the same as the first component in the second phase and/or the polymer in the first phase is the same as the polymer in the second phase.

With respect to these above described embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one area of the product to another area of the product, whereby the concentration of the first component increases from the first phase, through the interface, to the second phase.

Each of the phases described herein may comprise concentration gradients, composites, and/or coatings. For example, 1) one phase comprises a gradient and another phase comprises a composite; 2) one phase comprises a gradient and another phase comprises a coating; 3) one phase comprises a composite and another comprises a composite (e.g. similar or different); or 4) one phase comprises a composite and another comprises a coating.

In an embodiment, the at least one first component comprises at least one functional component and the product is the functional product. In another embodiment, the at least one first component comprises at least one functional precursor component and the product is the functional precursor product. In a further embodiment, the at least one first component comprises at least one functional component and at least one functional precursor component and the product is the combination of the functional and functional precursor product.

The product may further comprise at least one additive, for example, as described herein above. For example, the at least one additive may be selected from the group consisting of fillers, inhibitors, adhesion promoters, absorbers, dyes, pigments, anti-oxidants, carrier vehicles, heat stabilizers, flame retardants, thixotropic agents, flow control additives, dispersants, chain transfer agents, rheology modifiers, and combinations thereof. In typical embodiments, the at least one additive may be selected from the group consisting of extending fillers, reinforcing fillers, dispersants, and combinations thereof. The at least one additive may be nanoparticles.

In embodiments, the at least one polymer has a weight average molecular weight of about 10,000 to about 10,000,000, or about 10,000 to about 5,000 000, or about 10,000 to about 1,000,000, or about 50,000 to about 1,000,000, or about 50,000 to about 500,000. As above, it is understood that the weight average molecular weight may approach infinity and includes cross-linked polymeric network(s). In embodiments, the at least one polymer is a polymer that results from the polymerization of at least one polymerizable component, which comprises at least one monomer and/or at least one oligomer. The at least one polymerizable component may comprise at least one liquid monomer and/or at least one liquid oligomer. In a certain embodiment, the at least one polymerizable component comprises at least one resin. Some examples include resins based on epoxies, vinyl ethers, acrylates, urethane-acrylates, methacrylates, acrylamides, thiol-ene based resins, styrene, siloxanes, silicones, and any functionalized derivatives thereof (e.g. fluorinated methacrylates, PEG-functionalized methacrylates or epoxies). The at least one resin may comprise at least one commercial resin. In particular, typical examples of the at least one resin comprises at least one commercial resin for 3D printing such as, and without being limited thereto, 3D printing via photoactivation (e.g. stereolithographic (SLA) printing, digital light processing (DLP), or volumetric printing). In further embodiments, the at least one resin may comprise at least one acrylate based-resin. The monomer resins may be elastomers or pre-ceramic polymers.

In embodiments, the monomers and oligomers are selected according to their physico-chemical and chemical properties, such as monomer viscosity and/or surface tension, and/or polymer elasticity and/or hardness, number of polymerizable groups, and according to the printing method and the polymerization reaction type, e.g., the radiation source or heat source of choice. With respect to elasticity or hardness, some embodiments include modulus value ranges of from about 0.1 MPa to about 8000 MPa. In some embodiments, the monomers are selected from acid containing monomers, acrylic monomers, amine containing monomers, cross-linking acrylic monomers, dual reactive acrylic monomers, epoxides/anhydrides/imides, fluorescent acrylic monomers, fluorinated acrylic monomers, high or low refractive index monomers, hydroxy containing monomers, mono and difunctional glycol oligomeric monomers, styrenic monomers, vinyl and ethenyl monomers. In some embodiments, the monomers can polymerize to yield conductive polymers such as polypyrole and polyaniline. In some embodiments, the at least one monomer is selected from dipentaerythnitol hexaacrylate (DPHA) and trimethylolpropane triacrylate (TMPTA). In some embodiments, the at least one oligomer is selected from the group consisting of acrylates and vinyl containing molecules.

In other embodiments, the monomer can be any monomeric compound having a functional group, such as an activatable photopolymerizable group (photoinduced polymerization) that can propagate, for example, carbon-carbon, carbon-oxygen, carbon-nitrogen, or carbon-sulfur bond formation. In certain embodiments, the monomer is selected from mono-functional monomers (e.g. monomers with one functional group). During polymerization, the radical of the monofunctional monomer is formed and it will react with other monomers present to form oligomers and polymers. The resultant oligomers and polymers can have different properties depending on its structure. Some monomers may be selected depending on their flexibility, viscosity, curing rate, reactivity or toxicity. In one embodiment, the monomer is polymerized to form a polyacrylate such as polymethylmethacrylate, an unsaturated polyester, a saturated polyester, a polyolefin (polyethylenes, polypropylenes, polybutylenes, and the like), an alkyl resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybenzoxazoles, polybenzthiazoles, polyfluorocarbones, polyphenylene ethers, polyarylates, cyanate ester polymers, polystyrenes, polyacrylamide, polyvinylethers, copolymers of two or more thereof, and the like. In other embodiments, polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxylethylacrylate, poly-2-phenoxyethylmethacrylate, poly-2-ethylbutylmethacrylate, poly-9-anthracenylmethylmethacrylate, poly-4-chlorophenylacrylate, polycyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy)ethylester, and polyfurfurylmethacrylate, poly(ethylene glycol)methacrylate, polyacrylic acid and poly (propylene glycol)methacrylate.

Monomers and oligomers that may be used, for example, include acrylic monomers such as monoacrylics, diacrylics, triacrylics, tetraacrylics, pentacrylics, etc. Examples of other monomers include ethyleneglycol methyl ether acrylate, N,N-diisobutyl-acrylamide, N-vinyl-pyrrolidone, (meth) acryloyl morpholine, 7-amino-3,7-dimethyloctyl, (meth) acrylate, isobutoxymethyl (meth)acrylamide, isobornyloxyethyl (meth)acrylate, isobornyl (meth)acrylate, 2-ethylhexyl acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth) acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl(meth)acrylate, 2-tribromophenoxyethyl (meth)acrylate, 2-hydroxyethyl (meth)acrylate, 2-hydroxypropyl (meth)acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth)acrylate, alkoxylated alkyl phenol acrylate, (poly)caprolactone acrylate ester from methylol-tetrahydrofuran, (poly)caprolactone acrylate ester from alkylol-dioxane, ethylene glycol phenyl ether acrylate, and methacryloxypropyl terminated polydimethylsiloxane.

Other monomers that may be used, for example, include epoxide monomers such as 3,4-epoxyclyclohexylmethyl 3,4-epoxycylcohexanecarboxylate, and/or epoxycyclohexylethyl terminated polydimethylsiloxane.

The at least one polymerizable component comprises or further comprises at least one ceramic precursor.

With respect to the at least one cross-linking agent, the at least one polymerizable component comprises at least one cross-linking agent or comprises at least one monomer/oligomer and at least one cross-linking agent. Cross-linking agents may have one or more functional groups and, typically, have two or more functional groups (e.g. di-, tri-, tetra-, etc. functional cross-linking agents). In certain embodiments, the functional groups may be present at both ends of the cross-linking agent, forming branched polymerization, whereby the cross-linking agent may react with two or more polymers. In certain embodiments, a 2D product is formed with a monofunctional cross-linking agent and a 3D product is formed with a multifunctional cross-linking agent.

In embodiments, the morphology of a functional and/or functional precursor product (e.g. 3D printed product) may depend on the concentration (e.g. amount) of cross-linking agent. The concentration of the cross-linking agent may control the rate at which a polymer network forms. In one embodiment, when the cross-linking agent concentration is high, the rate at which the monomers form polymer networks (e.g. branched polymerization) are high. High rates of polymer network formation may limit the diffusion of slower reacting or non-polymerizing components and provide more uniform compositions such as composites. Conversely, in other embodiments, when cross-linking agent concentrations are low and the rates of polymer network formations are low, slower polymerizing monomers or non-polymerizing components (e.g. silver salt, nanoparticles, etc.) can diffuse towards areas where their solubilities are higher. Their solubilities may be higher towards the surface of the printed product, where the polymer concentration is low and the monomer concentration is high. Therefore, formulations with low cross-linking agent concentrations may lead to printed products (e.g. objects) where the slower polymerizing monomer or non-polymerizing component forms a coating. In other embodiments, intermediate cross-linking agent concentrations can generate graded compositions in the products. In embodiments, therefore, the morphology of the functional and/or functional precursor product can be a function of cross-linking agent concentrations in compositions (e.g. substantially homogeneous compositions or substantially homogeneous mixtures) containing non-polymerizing functional and/or functional precursor components.

In embodiments, the amount of functional and/or functional precursor component at the surface of the functional and/or functional precursor product decreases with increased concentration of cross-linking agent. The concentration of functional and/or functional precursor component at the surface can determine the resistance value of the printed product. As the concentration of cross-linking agent increases, the resistance of the functional and/or functional precursor component at the surface (e.g. coating) increases in view of the lower concentration of the functional and/or functional precursor component at the surface.

In embodiments, the cross-linking agent is a radical reactive cross-linking agent. Examples of the radical reactive cross-linking agent include a methacrylic compound, an acrylic compound, a vinyl compound, and an allyl compound. Examples of suitable cross-linking agents which can be used to form polyacrylates include 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, and diacrylic urethane oligomers (reaction products of isocyanate terminate polyol and 2-hydroethylacrylate). Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di(trimethylolpropane) tetraacrylate, and ethoxylated pentaerythritol tetraacrylate. Examples of pentaacrylates include dipentaerythritol pentaacrylate and pentaacrylate ester. Other examples of cross-linking agents include: ethylene glycol di(meth)acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth) acrylate, EO modified trimethylolpropane tri(meth)acrylate, PO modified trimethylolpropane tri(meth) acrylate, tripropylene glycol di(meth)acrylate, neopentyl glycol di(meth)acrylate, both terminal (meth)acrylic acid adduct of bisphenol A diglycidyl ether, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa(meth)acrylate, dipentaerythritolpenta(meth)acrylate, dipentaerythritol tetra(meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N, N'-methylenebisacrylamide, N, N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, triethylene glycol dithiol, and combinations thereof.

With respect to the amount of the at least one polymer that may be used in embodiments, any suitable amount may be used. One embodiment includes from about 10% to about 99.9% by weight based on the weight of the product. In some embodiments, the amount is from about 20% to about 99.9% by weight, from about 30% to about 99.9% by weight, from about 40% to about 99.9% by weight, from about 50% to about 99.9% by weight, from about 60% to about 99.9% by weight, from about 70% to about 99.9% by weight, or from about 80% to about 99.9% by weight based on the weight of the product.

With respect to the at least one first component, in embodiments, the at least one first component is substantially soluble in the at least one polymerizable component and is substantially insoluble when the at least one polymerizable component polymerizes. The at least one first component may be selected from the group consisting of functional monomers, functional polymers, metal precursors, carbon nanotubes (CNT), graphene, metal alloy precursors, metalloid precursors, and combinations thereof.

In embodiments, the at least one first component is at least one functional monomer. The at least one functional monomer may be fluorinated monomers such as, and without being limited thereto, fluorinated methacrylates. The fluorinated functional monomers may contribute hydrophobic properties to the functional product. In embodiments utilizing the functional monomer, the at least one polymerizable component is selectively polymerized (e.g. temperature/wavelength used) without substantially polymerizing the at least one functional monomer such that, for example, the functional monomer and the at least one polymer form at least two phases. In embodiments, the functional monomer may polymerize somewhat with the at least one polymerizable component; however, at least two phases form.

In other embodiments, the at least one first component may be at least one functional polymer such as, and without being limited thereto, PEG. In embodiments utilizing the functional polymer, the at least one polymerizable component is polymerized such that, for example, the functional polymer and the at least one polymer form at least two phases.

In embodiments, the at least one first component is selected from the group consisting of metal salts, metal coordination compounds, organometallic compounds, organometalloid compounds, and combinations thereof. In typical embodiments, the at least one first component is selected from the group consisting of metal salts, metalloid salts, and combinations thereof. In certain embodiments, the at least one first component is selected from the group consisting of metal carboxylates, metalloid carboxylates, and combinations thereof. The metal carboxylates may comprise from 1 to 20 carbon atoms, from 6 to 15 carbon atoms, or from 8 to 12 carbon atoms. The carboxylate group of the metal carboxylates may be an alkanoate. Examples of the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof.

With respect to the metal precursors: the metal ion may be selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $NO^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $OS^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ir$, $Ni^{3+}$, $Ni^{2+}$, $Ni^+$, $Ni$, $Pd^{4+}$, $Pd^{2+}$, $Pd^+$, $Pd$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Zn$, $Cd^{2+}$, $Cd^+$, $Hg^{4+}$, $Hg^{2+}$, $Hg^+$, $B^{3+}$, $B^{2+}$, $B^+$, $Al^+$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Ge$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$ and alloys of any of the foregoing.

The at least one first component used in the method may be selected amongst nanoparticles and/or microparticles of at least one first component described herein. In certain embodiments, the nanoparticles and/or microparticles may be metal precursors such as metal ions, metal salts, metal oxides, and/or metal complexes which may be convertible to metal. More broadly, the at least one first component may be any suitable inorganic particle that can separate into at least two phases from the at least one polymer, including nanoparticles and/or microparticles.

In some embodiments, the nanoparticles or microparticles are composed of a metal or combinations of metals selected from metals of Groups IIA, IIIA, IIIB, IVB, VB, VIB, VIIB, VIIIB, IB or IIB of block d of the Periodic Table of Elements. In other embodiments, the metallic nanoparticles or microparticles are selected from Ba, Al, Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Al, Sn, In, Ga, Ir, and combinations thereof. In some other embodiments, the metallic nanoparticles or microparticles are selected from Ba, Al, Cu, Ni, Ag, Au, Pt, Pd, Al, Fe, Co, Ti, Zn, In, Sn, Ga and combinations thereof. In yet other embodiments, the metallic nanoparticles or microparticles are selected from Al, Cu, Ni, Ti, Zn, Ag, and combinations thereof.

In some embodiments, the metallic nanoparticles or microparticles are selected from Ag, Cu, and Ag and Cu nanoparticles. In other embodiments, the metallic nanoparticles or microparticles are Ag nanoparticles. In some embodiments, the at least one first component is a metal precursor selected to be convertible in-situ into a metal by a chemical or electrochemical process. The metal precursor may also be reduced into corresponding metal by reduction of the metal precursor in the presence of, for example, a suitable photoinitiator and a radiation source, a reducing agent (e.g. oxazolines such as 2-methyl-2-oxazoline, 2-ethyl-2-oxazoline, etc.), etc. Thus, in some embodiments, the metal precursor is selected to be convertible into any one of the metals recited hereinabove. In some embodiments, the metal precursor is a salt form of any one metal recited hereinabove.

In some embodiments, the metal salt is comprised of an inorganic or organic anion and an inorganic or organic cation. In some embodiments, the anion is inorganic. Non-limiting examples of inorganic anions include $HO^-$, $F^-$, $Cl^-$, $Br^-$, $I^-$, $NO_2^-$, $NO_3^-$, $ClO_4^-$, $SO_4^{2-}$, $SO_3^-$, $PO_4^-$ and $CO_3^{2-}$. In some embodiments, the anion is organic. Non-limiting examples of organic anions include acetate ($CH_3COO^-$), formate ($HCOO^-$), citrate ($C_3H_5O(COO)_3$ acetylacetonate, lactate ($CH_3CH(OH)COO^-$), oxalate ($(COO)_2^{-2}$) and any derivative of the aforementioned. In some embodiments, the metal salt is not a metal oxide. In some embodiments, the metal salt is a metal oxide. In some embodiments, the metal salt is a salt of copper. Non-limiting examples of copper metal salts include copper formate, copper citrate, copper acetate, copper nitrate, copper acetylacetonate, copper perchlorate, copper chloride, copper sulfate, copper carbonate, copper hydroxide, copper sulfide or any other copper salt and the combinations thereof.

In some embodiments, the metal salt is a salt of nickel. Non-limiting examples of nickel metal salts include nickel formate, nickel citrate, nickel acetate, nickel nitrate, nickel acetylacetonate, nickel perchlorate, nickel chloride, nickel sulfate, nickel carbonate, nickel hydroxide or any other nickel salts and the combinations thereof.

In some embodiments, the metal salt is a salt of silver. Non-limiting examples of silver metal salts include silver carboxylates, silver lactate, silver nitrate, silver formate or any other silver salt and their mixtures. Typically, silver carboxylates may be used and comprise a silver ion and an organic group containing a carboxylate group. The carboxylate group may comprise from 1 to 20 carbon atoms, typically from 6 to 15 carbon atoms, more typically from 8 to 12 carbon atoms, for example 10 carbon atoms. The carboxylate group is typically an alkanoate. Some non-limiting examples of preferred silver carboxylates are silver ethylhexanoate, silver neodecanoate, silver benzoate, silver phenylacetate, silver isobutyrylacetate, silver benzoylacetate, silver oxalate, silver pivalate and any combinations thereof. In a typical embodiment, silver neodecanoate is used.

In other embodiments, the metal salt is selected from indium(III) acetate, indium(III) chloride, indium(III) nitrate; iron(II) chloride, iron(III) chloride, iron(II) acetate, gallium (III) acetylacetonate, gallium(II) chloride, gallium(III) chloride, gallium(III) nitrate; aluminum(III) chloride, aluminum (III) stearate; silver nitrate, silver chloride; dimethlyzinc, diethylzinc, zinc chloride, tin(II) chloride, tin(IV) chloride, tin(II) acetylacetonate, tin(II) acetate; lead(II) acetate, lead (II) acetylacetonate, lead(II) chloride, lead(II) nitrate and PbS.

In other embodiments, the at least one first component is selected from metal oxides such as those mentioned above, including nanoparticles and/or microparticles. In certain embodiments, the metal oxides are selected from alumina, silica, barium titanate, transition metal oxides (e.g. zinc oxide, titanium oxide), and combinations thereof.

In other embodiments, the at least one first component is selected from nanowires, microparticles, nanoparticles, or combinations thereof, including any of the suitable at least one first component mentioned herein. In still other embodiments, the at least one first component comprises graphene.

With respect to the amount of the at least one first component, the amount of the at least one first component may be any suitable amount. For example, the amount may be from about 0.1% to about 90% by weight based on the weight of the product. In some embodiments, the amount of the at least one first component in the product may be from about 0.1% to about 80% by weight, from about 0.1% to about 70% by weight, from about 0.1% to about 60% by weight, from about 0.1% to about 50% by weight, from about 0.1% to about 40% by weight, from about 0.1% to about 30% by weight, or from about 0.1% to about 20% by weight based on the weight of the product.

In an embodiment, the second phase of the product is a coating. In another embodiment, the first phase is a core. In embodiments, the product comprises at least about 0.1% by weight of the at least one first component, or at least about 1% by weight of the at least one first component, or at least about 3% by weight of the at least one first component, or at least about 5% by weight of the at least one first component, or at least about 7% by weight of the at least one first component, or at least about 10% by weight of the at least one first component, or at least about 15% by weight of the at least one first component, or at least about 20% by weight of the at least one first component, or at least about 25% by weight of the at least one first component, or at least about 30% by weight of the at least one first component, based on the total weight of the product. In typical embodiments, the product comprises about 0.1 wt % to about 30 wt % by weight of the at least one first component, or about 3 wt % to about 25 wt % by weight of the at least one first component, or about 5 wt % to about 20 wt % by weight of the at least one first component, or about 5 wt % to about 15 wt % by weight of the at least one first component, based on the total weight of the product. In typical embodiments, the product comprises a functional material. The functional material may be a functionally graded material (FGM). The FGM may be a functionally graded composite material (FGCM).

The product may be any suitable structure. The product may be a 3D- or 2D-product. In embodiments, the product is a film or a 3D-product. The product may have any desired geometry (e.g. shape). Various 3D structures and functional high aspect ratio coatings and functional patterns in devices, such as sensors, optoelectronic devices, solar cells, electrodes, RFID tags, antennas, electroluminescent devices, power sources and connectors for circuit boards may be fabricated. The product may have at least one functional property selected from the group consisting of chemical properties, mechanical properties, magnetic properties, optical properties, protective properties (e.g. towards heat, radiation, mechanical abrasion), properties, electrical properties, electrochemical, catalytic properties, and combinations thereof. In other embodiments, the product is at least one of stretchable, flexible, lightweight, porous, conductive, non-conductive, surface durable, increased surface area, hydrophobic, biocompatible, anti-bacterial, mould resistant, wear-resistant, heat resistant, cold resistant, improved surface properties (antifouling), reduce flame retardancy, and combinations thereof. In typical embodiments, the surface of the functional product (e.g. coating itself, coating of 3D-product, etc.) imparts the product with the functionality. In embodiments, the product is multifunctional and/or is a precursor product that is a precursor to a multifunctional product. The product may be used for various applications, including metal/semiconductor, catalysis, sensing, electrochemical detection, EMI shielding, actuators and energy devices. In embodiments, the product is conductive. The product may be selected to be any suitable conductivity (e.g. resistance). For example, it may have a conductivity of at least about 1 Ω/cm; at least about 2 Ω/cm; at least about 5 Ω/cm; at least about 10 Ω/cm; at least about 15 Ω/cm; or at least about 20 Ω/cm. In other examples, the conductivity may be from about 1 to about 50 Ω/cm; from about 2 to about 50 Ω/cm; from about 5 to about 50 Ω/cm; from about 10 to about 50 Ω/cm; from about 15 to about 50 Ω/cm; from about 20 to about 50 Ω/cm; from about 1 to about 40 Ω/cm; from about 2 to about 40 Ω/cm; from about 5 to about 40 Ω/cm; from about 10 to about 40 Ω/cm; from about 15 to about 40 Ω/cm; from about 20 to about 40 Ω/cm; from about 1 to about 30 Ω/cm; from about 2 to about 30 Ω/cm; from about 5 to about 30 Ω/cm; from about 10 to about 30 Ω/cm; from about 15 to about 30 Ω/cm; from about 20 to about 30 Ω/cm; from about 1 to about 25 Ω/cm; from about 2 to about 25 Ω/cm; from about 5 to about 25 Ω/cm; from about 10 to about 25 Ω/cm; from about 15 to about 25 Ω/cm; from about 20 to about 25 Ω/cm; from about 10 to about 23 Ω/cm; or about 18 to about 23 Ω/cm.

In embodiments, there is provided a device comprising the product described herein. The device may be an electronic device. The electronic device may be selected from a conductor, a semiconductor, a thin film transistor, an electrode, photocell, circuit, and combinations thereof.

In embodiments, there is provided an article comprising the product described herein. The article may be wearable. The article may be a textile. The article may be a fibre, jewelry, ceramics, and the like.

The product described herein may be used for any one of catalysis, sensing, electrochemical detection, EMI shielding, actuators and energy devices.

Formulations

In embodiments, there is provided a formulation for making a product. The formulation comprises a composition (e.g. substantially homogeneous composition or substantially homogeneous mixture) having at least one first component and at least one polymerizable component. The at least one polymerizable component is polymerizable to form at least one polymer, wherein at least two phases are formed from the at least one first component and the at least one polymer. The at least one first component comprises at least one functional component, at least one functional precursor component, or combinations thereof. The product is a functional product, a functional precursor product, or a combination of a functional and functional precursor product.

In an embodiment, the at least one first component comprises at least one functional component and the product is the functional product. In another embodiment, the at least one first component comprises at least one functional precursor component and the product is the functional precursor product. In a further embodiment, the at least one first component comprises at least one functional component and at least one functional precursor component and the product is the combination of the functional and functional precursor product.

In embodiments, the product formed from the formulation comprises: i) a first phase comprising at least one polymer and ii) a second phase comprising at least one first component. The at least one first component comprises at least one functional component, at least one functional precursor component, or combinations thereof. The product is a functional product, a functional precursor product, or a combination of a functional and functional precursor product. In additional embodiments, it is understood that the first phase may further comprise other component(s), such as a first component (e.g. same or different from the first component in the second phase). It is similarly understood that the second phase may further comprise other component(s), such as a polymer (e.g. same or different from the polymer in the first phase). In typical embodiments, the first component in the first phase is the same as the first component in the second phase and/or the polymer in the first phase is the same as the polymer in the second phase. With respect to these above described embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one area of the product to another area of the product, whereby the concentration of the first component increases from the first phase to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) the first and second phases form a gradient; 4) one phase comprises a composite and another comprises a composite (e.g. similar or different); or 5) one phase comprises a composite and another comprises a coating.

In other embodiments, a product formed from the formulation comprises: i) a first phase comprising at least one polymer; ii) a second phase comprising at least one first component; and iii) an interface between the first phase and the second phase. The interface has a concentration gradient of the at least one first component, whereby the concentration of the at least one first component decreases with distance away from the second phase towards the first phase. The at least one first component comprises at least one functional component, at least one functional precursor component, or combinations thereof. The product is a functional product, a functional precursor product, or a combination of a functional and functional precursor product. In additional embodiments, it is understood that the first phase may further comprise other component(s), such as a first component (e.g. same or different from the first component in the second phase). It is similarly understood that the second phase may further comprise other component(s), such as a polymer (e.g. same or different from the polymer in the first phase). In typical embodiments, the first component in the first phase is the same as the first component in the second phase and/or the polymer in the first phase is the same as the polymer in the second phase. With respect to these embodiments, i) the concentration of the polymer may be higher compared to the concentration of the first component in the first phase; and ii) the concentration of the polymer may be lower compared to the concentration of the first component in the second phase. In these embodiments, the phases can form a concentration gradient from one area of the product to another area of the product, whereby the concentration of the first component increases from the first phase, through the interface, to the second phase. Each of the phases described herein may comprise concentration gradients, composites, and/or coatings. For example, 1) one phase comprises a gradient and another phase comprises a composite; 2) one phase comprises a gradient and another phase comprises a coating; 3) one phase comprises a composite and another comprises a composite (e.g. similar or different); or 4) one phase comprises a composite and another comprises a coating.

In embodiments, the formulation is capable of being sintered to form the product, pyrolyzed to form the product, or sintered and pyrolyzed to form the product. In more specific embodiments, sintering is thermal sintering, UV-VIS radiation sintering, laser sintering or any combination thereof. In typical embodiments, minimum thermal sintering temperatures are selected based on a minimum temperature for converting the functional precursor to the functional product. Maximum thermal sintering temperatures may be selected based on a maximum temperature that the functional precursor and/or the functional product may be heated to without causing substantive decomposition or degradation. With respect to thermal sintering, the temperature ranges include, but are not limited thereto, from about 50° C.

to about 300° C., or about 50° C. to about 280° C., or about 100° C. to about 280° C., or about 100° C. to about 270° C., or about 150° C. to about 280° C., or about 160° C. to about 270° C., or about 180° C. to about 250° C., or about 230° C. to about 250° C. Thermal sintering may occur under air or under inert condition(s), such as nitrogen. Thermal sintering may be performed for a time in ranges of about 15 minutes to about 180 minutes, or about 30 minutes to about 120 minutes, or about 45 minutes to about 60 minutes. In typical embodiments, sintering occurs under nitrogen with about 500 ppm oxygen. With respect to UV-VIS radiation sintering, sintering energies may range from about 1 J/cm$^2$ to about 30 J/cm$^2$, or about 2 J/cm$^2$ to about 10 J/cm$^2$, or about 2.5 J/cm$^2$ to about 5 J/cm$^2$, or about 2.4 J/cm$^2$ to about 3.1 J/cm$^2$. In certain embodiments, the pulse widths are about 500 μs to about 5000 μs, or about 1000 μs to about 4000 μs, or about 2500 μs to about 3000 μs. In typical embodiments, UV-VIS radiation sintering occurs under air. With respect to pyrolyzing, the temperature ranges include, but are not limited thereto, from about 350° C. to about 1200° C., or about 400° C. to about 900° C., or about 600° C. to about 800° C., or about 700° C. to about 800° C. Pyrolyzing may be performed for a time in a range of about 1 to about 60 minutes. Pyrolyzing may occur under air or under inert condition(s), such as nitrogen.

In another embodiment, the at least one functional precursor component is capable of being converted into at least one second functional component. In an embodiment, the at least one second functional component is different from the at least one functional component. In another embodiment, the at least one second functional component is the same as the at least one functional component. In embodiments, the at least one functional precursor component is capable of being converted into at least one second functional component via sintering and/or pyrolyzing, for example, as described above. In some embodiments, the at least one functional precursor component is capable of being converted into at least one second functional component via sintering. The sintering may be at least one of thermal sintering, UV-VIS radiation sintering, and laser sintering. In embodiments, sintering may occur during or after printing.

In another embodiment, the product has two phases. The two phases comprise a first phase and a second phase. The first phase has the at least one polymer and the second phase has at least one first component. In still another embodiment, the product has three phases. The three phases comprise a first phase, a second phase, and a third phase. The first phase has the at least one polymer, the second phase has the at least one polymer and the at least one first component, and the third phase has the at least one first component. In other embodiments, the product can have a concentration gradient. Moreover, in various embodiments, at least one of the phases is a composite.

In embodiments, thicknesses of the phase(s) having the at least one first component may be from about 10 nm to about 1000 μm, or from about 100 nm to about 1000 μm, or from about 10 nm to about 500 μm, or from about 100 nm to about 500 μm, or from about 100 nm to about 50 μm, or from about 500 nm to about 50 μm, or from about 500 nm to about 10 μm, or from about 500 nm to about 2 μm. Such phase(s) may be coating(s), in typical embodiments, the coating(s) may have thicknesses from about 10 nm to about 100 μm, from about 10 nm to about 50 μm, from about 10 nm to about 20 μm, from about 100 nm to about 50 μm, from about 100 nm to about 20 μm, from about 100 nm to about 10 μm, or from about 100 nm to about 1 μm.

With respect to the at least one polymerizable component, polymerizing may be achieved by exposing the composition (e.g. substantially homogeneous composition or substantially homogeneous mixture) to a radiation and/or a heat source capable of initiating polymerization of the at least one polymerizable component. The radiation and/or heat source may be selected from a UV-Vis source, a laser, an electron beam, a gamma-radiation, an IR (heat) source, LED, microwave radiation, plasma and thermal treatment.

In embodiments, the polymerizing may comprise photopolymerization (e.g. photoinduced polymerization). In embodiments, the composition (e.g. substantially homogeneous composition or substantially homogeneous mixture) further comprises at least one photoinitiator. In another embodiment, the composition (e.g. substantially homogeneous composition or substantially homogeneous mixture) comprises at least one polymerizable component, which includes at least one cross-linking agent. This embodiment may also comprise a photoinitator. Polymerization may also occur via free-radical polymerization without a photoinitiator.

The at least one polymerizable component may be polymerized via 3D printing. In an embodiment, the 3D printing uses photoactivation and may be selected from stereolithographic (SLA) printing, digital light processing (DLP), or volumetric printing. In embodiments, a coating of the at least one first component is formed during the printing stage.

In embodiments, the at least one first component phase can separate and migrate towards an area where the concentration of the at least one polymerizable component is greater. In an embodiment, the at least one first component forms a coating. In other embodiments, the product comprises a core and a coating. The core comprises the at least one polymer and the coating comprises the at least one first component. In further embodiments, between the at least one polymer and the at least one first component is an interface having a concentration gradient of the at least one first component, wherein a concentration of the at least one first component decreases with distance away from a surface of the product towards the polymer core. In yet another embodiment, with increasing volume of the product, the thickness of the coating increases.

In embodiments, the product comprises at least about 0.1% by weight of the at least one first component, or at least about 1% by weight of the at least one first component, or at least about 3% by weight of the at least one first component, or at least about 5% by weight of the at least one first component, or at least about 7% by weight of the at least one first component, or at least about 10% by weight of the at least one first component, or at least about 15% by weight of the at least one first component, or at least about 20% by weight of the at least one first component, or at least about 25% by weight of the at least one first component, or at least about 30% by weight of the at least one first component, based on the total weight of the product. In typical embodiments, the product comprises about 0.1 wt % to about 30 wt % by weight of the at least one first component, or about 3 wt % to about 25 wt % by weight of the at least one first component, or about 5 wt % to about 20 wt % by weight of the at least one first component, or about 5 wt % to about 15 wt % by weight of the at least one first component, based on the total weight of the product. In typical embodiments, the product comprises a functional material. The functional material may be a functionally graded material (FGM). The FGM may be a functionally graded composite material (FGCM).

With respect to the amount of the at least one polymerizable component that may be used in embodiments, any suitable amount can be used. One embodiment includes from about 10% to about 99% by weight based on the weight of the composition (e.g. substantially homogeneous composition or substantially homogeneous mixture). In some embodiments, the amount is from about 20% to about 99% by weight, from about 30% to about 99% by weight, from about 40% to about 99% by weight, from about 50% to about 99% by weight, from about 60% to about 99% by weight, from about 70% to about 99% by weight, or from about 80% to about 99% by weight based on the weight of the composition (e.g. substantially homogeneous composition or substantially homogeneous mixture).

The product may be any suitable structure/object. The product may be a 3D- or 2D-product. The product may have one or more phases. In embodiments, the product is a film or a 3D-product. The product may have any desired geometry (e.g. shape). Various 3D structures and functional high aspect ratio coatings and functional patterns in devices, such as sensors, optoelectronic devices, solar cells, electrodes, RFID tags, antennas, electroluminescent devices, power sources and connectors for circuit boards may be fabricated. The product may have at least one functional property selected from the group consisting of chemical properties, mechanical properties, magnetic properties, optical properties, insulating or protective properties (e.g. towards heat, radiation, mechanical abrasion), properties, electrical properties, electrochemical, catalytic properties, and combinations thereof. In other embodiments, the product is at least one of stretchable, flexible, lightweight, porous, conductive, non-conductive, surface durable, increased surface area, hydrophobic, biocompatible, anti-bacterial, mould resistant, wear-resistant, heat resistant, cold resistant, improved surface properties (antifouling), reduce flame retardancy, and combinations thereof. In typical embodiments, the surface of the functional product (e.g. coating itself, coating of 3D-product, etc.) imparts the product with the functionality. In embodiments, the product is multifunctional and/or is a precursor product that is a precursor to a multifunctional product. The product may be used for various applications, including metal/semiconductor, catalysis, sensing, electrochemical detection, EMI shielding, actuators and energy devices.

In embodiments, the product is conductive. The product may be selected to be any suitable conductivity. For example, it may have a conductivity (e.g. resistance) of at least about 1 $\Omega$/cm; at least about 2 $\Omega$/cm; at least about 5 $\Omega$/cm; at least about 10 $\Omega$/cm; at least about 15 $\Omega$/cm; or at least about 20 $\Omega$/cm. In other examples, the conductivity may be from about 1 to about 50 $\Omega$/cm; from about 2 to about 50 $\Omega$/cm; from about 5 to about 50 $\Omega$/cm; from about 10 to about 50 $\Omega$/cm; from about 15 to about 50 $\Omega$/cm; from about 20 to about 50 $\Omega$/cm; from about 1 to about 40 $\Omega$/cm; from about 2 to about 40 $\Omega$/cm; from about 5 to about 40 $\Omega$/cm; from about 10 to about 40 $\Omega$/cm; from about 15 to about 40 $\Omega$/cm; from about 20 to about 40 $\Omega$/cm; from about 1 to about 30 $\Omega$/cm; from about 2 to about 30 $\Omega$/cm; from about 5 to about 30 $\Omega$/cm; from about 10 to about 30 $\Omega$/cm; from about 15 to about 30 $\Omega$/cm; from about 20 to about 30 $\Omega$/cm; from about 1 to about 25 $\Omega$/cm; from about 2 to about 25 $\Omega$/cm; from about 5 to about 25 $\Omega$/cm; from about 10 to about 25 $\Omega$/cm; from about 15 to about 25 $\Omega$/cm; from about 20 to about 25 $\Omega$/cm; from about 10 to about 23 $\Omega$/cm; or about 18 to about 23 $\Omega$/cm.

In embodiments, the at least one polymer has a weight average molecular weight of about 10,000 to about 10,000,000, or about 10,000 to about 5,000 000, or about 10,000 to about 1,000,000, or about 50,000 to about 1,000,000, or about 50,000 to about 500,000. It is understood that the weight average molecular weight may approach infinity and includes cross-linked polymeric network(s).

With respect to the at least one polymerizable component, it may comprise at least one monomer and/or at least one oligomer. The at least one polymerizable component may comprise at least one liquid monomer and/or at least one liquid oligomer. In a certain embodiment, the at least one polymerizable component comprises at least one resin. Some examples include resins based on epoxies, vinyl ethers, acrylates, urethane-acrylates, methacrylates, acrylamides, thiol-ene based resins, styrene, siloxanes, silicones, and any functionalized derivatives thereof (e.g. fluorinated methacrylates, PEG-functionalized methacrylates or epoxies). The at least one resin may comprise at least one commercial resin. In particular, typical examples of the at least one resin comprises at least one commercial resin for 3D printing such as, and without being limited thereto, 3D printing via photoactivation (e.g. stereolithographic (SLA) printing, digital light processing (DLP), or volumetric printing). In further embodiments, the at least one resin may comprise at least one acrylate based-resin. The monomer resins may be elastomers or pre-ceramic polymers.

In embodiments, the monomers and oligomers are selected according to their physico-chemical and chemical properties, such as monomer viscosity and/or surface tension, and/or polymer elasticity and/or hardness, number of polymerizable groups, and according to the printing method and the polymerization reaction type, e.g., the radiation source or heat source of choice. With respect to elasticity or hardness, some embodiments include modulus value ranges of from about 0.1 MPa to about 8000 MPa. In some embodiments, the monomers are selected from acid containing monomers, acrylic monomers, amine containing monomers, cross-linking acrylic monomers, dual reactive acrylic monomers, epoxides/anhydrides/imides, fluorescent acrylic monomers, fluorinated acrylic monomers, high or low refractive index monomers, hydroxy containing monomers, mono and difunctional glycol oligomeric monomers, styrenic monomers, vinyl and ethenyl monomers. In some embodiments, the monomers can polymerize to yield conductive polymers such as polypyrole and polyaniline. In some embodiments, the at least one monomer is selected from dipentaerythnitol hexaacrylate (DPHA) and trimethylolpropane triacrylate (TMPTA). In some embodiments, the at least one oligomer is selected from the group consisting of acrylates and vinyl containing molecules.

In other embodiments, the monomer can be any monomeric compound having a functional group, such as an activatable photopolymerizable group (photoinduced polymerization) that can propagate, for example, carbon-carbon, carbon-oxygen, carbon-nitrogen, or carbon-sulfur bond formation. In certain embodiments, the monomer is selected from mono-functional monomers (e.g. monomers with one functional group). During polymerization, the radical of the monofunctional monomer is formed and it will react with other monomers present to form oligomers and polymers. The resultant oligomers and polymers can have different properties depending on its structure. Some monomers may be selected depending on their flexibility, viscosity, curing rate, reactivity or toxicity. In one embodiment, the monomer is polymerized to form a polyacrylate such as polymethylmethacrylate, an unsaturated polyester, a saturated polyester, a polyolefin (polyethylenes, polypropylenes, polybutylenes, and the like), an alkyl resin, an epoxy polymer, a polyamide, a polyimide, a polyetherimide, a polyamideimide, a polyesterimide, a polyesteramideimide, polyurethanes, polycarbonates, polystyrenes, polyphenols, polyvinylesters, polysilicones, polyacetals, cellulose acetates, polyvinylchlorides, polyvinylacetates, polyvinyl alcohols polysulfones, polyphenylsulfones, polyethersulfones, polyketones, polyetherketones, poyletheretherketones, polybenzimidazoles, polybenzoxazoles, polybenzthiazoles, polyfluorocarbones, polyphenylene ethers, polyarylates, cyanate ester polymers, polystyrenes, polyacrylamide, polyvinylethers, copolymers of two or more thereof, and the like. In other embodiments, polyacrylates include polyisobornylacrylate, polyisobornylmethacrylate, polyethoxyethoxyethyl acrylate, poly-2-carboxyethylacrylate, polyethylhexylacrylate, poly-2-hydroxyethylacrylate, poly-2-phenoxyethylacrylate, poly-2-phenoxyethylmethacrylate, poly-2-ethylbutylmethacrylate, poly-9-anthracenylmethylmethacrylate, poly-4-chlorophenylacrylate, polycyclohexylacrylate, polydicyclopentenyloxyethyl acrylate, poly-2-(N,N-diethylamino)ethyl methacrylate, poly-dimethylaminoeopentyl acrylate, poly-caprolactone 2-(methacryloxy)ethylester, and polyfurfurylmethacrylate, poly(ethylene glycol)methacrylate, polyacrylic acid and poly(propylene glycol)methacrylate.

Monomers that may be used, for example, include acrylic monomers such as monoacrylics, diacrylics, triacrylics, tetraacrylics, pentacrylics, etc. Examples of other monomers include ethyleneglycol methyl ether acrylate, N,N-diisobutyl-acrylamide, N-vinyl-pyrrolidone, (meth)acryloyl morpholine, 7-amino-3,7-dimethyloctyl, (meth)acrylate, isobutoxymethyl (meth) acrylamide, isobornyloxyethyl (meth)acrylate, isobornyl (meth)acrylate, 2-ethylhexyl acrylate, 2-ethylhexyl (meth)acrylate, ethyldiethylene glycol (meth)acrylate, t-octyl (meth)acrylamide, diacetone (meth) acrylamide, dimethylaminoethyl (meth)acrylate, diethylaminoethyl (meth) acrylate, lauryl (meth)acrylate, dicyclopentadiene (meth)acrylate, dicyclopentenyloxyethyl (meth) acrylate, dicyclopentenyl (meth)acrylate, N,N-dimethyl (meth)acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl(meth)acrylate, 2-tribromophenoxyethyl (meth)acrylate, 2-hydroxyethyl (meth) acrylate, 2-hydroxypropyl (meth)acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth)acrylate, alkoxylated alkyl phenol acrylate, (poly)caprolactone acrylate ester from methylol-tetrahydrofuran, (poly)caprolactone acrylate ester from alkylol-dioxane, ethylene glycol phenyl ether acrylate, and methacryloxypropyl terminated polydimethylsiloxane.

Other monomers that may be used, for example, include epoxide monomers such as 3,4-epoxyclyclohexylmethyl 3,4-epoxycylcohexanecarboxylate, and/or epoxycyclohexylethyl terminated polydimethylsiloxane.

With respect to the amount of the at least one monomer that may be used in embodiments, any suitable amount can be used depending on the desired functional and/or functional precursor product. One embodiment includes from about 1% to about 90% by weight of the at least one monomer based on the weight of the composition without the at least one first component. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the composition without the at least one first component.

With respect to the amount of the at least one monomer that may be used in embodiments based on the weight of the at least one polymerizable component itself, includes from about 1% to about 90% by weight of the at least one monomer. In some embodiments, the amount is from about 1% to about 85% by weight, from about 1% to about 80% by weight, from about 1% to about 75% by weight, from about 5% to about 90% by weight, from about 10% to about 90% by weight, from about 15% to about 90% by weight, from about 20% to about 90% by weight, from about 25% to about 90% by weight, from about 35% to about 90% by weight, from about 40% to about 90% by weight, from about 45% to about 90% by weight, from about 5% to about 80% by weight, from about 10% to about 80% by weight, from about 15% to about 80% by weight, from about 20% to about 80% by weight, or from about 50% to about 80% by weight based on the weight of the at least one polymerizable component.

In other embodiments, the at least one polymerizable component comprises or further comprises at least one ceramic precursor.

With respect to the at least one cross-linking agent, the at least one polymerizable component comprises at least one cross-linking agent or comprises at least one monomer/oligomer and at least one cross-linking agent. Cross-linking agents may have one or more functional groups and, typically, have two or more functional groups (e.g. di-, tri-, tetra-, etc. functional cross-linking agents). In certain embodiments, the functional groups may be present at both ends of the cross-linking agent, forming branched polymerization, whereby the cross-linking agent may react with two or more polymers. In certain embodiments, a 2D product is formed with a monofunctional cross-linking agent and a 3D product is formed with a multifunctional cross-linking agent.

In embodiments, the morphology of a functional and/or functional precursor product (e.g. 3D printed product) may depend on the concentration (e.g. amount) of cross-linking agent. The concentration of the cross-linking agent may control the rate at which a polymer network forms. In one embodiment, when the cross-linking agent concentration is high, the rate at which the monomers form polymer networks (e.g. branched polymerization) are high. High rates of polymer network formation may limit the diffusion of slower reacting or non-polymerizing components and provide more uniform compositions such as composites. Conversely, in other embodiments, when cross-linking agent concentrations are low and the rates of polymer network formations are low, slower polymerizing monomers or non-polymerizing components (e.g. silver salt, nanoparticles, etc.) can diffuse towards areas where their solubilities are higher. Their solubilities may be higher towards the surface of the printed product, where the polymer concentration is low and the monomer concentration is high. Therefore, formulations with low cross-linking agent concentrations may lead to printed products (e.g. objects) where the slower polymerizing monomer or non-polymerizing component forms a coating. In other embodiments, intermediate cross-linking agent concentrations can generate graded compositions in the products. In embodiments, therefore, the morphology of the functional and/or functional precursor product can be a function of cross-linking agent concentrations in compositions (e.g. substantially homogeneous compositions or substantially homogeneous mixtures) containing non-polymerizing functional and/or functional precursor components.

In embodiments, the amount of functional and/or functional precursor component at the surface of the functional and/or functional precursor product decreases with increased concentration of cross-linking agent. The concentration of functional and/or functional precursor component at the surface can determine the resistance value of the printed product. As the concentration of cross-linking agent increases, the resistance of the functional and/or functional precursor component at the surface (e.g. coating) increases in view of the lower concentration of the functional and/or functional precursor component at the surface.

With respect to the amount of the at least one cross-linking agent that may be used in embodiments, any suitable amount can be used depending on the desired functional and/or functional precursor product. For example, the amount of the at least one cross-linking agent can be used to tune the morphology of the functional and/or functional precursor product. One embodiment includes from about 10% to about 99% mol based on the mol of the composition without the at least one first component (e.g. total mol of cross-linking agent+monomer). In some embodiments, the amount is from about 80% to about 99% mol, from about 85% to about 99% mol, from about 90% to about 99% mol, from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 50% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition without the at least one first component.

In some embodiments, the functional and/or functional precursor product is a composite. The amount of the at least one crosslinking agent used to make the product is from about 80% to about 99% mol, from about 85% to about 99% mol, or from about 90% to about 99% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded and/or coated product. The amount of the at least one crosslinking agent used to make the product is from about 10% to about 80% mol, from about 10% to about 70% mol, from about 10% to about 60% mol, from about 10% to about 50% mol, from about 10% to about 40% mol, from about 10% to about 35% mol, from about 20% to about 80% mol, from about 25% to about 80% mol, from about 30% to about 80% mol, from about 35% to about 80% mol, from about 40% to about 80% mol, from about 45% to about 80% mol, from about 50% to about 80% mol, from about 55% to about 80% mol, from about 60% to about 80% mol, from about 65% to about 80% mol, from about 70% to about 80% mol, from about 35% to about 75% mol, from about 35% to about 70% mol, from about 35% to about 65% mol, from about 35% to about 60% mol, from about 35% to about 55% mol, from about 35% to about 50% mol, from about 15% to about 50% mol, from about 15% to about 45% mol, from about 15% to about 40% mol, or from about 15% to about 35% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded product. The amount of the at least one crosslinking agent used to make the product is from about 35% to about 80% mol, from about 35% to about 75% mol, from about 35% to about 65% mol, from about 35% to about 55% mol, from about 35% to about 50% mol, from about 40% to about 80% mol, from about 45% to about 80% mol, from about 50% to about 80% mol, from about 55% to about 80% mol, from about 60% to about 80% mol, from about 65% to about 80% mol, or from about 70% to about 80% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent.

In some embodiments, the functional and/or functional precursor product is a coated product. The amount of the at least one crosslinking agent used to make the product is less than about 35% mol, less than about 30% mol, less than about 25% mol, less than about 20% mol, less than about 15% mol, less than about 10% mol, from about 1% to about 35% mol, from about 1% to about 30% mol, from about 1% to about 25% mol, or from about 1% to about 20% mol based on the mol of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a composite. The amount of the at least one crosslinking agent used to make the product is from about 80% to about 99% by weight, from about 85% to about 99% by weight, or from about 90% to about 99% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded and/or coated product. The amount of the at least one crosslinking agent used to make the product is from about 10% to about 80% by weight, from about 10% to about 70% by weight, from about 10% to about 60% by weight, from about 10% to about 50% by weight, from about 10% to about 40% by weight, from about 10% to about 35% by weight, from about 20% to about 80% by weight, from about 25% to about 80% by weight, from about 30% to about 80% by weight, from about 35% to about 80% by weight, from about 40% to about 80% by weight, from about 45% to about 80% by weight, from about 50% to about 80% by weight, from about 55% to about 80% by weight, from about 60% to about 80% by weight, from about 65% to about 80% by weight, from about 70% to about 80% by weight, from about 35% to about 75% by weight, from about 35% to about 70% by weight, from about 35% to about 65% by weight, from about 35% to about 60% by weight, from about 35% to about 55% by weight, from about 35% to about 50% by weight, from about 15% to about 50% by weight, from about 15% to about 45% by weight, from about 15% to about 40% by weight, or from about 15% to about 35% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

In some embodiments, the functional and/or functional precursor product is a graded product. The amount of the at least one crosslinking agent used to make the product is from about 35% to about 80% by weight, from about 35% to about 75% by weight, from about 35% to about 65% by weight, from about 35% to about 55% by weight, from about 35% to about 50% by weight, from about 40% to about 80% by weight, from about 45% to about 80% by weight, from about 50% to about 80% by weight, from about 55% to about 80% by weight, from about 60% to about 80% by weight, from about 65% to about 80% by weight, or from about 70% to about 80% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent.

In some embodiments, the functional and/or functional precursor product is a coated product. The amount of the at least one crosslinking agent used to make the product is less than about 35% by weight, less than about 30% by weight, less than about 25% by weight, less than about 20% by weight, less than about 15% by weight, less than about 10% by weight, from about 1% to about 35% by weight, from about 1% to about 30% by weight, from about 1% to about 25% by weight, or from about 1% to about 20% by weight based on the by weight of the composition without the at least one first component. In other embodiments, the at least one cross-linking agent comprises at least one difunctional cross-linking agent. In other embodiments, the at least one cross-linking agent comprises at least one trifunctional cross-linking agent. In other embodiments, the at least one cross-linking agent comprises at least one tetrafunctional cross-linking agent. In a typical embodiment, the at least one cross-linking agent comprises at least one difunctional cross-linking agent.

With respect to the amount of the at least one cross-linking agent, based on the weight of the composition without the at least one first component, that may be used in embodiments, any suitable amount can be used. One embodiment includes from about 10% to about 99% by weight of the at least one cross-linking agent based on the weight of the composition without the at least one first component. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the composition without the at least one first component.

With respect to the amount of the at least one cross-linking agent that may be used in embodiments based on the weight of the at least one polymerizable component, includes from about 10% to about 99% by weight of the at least one cross-linking agent. In some embodiments, the amount is from about 15% to about 90% by weight, from about 15% to about 85% by weight, from about 15% to about 80% by weight, from about 15% to about 75% by weight, from about 20% to about 90% by weight, from about 30% to about 90% by weight, from about 35% to about 90% by weight, from about 45% to about 90% by weight, from about 50% to about 90% by weight, from about 55% to about 90% by weight, from about 60% to about 90% by weight, from about 30% to about 80% by weight, from about 35% to about 80% by weight, from about 40% to about 80% by weight, from about 45% to about 80% by weight, or from about 50% to about 80% by weight based on the weight of the at least one polymerizable component (e.g. resin).

In an embodiment, the at least one polymerizable component comprises from about 10% to about 99% by weight of at least one cross-linking agent based on the weight of the composition without the at least one first component. In another embodiment, the at least one polymerizable component comprises from about 15% to about 99% by weight of at least one cross-linking agent based on the weight of the composition without the at least one first component. In another embodiment, the at least one polymerizable component comprises from about 1% to about 90% by weight of at least one monomer and/or oligomer and from about 10% to about 99% by weight of at least one cross-linking agent based on the weight of the composition without the at least one first component. In another embodiment, the at least one polymerizable component comprises from about 1% to about 85% by weight of at least one monomer and/or oligomer and from about 15% to about 99% by weight of at least one cross-linking agent based on the weight of the composition without the at least one first component.

In embodiments, the cross-linking agent is a radical reactive cross-linking agent. Examples of the radical reactive cross-linking agent include a methacrylic compound, an acrylic compound, a vinyl compound, and an allyl compound. Examples of suitable cross-linking agents which can be used to form polyacrylates include 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, and diacrylic urethane oligomers (reaction products of isocyanate terminate polyol and 2-hydroethylacrylate). Examples of triacrylates which can be used to form polyacrylates include tris(2-hydroxyethyl)isocyanurate trimethacrylate, tris(2-hydroxyethyl)isocyanurate triacrylate, trimethylolpropane trimethacrylate, trimethylolpropane triacrylate and pentaerythritol triacrylate. Examples of tetracrylates include pentaerythritol tetraacrylate, di(trimethylolpropane) tetraacrylate, and ethoxylated pentaerythritol tetraacrylate. Examples of pentaacrylates include dipentaerythritol pentaacrylate and pentaacrylate ester. Other examples of cross-linking agents include: ethylene glycol di(meth)acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth) acrylate, EO modified trimethylolpropane tri(meth)acrylate, PO modified trimethylolpropane tri(meth) acrylate, tripropylene glycol di(meth)acrylate, neopentyl glycol di(meth)acrylate, both terminal (meth)acrylic acid adduct of bisphenol A diglycidyl ether, 1,4-butanediol di(meth)acrylate, 1,6-hexanediol di(meth)acrylate, pentaerythritol tri(meth)acrylate, pentaerythritol tetra(meth) acrylate, polyester di(meth)acrylate, polyethylene glycol di(meth)acrylate, dipentaerythritol hexa(meth)acrylate, dipentaerythritolpenta(meth)acrylate, dipentaerythritol tetra(meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl) propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis [4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, triethylene glycol dithiol, and combinations thereof.

With respect to the photoinitiators, in some embodiments, the radiation source employed for initiating the polymerization is selected based on the type of photoinitiator used. Generally, the photoinitiator is a chemical compound that decomposes into free radicals when exposed to light. There are a number of photoinitiators known in the art. For example, suitable photoinitiators include, but are not limited to, ethyl (2,4,6-trimethylbenzoyl) phenylphosphinate, 7-diethylamino-2-coumarin, acetophenone, p-tert-butyltrichloro acetophenone, chloro acetophenone, 2-2-diethoxy acetophenone, hydroxy acetophenone, 2,2-dimethoxy-2'-phenyl acetophenone, 2-amino acetophenone, dialkylamino acetophenone, benzyl, benzoin, benzoin methyl ether, benzoin ethyl ether, benzoin isopropyl ether, benzoin isobutyl ether, 1-hydroxycyclohexyl phenyl ketone, 2-hydroxy-2-methyl-1-phenyl-2-methylpropane-1-one, 1-(4-isopropylphenyl)-2-hydroxy-2-methylpropane-1-one, benzyl dimethyl ketal, benzophenone, benzoylbenzoic acid, methyl benzoyl benzoate, methyl-o-benzoyl benzoate, 4-phenyl benzophenone, hydroxy benzophenone, hydroxypropyl benzophenone, acrylic benzophenone, 4-4'-bis(dimethylamino)benzophenone, perfluoro benzophenone, thioxanthone, 2-chloro thioxanthone, 2-methyl thioxanthone, diethyl thioxanthone, dimethyl thioxanthone, 2-methyl anthraquinone, 2-ethyl anthraquinone, 2-tert-butyl anthraquinone, 1-chloro anthraquinone, 2-amyl anthraquinone, acetophenone dimethyl ketal, benzyl dimethyl ketal, α-acyl oxime ester, benzyl-(o-ethoxycarbonyl)-a-monoxime, diphenyl(2,4,6-trimethylbenzoyl)phosphine oxide, phenylbis(2,4,6-trimethylbenzoyl) phosphine oxide, bis(2,6-dimethoxybenzoyl)(2,4,4-trimethylpentyl)phosphine oxide, bis(4-methoxybenzoyl) diethylgermanium, tetrabenzoylgermane, tetramesitoylgermane, glyoxy ester, 3-keto coumarin, 2-ethyl anthraquinone, camphor quinone, tetramethylthiuram sulfide, azo bis isobutyl nitrile, benzoyl peroxide, dialkyl peroxide, tert-butyl peroxy pivalate, perfluoro tert-butyl peroxide, perfluoro benzoyl peroxide, etc. Further, it is possible to use these photoinitiator alone or in combination of two or more.

A skilled person would understand a suitable amount of photoinitiator(s) that may be used to initiate a photopolymerization reaction herein. One embodiment includes less than about 0.5% by weight of the at least one photoinitiator based on the weight of the composition without the at least one first component. In some embodiments, the amount is less than about 0.4% by weight, less than about 0.3% by weight, or less than about 0.1% by weight based on the weight of the composition without the at least one first component.

With respect to the amount of the at least one photoinitiator that may be used in embodiments based on the weight of the at least one polymerizable component itself, includes less than about 2% by weight of the at least one photoinitiator. In some embodiments, the amount is less than about 1.8% by weight, less than about 1.5% by weight, or less than about 1% by weight based on the weight of based on the weight of the at least one polymerizable component (e.g. resin).

It is understood that various ratios of the components may be used in the method of making the product. Depending on the ratios, different functional products result. For example, with respect to a larger proportion of photoinitiator, the method may form more radicals causing a larger concentration of the monomers to polymerize quickly, forming a more fragile product. With respect to larger amounts of monomer compared to cross-linking agent, fewer points of branching may result in a product with higher fragility. An excess of cross-linking agent may also cause the monomer to gel quickly, creating an inelastic structure. In examples, higher cross-linking agent percentages may provide products having greater tensile strength and lower cross-linking agent percentages may provide products having lower resistivities. In certain examples, higher cross-linking agent percentages may provide products having greater tensile strength with graded and composite products and lower cross-linking agent percentages may provide products having lower resistivities with functionally coated phase separated products.

With respect to the ratios of the components of the at least one polymerizable component, any suitable ratios can be used depending on the desired functional and/or functional precursor product. With respect to the at least one polymerizable component comprising at least one monomer and at least one cross-linking agent, in embodiments, the ratio of the at least one monomer to at least one cross-linking agent includes about 9:1 to about 0:10 based on % by weight. In some embodiments, the amount is about 9:1 to about 1:9 based on % by weight, about 8:2 to about 2:8 based on % by weight, about 7:3 to about 3:7 based on % by weight, about 6:4 to about 4:6 based on % by weight, about 5:5 to about 5:5 based on % by weight, about 4:6 to about 6:4 based on % by weight, about 3:7 to about 7:3 based on % by weight, about 2:8 to about 8:2 based on % by weight, or about 1:10 to about 9:1 based on % by weight.

With respect to the at least one polymerizable component comprising at least one monomer, at least one cross-linking agent, and at least one photoinitiator, in embodiments, the ratio of the at least one monomer to at least one cross-linking agent to at least one photoinitiator includes about 8.9:1:0.1 to about 0:9.9:0.1 based on % by weight.

To design functional products, and tune the chemical and/or physical properties, the attractive and repulsive forces (hydrophobic/hydrophilic interactions) between components may be leveraged to control the placement of functional components. When components have similar hydrophilic or hydrophobic properties, the components will have less of a driving force to phase separate upon polymerization. If the components differ in their hydrophobicity or hydrophilicity, the functional component will have a larger driving force to separate from the composition (e.g. polymerizing monomer/cross-linking agent mixture). The resulting product may be used as a scaffold for receiving metallic functional components (e.g. through electroplating) and as barrier type coatings (e.g. hydrophobic), dielectrics or insulating material, and may be selected for the desired flexibility and strength needed in the final product.

With respect to the at least one first component, in embodiments, the at least one first component is substantially soluble in the at least one polymerizable component and is substantially insoluble when the at least one polymerizable component polymerizes. The at least one first component may be selected from the group consisting of functional monomers, functional polymers, metal precursors, carbon nanotubes (CNT), graphene, metal alloy precursors, metalloid precursors, and combinations thereof.

In embodiments, the at least one first component is at least one functional monomer. The at least one functional monomer may be fluorinated monomers such as, and without being limited thereto, fluorinated methacrylates. The fluorinated functional monomers may contribute hydrophobic properties to the functional product. In embodiments utilizing the functional monomer, the at least one polymerizable component is selectively polymerized (e.g. temperature/wavelength used) without substantially polymerizing the at least one functional monomer such that, for example, the functional monomer and the at least one polymer form at least two phases. In embodiments, the functional monomer may polymerize somewhat with the at least one polymerizable component; however, at least two phases form.

In other embodiments, the at least one first component may be at least one functional polymer such as, and without being limited thereto, PEG. In embodiments utilizing the functional polymer, the at least one polymerizable component is polymerized such that, for example, the functional polymer and the at least one polymer form at least two phases.

In embodiments, the at least one first component is selected from the group consisting of metal salts, metal coordination compounds, organometallic compounds, organometalloid compounds, and combinations thereof. In typical embodiments, the at least one first component is selected from the group consisting of metal salts, metalloid salts, and combinations thereof. In certain embodiments, the at least one first component is selected from the group consisting of metal carboxylates, metalloid carboxylates, and combinations thereof. The metal carboxylates may comprise from 1 to 20 carbon atoms, from 6 to 15 carbon atoms, or from 8 to 12 carbon atoms. The carboxylate group of the metal carboxylates may be an alkanoate. Examples of the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof.

With respect to the metal precursors: the metal ion may be selected from the group consisting of $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $NO^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $OS^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ir$, $Ni^{3+}$, $Ni^{2+}$, $Ni^+$, $Ni$, $Pd^{4+}$, $Pd^{2+}$, $Pd^+$, $Pd$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Zn$, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Ge$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^{+}$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$ and alloys of any of the foregoing.

The at least one first component used in the method may be selected amongst nanoparticles and/or microparticles of at least one first component described herein. In certain embodiments, the nanoparticles and/or microparticles may be metal precursors such as metal ions, metal salts, metal oxides, and/or metal complexes which may be convertible to metal. More broadly, the at least one first component may be any suitable inorganic particle that can separate into at least two phases from the at least one polymer, including nanoparticles and/or microparticles.

In some embodiments, the nanoparticles or microparticles are composed of a metal or combinations of metals selected from metals of Groups IIA, IIIA, IIIB, IVB, VB, VIB, VIIB, VIIIB, IB or IIB of block d of the Periodic Table of Elements. In other embodiments, the metallic nanoparticles or microparticles are selected from Ba, Al, Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Al, Sn, In, Ga, Ir, and combinations thereof. In some other embodiments, the metallic nanoparticles or microparticles are selected from Ba, Al, Cu, Ni, Ag, Au, Pt, Pd, Al, Fe, Co, Ti, Zn, In, Sn, Ga and combinations thereof. In yet other embodiments, the metallic nanoparticles or microparticles are selected from Al, Cu, Ni, Ti, Zn, Ag, and combinations thereof.

In some embodiments, the metallic nanoparticles or microparticles are selected from Ag, Cu, and Ag and Cu nanoparticles. In other embodiments, the metallic nanoparticles or microparticles are Ag nanoparticles. In some embodiments, the at least one first component is a metal precursor selected to be convertible in-situ into a metal by a chemical or electrochemical process. The metal precursor may also be reduced into corresponding metal by reduction of the metal precursor in the presence of, for example, a suitable photoinitiator and a radiation source, a reducing agent (e.g. oxazolines such as 2-methyl-2-oxazoline, 2-ethyl-2-oxazoline, etc.), etc. Thus, in some embodiments, the metal precursor is selected to be convertible into any one of the metals recited hereinabove. In some embodiments, the metal precursor is a salt form of any one metal recited hereinabove.

In some embodiments, the metal salt is comprised of an inorganic or organic anion and an inorganic or organic cation. In some embodiments, the anion is inorganic. Non-limiting examples of inorganic anions include $HO^-$, $F^-$, $Cl^-$, $Br^-$, $I^-$, $NO_2^-$, $NO_3^-$, $ClO_4^-$, $SO_4^{2-}$, $SO_3^-$, $PO_4^-$ and $CO_3^{2-}$. In some embodiments, the anion is organic. Non-limiting examples of organic anions include acetate ($CH_3COO^-$), formate ($HCOO^-$), citrate ($C_3H_5O(COO)_3$ acetylacetonate, lactate ($CH_3CH(OH)COO^-$), oxalate (($COO)_2^{-2}$) and any derivative of the aforementioned. In some embodiments, the metal salt is not a metal oxide. In some embodiments, the metal salt is a metal oxide. In some embodiments, the metal salt is a salt of copper. Non-limiting examples of copper metal salts include copper formate, copper citrate, copper acetate, copper nitrate, copper acetylacetonate, copper perchlorate, copper chloride, copper sulfate, copper carbonate, copper hydroxide, copper sulfide or any other copper salt and the combinations thereof.

In some embodiments, the metal salt is a salt of nickel. Non-limiting examples of nickel metal salts include nickel formate, nickel citrate, nickel acetate, nickel nitrate, nickel acetylacetonate, nickel perchlorate, nickel chloride, nickel sulfate, nickel carbonate, nickel hydroxide or any other nickel salts and the combinations thereof.

In some embodiments, the metal salt is a salt of silver. Non-limiting examples of silver metal salts include silver carboxylates, silver lactate, silver nitrate, silver formate or any other silver salt and their mixtures. Typically, silver carboxylates may be used and comprise a silver ion and an organic group containing a carboxylate group. The carboxylate group may comprise from 1 to 20 carbon atoms, typically from 6 to 15 carbon atoms, more typically from 8 to 12 carbon atoms, for example 10 carbon atoms. The carboxylate group is typically an alkanoate. Some non-limiting examples of preferred silver carboxylates are silver ethylhexanoate, silver neodecanoate, silver benzoate, silver phenylacetate, silver isobutyrylacetate, silver benzoylacetate, silver oxalate, silver pivalate and any combinations thereof. In a typical embodiment, silver neodecanoate is used.

In other embodiments, the metal salt is selected from indium(III) acetate, indium(III) chloride, indium(III) nitrate; iron(II) chloride, iron(III) chloride, iron(II) acetate, gallium (III) acetylacetonate, gallium(II) chloride, gallium(III) chloride, gallium(III) nitrate; aluminum(III) chloride, aluminum (III) stearate; silver nitrate, silver chloride; dimethylzinc, diethylzinc, zinc chloride, tin(II) chloride, tin(IV) chloride, tin(II) acetylacetonate, tin(II) acetate; lead(II) acetate, lead (II) acetylacetonate, lead(II) chloride, lead(II) nitrate and PbS.

In other embodiments, the at least one first component is selected from metal oxides such as those mentioned above, including nanoparticles and/or microparticles. In certain embodiments, the metal oxides are selected from alumina, silica, barium titanate, transition metal oxides (e.g. zinc oxide, titanium oxide), and combinations thereof.

In other embodiments, the at least one first component is selected from nanowires, microparticles, nanoparticles, or combinations thereof, including any of the suitable at least one first component mentioned herein. In still other embodiments, the at least one first component comprises graphene.

With respect to the amount of the at least one first component, the amount of the at least one first component may be any suitable amount. For example, the amount may be from about 0.1% to about 90% by weight based on the weight of the composition. In some embodiments, the amount of the at least one first component in the composition may be from about 0.1% to about 80% by weight, from about 0.1% to about 70% by weight, from about 0.1% to about 60% by weight, from about 0.1% to about 50% by weight, from about 0.1% to about 40% by weight, from about 0.1% to about 30% by weight, or from about 0.1% to about 20% by weight based on the weight of the composition.

In other embodiments, various additives may be added. Additives can be included, for example, to increase the solubility of the at least one first component in the at least one polymer component. Various additives include, without being limited thereto, fillers, inhibitors, adhesion promoters, absorbers, dyes, pigments, anti-oxidants, carrier vehicles, heat stabilizers, flame retardants, thixotropic agents, flow control additives, dispersants, or combinations thereof. In typical embodiments, extending fillers, reinforcing fillers, dispersants, or combinations thereof are added. The additives can be microparticles or nanoparticles.

Examples of absorbers include 2-(2-hydroxyphenyl)-benzotriazole, 2-tert-Butyl-6-(5-chloro-2H-benzotriazol-2-yl)-4-methylphenol, 2-hydroxyphenyl benzophenone, 5-Chloro-2-hydroxybenzophenone, 2-(4,6-Diphenyl-1,3,5-triazin-2-yl)-5-[(hexyl)oxy]-phenol, 2,2'-(2,5-thiophendiyl) bis(5-tert-butylbenzoxazole), 4,4'-bis(2-benzoxazolyl)stilbene, 1,4-bis(5-phenyl-2-oxazolyl)benzene, 2-nitrophenyl phenyl sulfide, β-carotene, Sudan Orange G, avobenzone, cinoxate, homosalate, octocrylene, octyl salicylate, and phenylbenzimidazole sulfonic acid.

Examples of inhibitors include hydroquinone, monomethyl ether hydroquinone, tert-butyl hydroquinone, butylated hydroxytoluene, 4-tert-butyl catechol, pyrogallol, 2,3-dimethylhydroquinone, 2-methoxyhydroquinone, methylhydroquinone, cupferron, aluminum cupferrate, triphenylphosphite, triisodecyl phosphite, triallylphosphite, and vinylphosphonic acid.

In embodiments, the formulation may be used to make the product described herein.

Without further description, it is believed that one of ordinary skill in the art can, using the preceding description and the following illustrative examples, make and utilize and practice the claimed products, formulations and methods. A more complete understanding can be obtained by reference to the following specific examples. These examples are provided for purposes of illustration only, and are not intended to be limiting. Thus, the invention should in no way be construed as being limited to the following examples, but rather, should be construed to encompass any and all variations which become evident as a result of the teaching provided in the disclosure. The following working examples therefore, specifically point out aspects, and are not to be construed as limiting in any way.

EXAMPLES

Below is a list of abbreviations used to denote various chemical components of the formulations.

| Abbreviations | |
|---|---|
| Ethylene glycol diacrylate | EGDA |
| 2-Ethylhexyl acrylate | EHA |
| Ethyl (2,4,6-trimethylbenzoyl) phenylphosphinate | TPO-L |
| Silver neodecanoate | AgND |
| 2-Ethyl-2-oxazoline | EtOxa |
| Polyethyleneglycol diacrylate Mn 250* | PEGDA250 |
| Tetraethyleneglycol diacrylate | TEGDA |
| Polyethyleneglycol diacrylate Mn 575* | PEGDA575 |
| Polyethyleneglycol diacrylate Mn 700* | PEGDA700 |
| 1,4-Butanediol diacrylate | BDDA |
| 1,6-Hexanediol diacrylate | HDDA |
| Ethylene glycol methyl ether acrylate | EGMEA |
| Di(trimethylolpropane) tetraacrylate | DTMPTA |

*Mn is the number average molecular mass in g/mol

Formulation Examples 1-15

Examples 1-15 illustrate the various compositions and printing considerations for the making of conductive products (e.g. electrical devices) and non-conductive products (e.g. consumer products where it is desirable to have decorative coatings, such as jewelry).

Comparative Example 1: Coating of SLA Printed Acrylate-Based Resin (FSL 3D) 3D Product with Ag Precursor i.e. Silver Neodecanoate+2-Ethyl-2-Oxazoline_7% Ag Metal Commercial acrylate-based resin (Pegasus, FSL3D) was printed into cylinders about 1 cm in length and about 1 mm in diameter using a SLA printer and then immersed in a mixture of Ag precursor composed of about 4.44 g silver neodecanoate+about 20.084 ml 2-ethyl-2-oxazoline (7% Ag metal). Coated 3D products were thermally sintered by using a reflow oven program to heat between about 200 and about 250° C. temperature for varying times under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 J/cm$^2$ for about 3000 is under ambient conditions.

Example 2: SLA Printed Ag Precursor+Acrylate-Based Resin (FSL 3D) (Silver Neodecanoate+2-Ethyl-2-Oxazoline_1.97% Ag Metal)

A resin was formulated by mixing about 6.25 g silver neodecanoate+about 1.38 ml 2-ethyl-2-oxazoline+about 114.99 g commercial acrylate-based resin (Pegasus, FSL3D) to make final formulation with about 1.97 wt. % silver content. The resin was printed into cylinders about 1 cm in length and about 1 mm in diameter. The 3D products were thermally sintered by using a reflow oven program to heat from about 200 to about 250° C. temperature for varying times under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 J/cm$^2$ for about 3000 is under ambient conditions.

Example 3: SLA Printed Ag Precursor+Acrylate-Based Resin (FSL 3D) (Silver Neodecanoate+2-Ethyl-2-Oxazoline_3.84% Ag Metal)

A resin was formulated by mixing about 12.5 g silver neodecanoate+about 2.76 ml 2-ethyl-2-oxazoline+about 107.36 g commercial acrylate-based resin (Pegasus, FSL3D) to make final formulation with about 3.84 wt. % silver content. The resin was SLA printed into cylinders about 1 cm in length and about 1 mm in diameter and then thermally sintered from about 200 to about 250° C. temperature ranges (program) by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 J/cm$^2$ for about 3000 is under ambient conditions.

Example 4: SLA Printed Ag Precursor+Acrylate-Based Resin (FSL 3D) (Silver Neodecanoate+2-Ethyl-2-Oxazoline_7% Ag Metal)

A resin was formulated by mixing about 22.2 g silver neodecanoate+about 5.03 ml 2-ethyl-2-oxazoline+about 94.89 g commercial acrylate-based resin (Pegasus, FSL3D) to make final formulation with about 7 wt. % silver content. The resin was SLA printed into cylinders about 1 cm in length and about 1 mm in diameter and then thermally sintered from about 200 to about 250° C. temperature ranges (program) by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 J/cm$^2$ for about 3000 is under ambient conditions.

Example 5: SLA Printed Ag Precursor+Acrylate-Based Resin (FSL 3D) (Silver Neodecanoate+2-Ethyl-2-Oxazoline_7.9% Ag Metal)

A resin was formulated by mixing about 25 g silver neodecanoate+about 5.52 ml 2-ethyl-2-oxazoline+about 92.1 g commercial acrylate-based resin (Pegasus, FSL3D) to make final formulation with about 7.9 wt. % silver content. The resin was SLA printed into cylinders about 1 cm in length and about 1 mm in diameter and then thermally sintered from about 200 to about 250° C. temperature ranges (program) by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 $J/cm^2$ for about 3000 is under ambient conditions.

Example 6: SLA Printed Ag Precursor+Acrylate-Based Resin (FSL 3D) (Silver Neodecanoate+2-Ethyl-2-Oxazoline_9.85% Ag Metal)

A resin was formulated by mixing about 31.25 g silver neodecanoate+about 6.9 ml 2-ethyl-2-oxazoline+about 84.47 g commercial acrylate-based resin (Pegasus, FSL3D) to make final formulation with about 9.85 wt. % silver content. The resin was SLA printed into cylinders about 1 cm in length and about 1 mm in diameter and then thermally sintered from about 200 to about 250° C. temperature ranges (program) by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 $J/cm^2$ for about 3000 is under ambient conditions.

Example 7: SLA Printed Ag Salt+Acrylate-Based Resin (FSL 3D) (Silver Neodecanoate_7% Ag Metal)

A resin was formulated by mixing about 22.2 g silver neodecanoate+about 100.42 g commercial acrylate-based resin (Pegasus, FSL3D) to make final formulation with about 7 wt. % silver content. The resin was SLA printed into cylinders about 1 cm in length and about 1 mm in diameter and then thermally sintered between about 200 to about 250° C. temperature ranges (program) by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 $J/cm^2$ for about 3000 is under ambient conditions.

Example 8: Ag Precursor+(10% TMPTA, 89% EtHex Acrylate) Resin

About 1.00 g of trimethylolpropane triacrylate, about 8.90 g of 2-ethylhexylacrylate, and about 0.10 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for 2 minutes at about 3200 rpm. The resin was SLA printed into cylinders about 1 cm in length and about 1 mm in diameter and then thermally sintered from about 240 to about 300° C. temperature ranges (program) for about 1 hour using reflow oven under nitrogen.

Example 9: Ag Precursor+(99% TMPTA) Resin

About 9.90 g of trimethylolpropane triacrylate and about 0.10 g of Ethyl (2,4,6-trimethylbenzoyl) phenylphosphinate were added into a 20 mL scintillation vial. The mixture was mixed using a vortex mixer at about 3200 rpm for about 1 minute. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. (program) for about 1 hour using reflow oven under nitrogen with about 500 ppm oxygen.

Example 10: SLA Printed Ag Precursor+Acrylate-Based Resin (FSL 3D) (Silver Nitrate+2-ethyl-2-oxazoline_7% Ag Metal)

A resin was formulated by mixing about 13.5 g silver nitrate+about 6.04 ml 2-ethyl-2-oxazoline+about 103.73 g commercial acrylate-based resin (Pegasus, FSL3D) to make final formulation with about 7 wt. % silver content. The resin was SLA printed into cylinders about 1 cm in length and about 1 mm in diameter and then thermally sintered from about 200 to about 250° C. temperature ranges (program) by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 $J/cm^2$ for about 3000 μs under ambient conditions.

Example 11: SLA Printed Ag Precursor+Acrylate-Based Resin (FSL 3D) (Silver Acetate+2-ethyl-2-oxazoline_7% Ag Metal)

A resin was formulated by mixing about 13.3 g silver acetate+about 8.05 ml 2-ethyl-2-oxazoline+about 101.29 g commercial acrylate-based resin (Pegasus, FSL3D) to make final formulation with about 7 wt. % silver content. The resin was SLA printed into cylinders about 1 cm in length and about 1 mm in diameter and then thermally sintered from about 200 to about 250° C. temperature ranges (program) by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 $J/cm^2$ for about 3000 μs under ambient conditions.

Example 12: SLA Printed Cu Precursor+Acrylate-Based Resin (FSL 3D) (Cu Formate+_7% Cu Metal)

A resin was formulated by mixing about 23.18 g copper formate hydrate+about 10.3 ml 3-(diethylamino)-1 2-propanediol+about 89.15 g commercial acrylate-based resin (Pegasus, FSL3D) to make final formulation with about 7 wt. % Cu content. The resin was SLA printed into cylinders about 1 cm in length and about 1 mm in diameter and then thermally sintered from about 200 to about 250° C. temperature ranges (program) by varying time using reflow oven under nitrogen with about 500 ppm oxygen. Intense pulsed light sintering (photonic curing) was also performed on thermally sintered samples with a Novacentrix Pulse-Forge® 1300 system with sintering energies ranging from about 2.4 to about 3.1 J/cm$^2$ for about 3000 µs under ambient conditions.

Example 13: SLA Printed Graphene+Acrylate-Based Resin (FSL 3D) (0.05% Graphene)

A resin was formulated by mixing about 0.05 g graphene (N002-PDR-HD Angstron Materials)+about 1.25 g dispersant BYK 180+about 98.7 g commercial acrylate-based resin (Pegasus, FSL3D) to make final formulation with about 0.05 wt. % graphene content. The resin was SLA printed into cylinders about 1 cm in length and about 1 mm in diameter and then thermally sintered at about 200° C. (program) for about 1 hour using reflow oven under nitrogen with about 500 ppm oxygen.

Example 14: SLA Printed Graphene+Acrylate-Based Resin (FSL 3D) (0.4% Graphene)

A resin was formulated by mixing about 0.4 g graphene (N002-PDR-HD Angstron Materials)+about 10 g dispersant BYK 180+about 89.6 g commercial acrylate-based resin (Pegasus, FSL3D) to make final formulation with 0.4 wt. % graphene content. The resin was SLA printed into cylinders about 1 cm in length and about 1 mm in diameter and then thermally sintered at about 200° C. (program) for 1 hour using reflow oven under nitrogen with about 500 ppm oxygen.

Formulation of Silver Particle and Graphene 3D Printable Resins:

Submicron silver particles and different amounts of graphene were dissolved in a dispersant BYK 180 and then mixed with commercial acrylate-based resin (Pegasus, FSL3D).

Example 15: SLA Printing of Hydrophobic Tiles Using Fluorinated Monomers

Resins containing various % weight of 1H,1H-perfluorooctyl methacrylate, 2-ethylhexyl acrylate and trimethylolpropane triacrylate were prepared according to Table 1. A 2% wt. fraction of ethyl (2,4,6-trimethylbenzoyl) phenylphosphinate was used as photoinitiator was used in all resins. The resins were SLA printed into tiles about 1 cm×about 1 cm×about 0.2 cm in size using a Peopoly Moai SLA 3D printer with a about 210 mW laser and laser setting of about 75. Once printed, the tiles were removed from the build plate and washed in ethanol. The resins were also drop casted onto glass slides, UV-cured using a Dymax Light Curing System (Model 5000 Flood) and washed with ethanol. The contact angles of the 3D printed tiles and the UV-cured films were measured using a 5 µL drop of water.

TABLE 1

Formulations of resins used to prepare tiles and films in Example 15.

| % wt. 2-ethylhexylacrylate | % wt. 1H,1H-PERFLUOROOCTYL METHACRYLATE | % wt. trimethylolpropane triacrylate | % wt. ethyl (2,4,6-trimethylbenzoyl) phenylphosphinate |
|---|---|---|---|
| 0 | 0 | 98 | 2 |
| 1 | 1 | 96 | 2 |
| 5 | 5 | 88 | 2 |
| 10 | 10 | 78 | 2 |
| 20 | 20 | 58 | 2 |
| 30 | 30 | 38 | 2 |
| 40 | 40 | 18 | 2 |

Printing, Sintering and Characterization:

Ink Characterization:

TGA analysis of resin and functional material resins were performed via a TGA A588 TGA-IR module.

SLA printing of 3D products: 3D products using functional material (silver salt, silver and graphene) were printed using Peopoly Moai Laser SLA 3D Printer (Technical Specifications: Build Volume: 130×130×180 mm, Laser spot size: about 70 microns, Laser wave length: about 405 nm, Laser power: about 150 mW, Machine size: 330×340×660 mm, Layer Height: about 10 to about 200 microns, Z resolution: Layer Height: about 10 to about 200 µm). Products were printed using non-stick liner coated vat with laser power 58 and XY speed set 4.

Sintering of printed 3D products: 3D products were thermally sintered at about 200 to about 250° C. temperature (program) ranges by varying time using reflow oven under nitrogen with about 500 ppm oxygen. Intense pulsed light sintering (photonic curing) was also performed on thermally sintered samples with a Novacentrix PulseForge® 1300 system with sintering energies ranging from about 2.4 to about 3.1 J/cm2 for about 3000 is under ambient conditions.

Characterization of 3D products: A two-point probe method was used to measure the resistance of the 3D printed products using a multimeter after thermal and photonic sintering. Scanning electron microscopy (SEM) images were acquired with a Hitachi SU3500.

A summary of the exemplary formulations, their processing and the resulting 3D printed product is provided in Table 2 below.

TABLE 2

Summary of Examples 1-15 and resulting in 3D printed products. All examples were made using commercially available resins, except for Examples 8, 9 and 15 where resin components were specifically selected and prepared.

| Example No. | Functional component | Resin | Processing | Comment |
|---|---|---|---|---|
| 1 (comparative example) | silver neodecanoate + 2-ethyl-2-oxazoline (7% Ag metal) | Acrylate-based resin (FSL 3D) | 1) SLA printing of resin, 2) coating of functional component 3) thermal sintering | Non-conducting products |
| 2 Functional Coating | silver neodecanoate + 2-ethyl-2-oxazoline (1.97% Ag metal) | Acrylate-based resin (FSL 3D) | 1) SLA printing 2) thermal sintering | Non-Conducting products |
| 3 Functional Coating | silver neodecanoate + 2-ethyl-2-oxazoline (3.94% Ag metal) | Acrylate-based resin (FSL 3D) | 1) SLA printing 2) thermal sintering | Non-Conducting products |
| 4 Functional Coating | silver neodecanoate + 2-ethyl-2-oxazoline (7% Ag metal) | Acrylate-based resin (FSL 3D) | 1) SLA printing 2) thermal sintering | Conducting products ~20-50 Ω/cm |
| 5 Functional Coating | silver neodecanoate + 2-ethyl-2-oxazoline (7.9% Ag metal) | Acrylate-based resin (FSL 3D) | 1) SLA printing 2) thermal sintering | Conducting products ~10-25 Ω/cm |
| 6 Functional Coating | silver neodecanoate + 2-ethyl-2-oxazoline (9.85% Ag metal) | Acrylate-based resin (FSL 3D) | 1) SLA printing 2) thermal sintering | Conducting products ~18-23 Ω/cm |
| 7 Functional Coating | silver neodecanoate (7% Ag metal) | Acrylate-based resin (FSL 3D) | 1) SLA printing 2) thermal sintering | Non-conducting products |
| 8 Functional Coating | silver neodacanoate + 2-ethyl-2-oxazoline (7.9% Ag metal) | 10% trimethylolpropane triacrylate (TMPTA), 89% 2-ethylhexylacrylate, 1% ethyl (2,4,6-trimethylbenzoyl) phenylphosphinate (TPO-L) | 1) SLA printing 2) thermal sintering | Conducting products |
| 9 Composite | silver neodacanoate + 2-ethyl-2-oxazoline (7.9% Ag metal) | 99% TMPTA, 1% TPO-L | 1) SLA printing 2) thermal sintering | Non-conducting products |

TABLE 2-continued

Summary of Examples 1-15 and resulting in 3D printed products. All examples were made using commercially available resins, except for Examples 8, 9 and 15 where resin components were specifically selected and prepared.

| Example No. | Functional component | Resin | Processing | Comment |
|---|---|---|---|---|
| 10 Graded Composition | silver nitrate + 2-ethyl-2-oxazoline (7% Ag metal) | Acrylate-based resin (FSL 3D) | 1) SLA printing 2) thermal sintering | Non-conducting products |
| 11 Graded Composition | silver acetate + 2-ethyl-2-oxazoline (7% Ag metal) | Acrylate-based resin (FSL 3D) | 1) SLA printing 2) thermal sintering | Non-conducting products |
| 12 Graded Composition | copper formate + aminodiol (7% Cu metal) | Acrylate-based resin (FSL 3D) | 1) SLA printing 2) thermal sintering | Non-conducting products |
| 13 Functional Coating | graphene (GRN235) + dispersing agent (BYK 180) (0.05% graphene in total ink | Acrylate-based resin (FSL 3D) | 1) SLA printing 2) thermal sintering | Non-Conducting products |
| 14 Functional Coating | graphene (GRN235) + dispersing agent (BYK 180) (0.4% graphene in total ink) | Acrylate-based resin (FSL 3D) | 1) SLA printing 2) thermal sintering | Conducting products ~1-5 KΩ/cm |
| 15 Functional Coating | Various % of 1H,1H-perfluorooctyl methacrylate | Acrylate-based resin (See Example 15) | 1) SLA printing 2) UV sintering | Non-conducting products (hydrophobic properties) |

Additional Analysis

Figure 2:
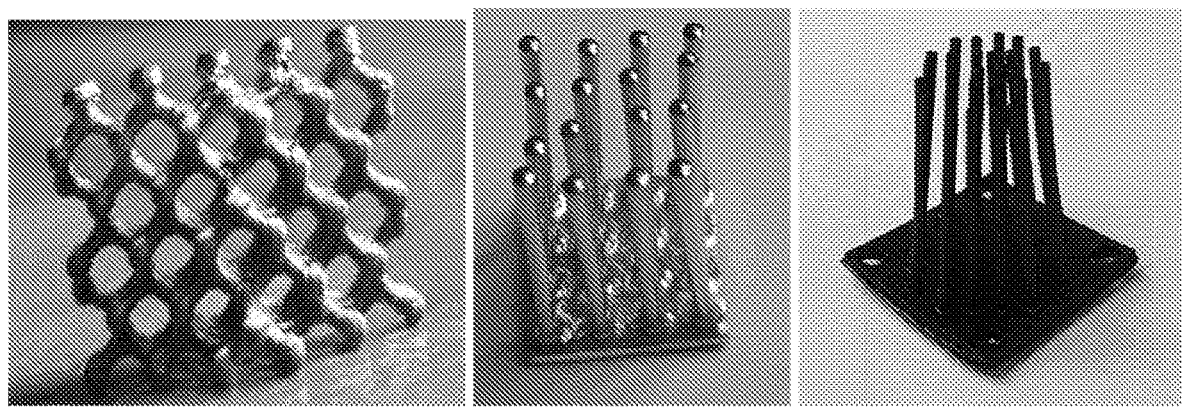
FIG. 2 shows examples of 3D printed products. The formulations used to make these products are described in Examples 1-15.

Examples of 3D printed products are shown in FIG. 2.

SEM images of 3D printed cylinders of Example 4 are shown in FIGS. 3A-3C. The cylinders were about 1 cm in length and diameters of a) about 350 mm, b) about 500 mm and c) about 1500 mm. The images of the cross-sections were taken near the surface of the cylinder to demonstrate the phase separation of silver and polymer. The silver appears as the bright areas and the polymer as the dark areas. As the volume of the 3D printed product increases (increasing diameter of cylinder), the thickness of the functional coating increases. The schematic in FIG. 3D provides a perspective of where the SEM images where taken on the cylinders (red circle, top left at the interface of the surface layer and rest of the product).

Figure 4:
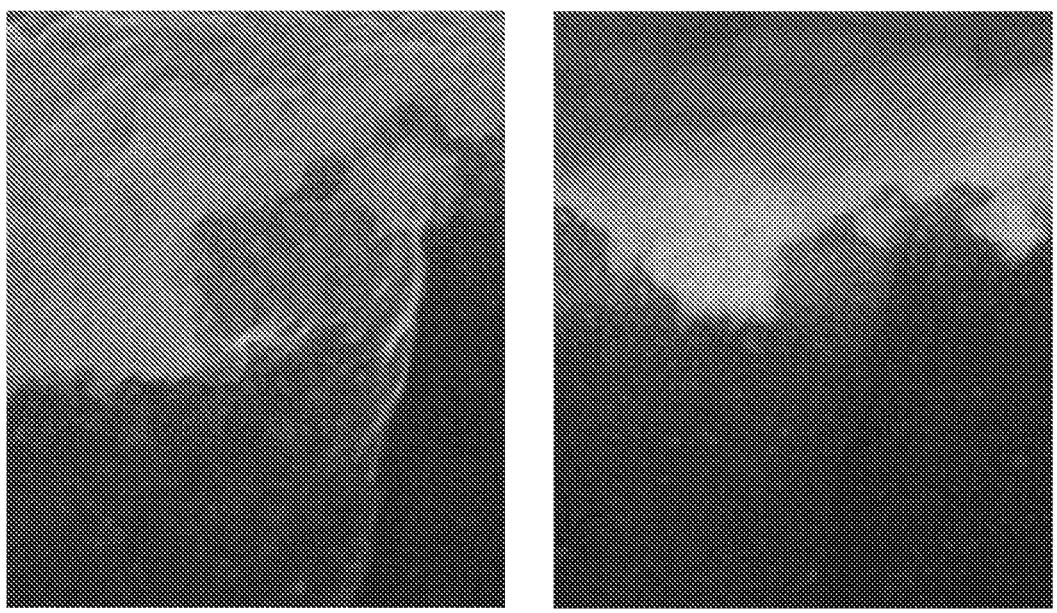
FIG. 4 shows cross-sectional SEM images of the interface of an example of a 3D printed product.

Concentration gradient in 3D printed product of Example 4. Cross-sectional SEM images of the interface of a 3D printed product are shown in FIG. 4. The images show a top layer of silver formed on the polymer core. Within the polymer core, a concentration gradient of silver nanoparticles was observed, with the concentration of silver (bright areas) decreasing with distance away from the surface of the product.

Resistance of 1 cm cylinders of Examples 5 and 6 (Tables 3 and 4). Conductivity of silver cylinders (silver thickness of from about 200 to about 500 nm) under various conditions—increasing Ag content (Table 3) and decreasing cylinder diameter (Table 4).

TABLE 3

| Sintering conditions | Resistance of 1 cm × 1500 mm rod (W) | |
|---|---|---|
| Silver content | 7.88% Ag | 9.85% Ag |
| 250° C./30 mins | 56 | 22.5 |
| Photo (stage 40)/250° C._30 min & 350 V/1500 µs_1X | 182 | 19 |

Increasing the silver content in the resin decreased the cylinder resistance.

TABLE 4

| | Resistance of 1 cm rod (Ω) Diameter of rod (µm) | | |
|---|---|---|---|
| Summary of 7.88% | 1500 | 1000 | 750 |
| 250° C./30 mins | 56 | 22 | 38 |
| 250° C./60 mins | 27 | 12 | 14 |
| 200° C./60 mins | 147 | 112 | 80 |

Decreasing cylinder diameter led to improved resistance.

TGA of AgResin_7.88% Ag SLA 3D Product Cured in Air of Example 5

Figure 5:
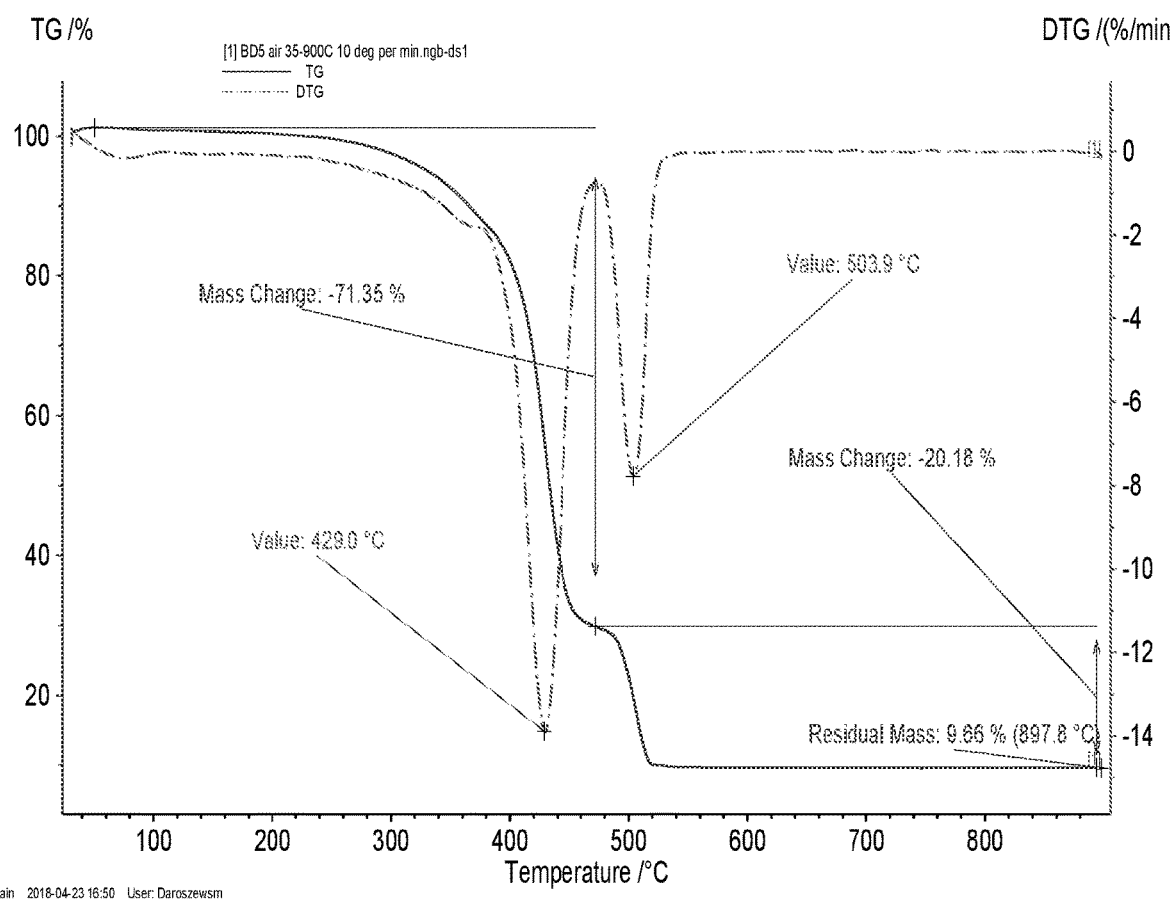
FIG. 5 shows thermal gravimetric analysis (TGA) of silver SLA 3D product cured in air. The formulation used to make this product is described in Example 5.

The residual mass of the SLA 3D product was about 9.66% while the initial formulation predicted a residual mass of about 7.88% (silver content) (FIG. 5).

Formulation of Silver Neodecanoate 3D Printable Resins:

As outlined above in the many examples, for SLA 3D printing, the molecular silver ink formulations were prepared by first dissolving silver salt in an amine. Subsequently, commercial acrylate-based resin (Pegasus, FSL3D) or flexible resin (photocentric 3D) was added in to the silver/amine complex to form the final formulation with about 2 to about 10 wt % silver content based on the total weight of the formulation (see Table 5 below).

TABLE 5

| Ag Resin | Ag Neodecanoate | 2-Ethyl-2-oxazoline | Resin | Total |
|---|---|---|---|---|
| 1.97% Ag | 6.25 g | 1.38 ml | 114.99 | 122.62 |
| 3.84% Ag | 12.5 g | 2.76 ml | 107.36 | 122.62 |
| 7.88% Ag | 25.0 g | 5.52 ml | 92.1 g | 122.62 |
| 9.85% Ag | 31.25 g | 6.9 ml | 84.47 g | 122.62 |

Figure 6:
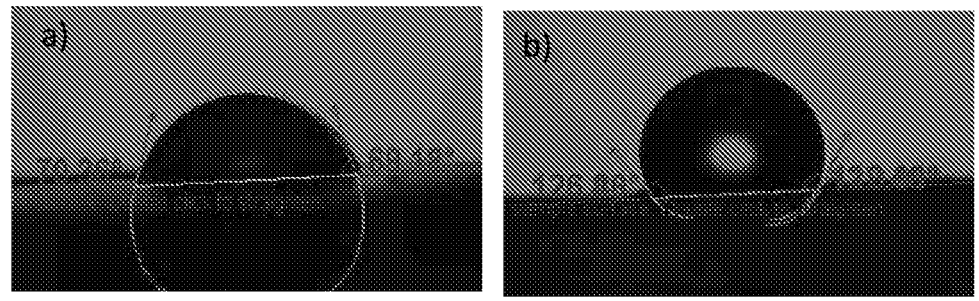
FIG. 6 shows an optical image of a 5 μL drop of water on a 3D printed tile containing a) 0 wt. %, and b) 20 wt. % 1H,1H-perfluorooctyl methacrylate. The formulation used to make this product is described in Example 15.
Figure 7:
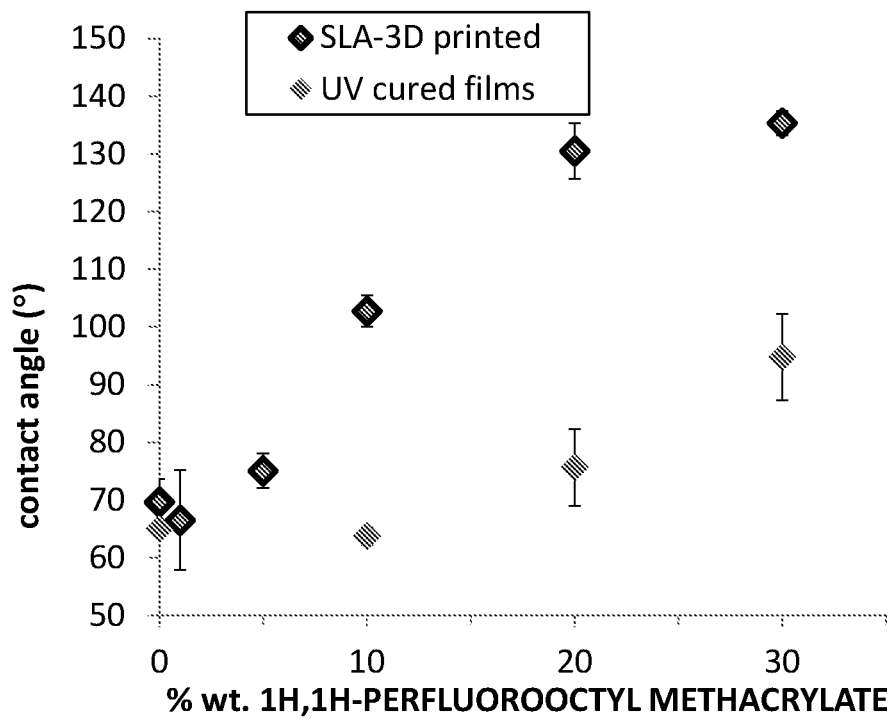
FIG. 7 shows a graph of contact angles of 3D printed tiles and of UV-cured films vs. % wt. fluorinated methacrylate monomer. The formulation used to make this product is described in Example 15.

Optical images of 3D printed cylinders of Example 15 are shown in FIG. 6. FIG. 6 shows the increase in the contact angle of the tiles with the addition of a fluorinated monomer to the resin. FIG. 7 shows that using the same resin, SLA printed tiles generate surfaces with higher contact angles than those UV-cured as a film.

Formulation Examples 16-53

Based on the observed product results and morphologies arising from Examples 1-15, Examples 16-57 provide additional embodiments of formulations and printing conditions which resulted in functional coatings, graded compositions, and composites.

Formulating Considerations for Functional Components and Resins

In these examples, the 3D printing SLA resins have three components: mono-functional monomers, di-, tri- and tetra-functional cross-linking agents and a photoinitiator. Various cross-linking agents composed of different reactive end groups and inner subunits were tested. Higher cross-linking percentage led to the prints having greater tensile strength with graded and composite structure products, and lower cross-linking percentages usually having lower resistivities with functionally coated phase separated products.

To design functional products, and tune the chemical and/or physical properties, the attractive and repulsive forces (hydrophobic/hydrophilic interactions) between components were leveraged to control the placement of functional components. In certain examples, when components had similar hydrophilic or hydrophobic properties, the components had less of a driving force to phase separate upon polymerization. When the components differed in their hydrophobicity or hydrophilicity, the functional component had a larger driving force to separate from the composition (e.g. polymerizing monomer/cross-linking agent mixture).

There are commercial resins available with the capability of creating successful multi-material print structures. When more design flexibility is needed to create complex structures, resins were provided in the present disclosure that can be chemically altered and still remain stable for application. In some examples, the resin formulations shown in the Tables (e.g. Tables 2, 6 and 7) provided useful products without the listed functional components. In these instances, the resulting product may be used as a scaffold for receiving metallic functional components (e.g. through electroplating) and as barrier type coatings (e.g. hydrophobic), dielectrics or insulating material, and may be selected for the desired flexibility and strength needed in the final product.

Example 16: Ag Precursor+(15% EGDA, 84% EHA) Resin

About 1.5 g of ethyleneglycol diacrylate, about 8.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 17: Ag Precursor+(20% EGDA, 79% EHA) Resin

About 2.0 g of ethyleneglycol diacrylate, about 7.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 18: Ag Precursor+(25% EGDA, 74% EHA) Resin

About 2.5 g of ethyleneglycol diacrylate, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 19: Ag Precursor+(35% EGDA, 64% EHA) Resin

About 3.5 g of ethyleneglycol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 20: Ag Precursor+(50% EGDA, 49% EHA) Resin

About 5.0 g of ethyleneglycol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 21: Ag Precursor+(15% PEGDA250, 84% EHA) Resin

About 1.5 g of polyethyleneglycol diacrylate Mn 250, about 8.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 22: Ag Precursor+(20% PEGDA250, 79% EHA) Resin

About 2.0 g of polyethyleneglycol diacrylate Mn 250, about 7.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 23: Ag Precursor+(25% PEGDA250, 74% EHA) Resin

About 2.5 g of polyethyleneglycol diacrylate Mn 250, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 24: Ag Precursor+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 25: Ag Precursor+(50% PEGDA250, 49% EHA) Resin

About 5.0 g of polyethyleneglycol diacrylate Mn 250, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 26: Ag Precursor+(99% PEGDA250) Resin

About 9.9 g of polyethyleneglycol diacrylate Mn 250 and about 0.1 g of Ethyl (2,4,6-trimethylbenzoyl) phenylphosphinate were added into a 20 mL scintillation vial. The mixture was mixed using a vortex mixer at about 3200 rpm for about 1 minute. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. (program) for about 1 hour using reflow oven under nitrogen with about 500 ppm oxygen.

Example 27: Ag Precursor+(25% TEGDA, 74% EHA) Resin

About 2.5 g of tetraethyleneglycol diacrylate, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for 1 hour using reflow oven under nitrogen with about 500 ppm oxygen.

Example 28: Ag Precursor+(35% TEGDA, 64% EHA) Resin

About 3.5 g of tetraethyleneglycol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 29: Ag Precursor+(50% TEGDA, 49% EHA) Resin

About 5.0 g of tetraethyleneglycol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 30: Ag Precursor+(99% TEGDA) Resin

About 9.9 g of tetraethyleneglycol diacrylate and about 0.1 g of Ethyl (2,4,6-trimethylbenzoyl) phenylphosphinate were added into a 20 mL scintillation vial. The mixture was mixed using a vortex mixer at about 3200 rpm for about 1 minute. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. (program) for about 1 hour using reflow oven under nitrogen with about 500 ppm oxygen.

Example 31: Ag Precursor+(25% PEGDA575, 74% EHA) Resin

About 2.5 g of polyethyleneglycol diacrylate Mn 575, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 32: Ag Precursor+(35% PEGDA575, 64% EHA) Resin

About 3.5 g of polyethyleneglycol diacrylate Mn 575, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 33: Ag Precursor+(45% PEGDA575, 54% EHA) Resin

About 4.5 g of polyethyleneglycol diacrylate Mn 575, about 5.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 34: Ag Precursor+(50% PEGDA575, 49% EHA) Resin

About 5.0 g of polyethyleneglycol diacrylate Mn 575, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 35: Ag Precursor+(65% PEGDA575, 34% EHA) Resin

About 6.5 g of polyethyleneglycol diacrylate Mn 575, about 3.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 36: Ag Precursor+(25% PEGDA700, 74% EHA) Resin

About 2.5 g of polyethyleneglycol diacrylate Mn 700, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 37: Ag Precursor+(35% PEGDA700, 64% EHA) Resin

About 3.5 g of polyethyleneglycol diacrylate Mn 700, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 38: Ag Precursor+(50% PEGDA700, 49% EHA) Resin

About 5.0 g of polyethyleneglycol diacrylate Mn 700, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 39: Ag Precursor+(60% PEGDA700, 39% EHA) Resin

About 6.0 g of polyethyleneglycol diacrylate Mn 700, about 3.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 40: Ag Precursor+(80% PEGDA700, 19% EHA) Resin

About 8.0 g of polyethyleneglycol diacrylate Mn 700, about 1.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 41: Ag Precursor+(99% PEGDA700) Resin

About 9.9 g of polyethyleneglycol diacrylate Mn 700 and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 42: Ag Precursor+(35% 1,4-butanediol Diacrylate, 64% EHA) Resin

About 3.5 g of 1,4-butanediol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 43: Ag Precursor+(50% 1,4-butanediol Diacrylate, 4.9% EHA) Resin

About 5.0 g of 1,4-butanediol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 44: Ag Precursor+(65% 1,4-butanediol Diacrylate, 34% EHA) Resin

About 6.5 g of 1,4-butanediol diacrylate, about 3.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 45: Ag Precursor+(35% 1,6-hexanediol Diacrylate, 64% EHA) Resin

About 3.5 g of 1,6-hexanediol diacrylate, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 46: Ag Precursor+(50% 1,6-hexanediol Diacrylate, 4.9% EHA) Resin

About 5.0 g of 1,6-hexanediol diacrylate, about 4.9 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 47: Ag Precursor+(65% 1,6-hexanediol Diacrylate, 34% EHA) Resin

About 6.5 g of 1,6-hexanediol diacrylate, about 3.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for 1 hour using reflow oven under nitrogen with about 500 ppm oxygen.

Example 48: Ag Precursor+(50% 1,6-hexanediol Diacrylate, 49% EGMEA) Resin

About 5.0 g of 1,6-hexanediol diacrylate, about 4.9 g of ethyleneglycol methyl ether acrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 49: Ag Precursor+(25% DTMPTA, 74% EHA) Resin

About 2.5 g of di(trimethylolpropane) tetraacrylate, about 7.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixture from the first vial. The combined mixture was then vortex mixed for about 2 minutes at about 3200 rpm. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 50: $TiO_2$+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of $TiO_2$ functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Example 51: $TiO_2$+(35% PEGDA250, 64% EHA and Toluene) Resin

About 3.5 g of polyethyleneglycol diacrylate Mn 250, about 6.17 g of 2-ethylhexylacrylate, about 2.3 ml toluene and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of $TiO_2$ functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 17:
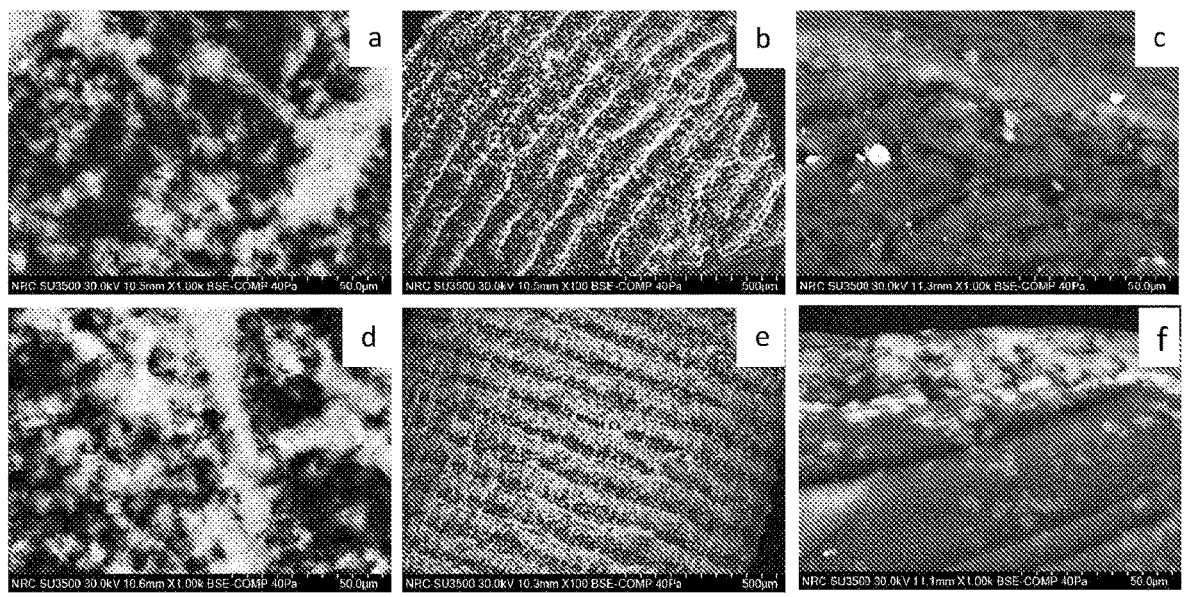
FIG. 17 shows SEM images of 3D $TiO_2$ products printed without toluene (a, b and c) and with toluene (d, e and f). The 3D $TiO_2$ products were prepared using the formulations described in Examples 50 and 51.
Figure 18:
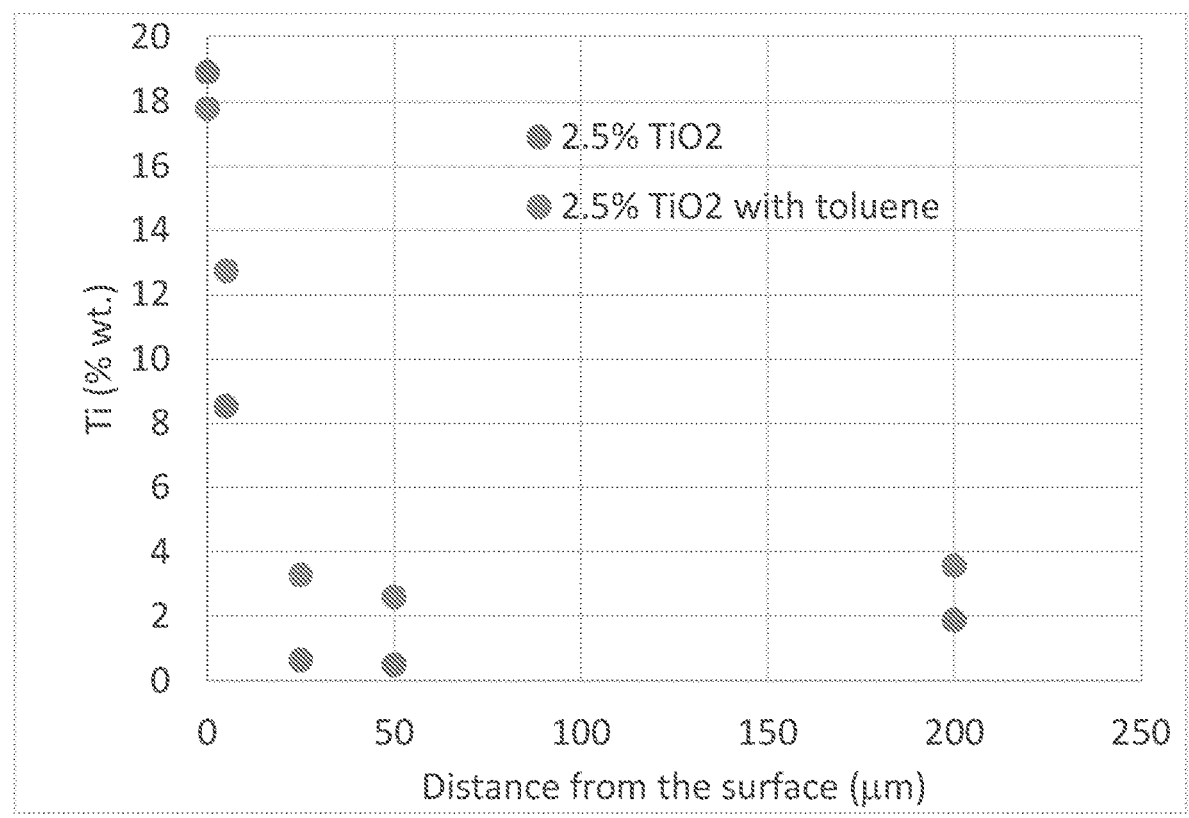
FIG. 18 shows wt % of $TiO_2$ as a function of distance from the surface of the 3D $TiO_2$ products. The 3D $TiO_2$ products were prepared using the formulations described in Examples 50 and 51.

FIG. 17 shows SEM images of 3D $TiO_2$ products printed without toluene (a, b and c) and with toluene (d, e and f) and FIG. 18 shows wt % of $TiO_2$ as a function of distance from the surface of the 3D $TiO_2$ products. Products without toluene had a wider range of $TiO_2$ wt % distribution.

Example 52: Barium Strontium Titanate (BST)+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of Barium Strontium Titanate (BST) functionalized with 2-methoxy(polyethyleneoxy)propyl trimethoxysilane were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 19:
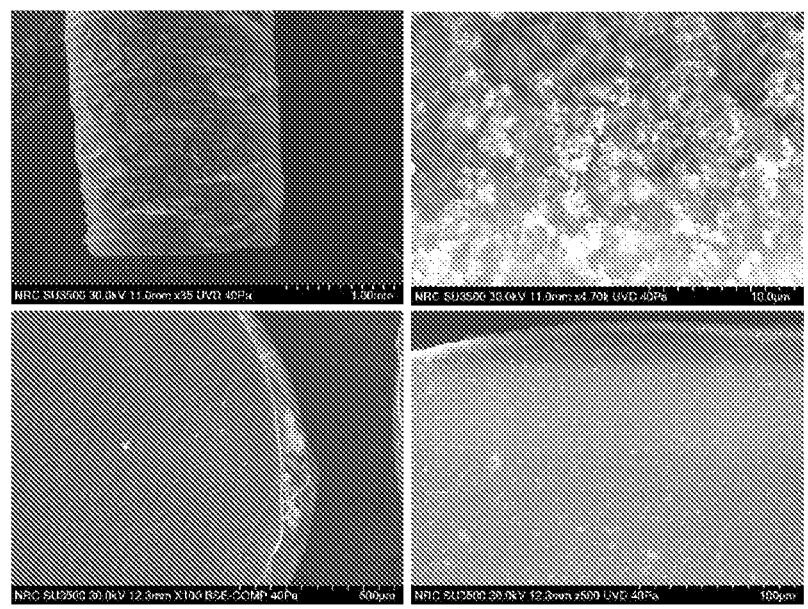
FIG. 19 shows SEM images of 3D Barium Strontium Titanate (BST) product. The 3D BST product was prepared using the formulation described in Example 52.

FIG. 19 shows SEM images of 3D Barium Strontium Titanate (BST) product.

Example 53: Iron Oxide+(35% PEGDA250, 64% EHA) Resin

About 3.5 g of polyethyleneglycol diacrylate Mn 250, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. To this vial, about 0.25 g of iron oxide were added and the combined mixture was then sonicated overnight in the dark. The resin was SLA printed into cylinders about 1 cm in length and about 1 mm in diameter and then thermally sintered at about 250° C. temperature (program) for about 1 hour using reflow oven under nitrogen with about 500 ppm oxygen.

Figure 20:
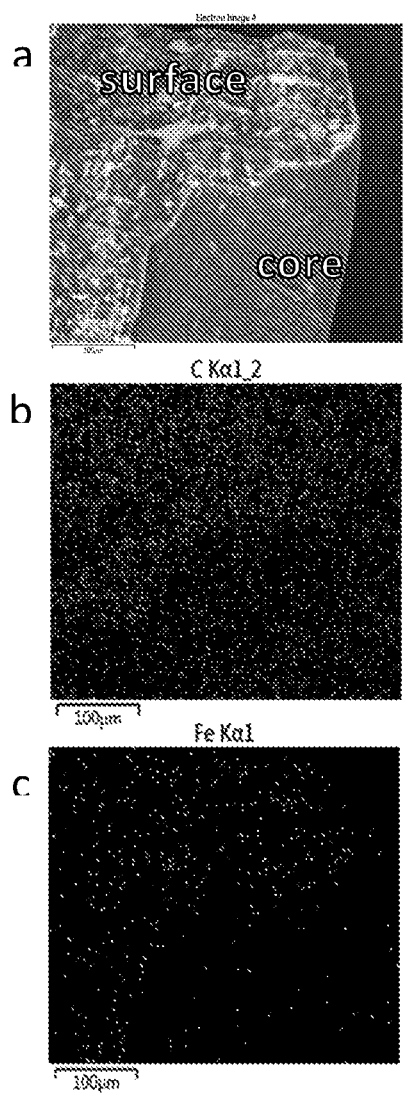
FIG. 20 shows a) SEM images of the cross-section of a printed cylinder with iron oxide nanoparticles. The nanoparticles appear as bright areas in the SEM; energy dispersion spectroscopy (EDS) analysis of the SEM mapping out b) carbon and c) iron in the sample. The 3D iron product was prepared using the formulation described in Example 53.

FIG. 20 shows a) SEM images of the cross-section of a printed cylinder with iron oxide nanoparticles. The nanoparticles appear as bright areas in the SEM; Energy dispersion spectroscopy (EDS) analysis of the SEM mapping out b) carbon and c) iron in the sample.

The results of testing the formulations described above in 3D printing processes are summarized below in Tables 6-8.

TABLE 6

Summary of Examples of 3D printing products that generate functional coatings defined by the concentrations of about 15% to about 35% mol difunctional cross-linking agent of the resin mixture.

| Example No. | Functional component | Resin | % mol cross-linking agent | Processing | Comment |
|---|---|---|---|---|---|
| 16 | AgND + EtOxa (7.9% Ag metal) | 15% wt. EGDA, 84% wt. EHA, 1% wt. TPO-L | 16 | 1) SLA printing 2) thermal sintering | Conducting products 0.64 Ω/cm |
| 17 | AgND + EtOxa (7.9% Ag metal) | 20% wt. EGDA, 79% wt. EHA, 1% wt. TPO-L | 21 | 1) SLA printing 2) thermal sintering | Conducting products 0.88 Ω/cm |
| 18 | AgND + EtOxa (7.9% Ag metal) | 25% wt. EGDA, 74% wt. EHA, 1% wt. TPO-L | 27 | 1) SLA printing 2) thermal sintering | Conducting products 1 Ω/cm |
| 21 | AgND + EtOxa (7.9% Ag metal) | 15% wt. PEGDA250, 84% wt. EHA, 1% wt. TPO-L | 11 | 1) SLA printing 2) thermal sintering | Conducting products 4.3 Ω/cm |
| 22 | AgND + EtOxa (7.9% Ag metal) | 20% wt. PEGDA250, 79% wt. EHA, 1% wt. TPO-L | 14 | 1) SLA printing 2) thermal sintering | Conducting products 1.36 Ω/cm |
| 23 | AgND + EtOxa (7.9% Ag metal) | 25% wt. PEGDA250, 74% wt. EHA, 1% wt. TPO-L | 20 | 1) SLA printing 2) thermal sintering | Conducting products 20 Ω/cm |
| 24 | AgND + EtOxa (7.9% Ag metal) | 35% wt. PEGDA250, 64% wt. EHA, 1% wt TPO-L | 29 | 1) SLA printing 2) thermal sintering | Conducting products 1.4 Ω/cm |
| 27 | AgND + EtOxa (7.9% Ag metal) | 25% wt. TEGDA, 74% wt. EHA, 1% wt. TPO-L | 18 | 1) SLA printing 2) thermal sintering | Conducting products 1.85 Ω/cm |
| 28 | AgND + EtOxa (7.9% Ag metal) | 35% wt.TEGDA, 64% wt. EHA, 1% wt. TPO-L | 26 | 1) SLA printing 2) thermal sintering | Conducting products 1.28 Ω/cm |
| 31 | AgND + EtOxa (7.9% Ag metal) | 25% wt. PEGDA575, 74% wt. EHA, 1% wt. TPO-L | 12 | 1) SLA printing 2) thermal sintering | Conducting products 4.96 Ω/cm |
| 32 | AgND + EtOxa (7.9% Ag metal) | 35% wt. PEGDA575, 64% wt. EHA, 1% wt. TPO-L | 20 | 1) SLA printing 2) thermal sintering | Conducting products 2.16 Ω/cm |
| 33 | AgND + EtOxa (7.9% Ag metal) | 45% wt. PEGDA575, 54% wt. EHA, 1% wt. TPO-L | 28 | 1) SLA printing 2) thermal sintering | Conducting products 4.24 Ω/cm |
| 34 | AgND + EtOxa (7.9% Ag metal) | 50% wt. PEGDA575, 49% wt. EHA, 1% wt. TPO-L | 33 | 1) SLA printing 2) thermal sintering | Conducting products 7.42 Ω/cm |

TABLE 6-continued

Summary of Examples of 3D printing products that generate functional coatings defined by the concentrations of about 15% to about 35% mol difunctional cross-linking agent of the resin mixture.

| Example No. | Functional component | Resin | % mol cross-linking agent | Processing | Comment |
|---|---|---|---|---|---|
| 36 | AgND + EtOxa (7.9% Ag metal) | 25% wt. PEG700, 74% wt. EHA, 1% wt. TPO-L | 11 | 1) SLA printing 2) thermal sintering | Conducting products 2.23 Ω/cm |
| 37 | AgND + EtOxa (7.9% Ag metal) | 35% wt. PEGDA700, 64% wt. EHA, 1% wt. TPO-L | 18 | 1) SLA printing 2) thermal sintering | Conducting products 2.64 Ω/cm |
| 42 | AgND + EtOxa (7.9% Ag metal) | 35% wt. BDDA, 64% wt. EHA, 1% wt. TPO-L | 33 | 1) SLA printing 2) thermal sintering | Conducting products 1.32 Ω/cm |
| 45 | AgND + EtOxa (7.9% Ag metal) | 35% wt. HDDA, 64% wt. EHA, 1% wt. TPO-L | 31 | 1) SLA printing 2) thermal sintering | Conducting products 0.94 Ω/cm |
| 50 | 2.5% $TiO_2$ functionalized with 2-methoxy(polyethyleneoxy) propyl trimethoxysilane | 35% wt. PEGDA250, 64% wt. EHA, 1% wt. TPO-L | 29 | 1) SLA printing 2) thermal sintering | Functional products with phase separation (e.g. coated) |
| 51 | 2.5% $TiO_2$ functionalized with 2-methoxy(polyethyleneoxy) propyl trimethoxysilane | 35% wt. PEGDA250, 61.7% wt. EHA, 1% wt. TPO-L, toluene | 29 | 1) SLA printing 2) thermal sintering | Functional products with phase separation |
| 52 | 2.5% Barium Strontium Titanate (BST) functionalized with 2-methoxy(polyethyleneoxy) propyl trimethoxysilane | 35% wt. PEGDA250, 64% wt. EHA, 1% wt. TPO-L | 29 | 1) SLA printing 2) thermal sintering | Functional products with phase separation |
| 53 | 2.5% Iron oxide | 35% wt. PEGDA250, 64% wt. EHA, 1% wt. TPO-L | 29 | 1) SLA printing 2) thermal sintering | Functional products with phase separation |

TABLE 7

Summary of Examples of 3D printing products that generate products with functionally graded compositions defined by the concentrations of about 35% to about 80% mol difunctional cross-linking agent of the resin mixture or about 10% to about 50% mol tetrafunctional cross-linking agent of the resin mixture.

| Example No. | Functional component | Resin | % mol cross-linking agent | Processing | Comment |
|---|---|---|---|---|---|
| 19 | AgND + EtOxa (7.9% Ag metal) | 35% wt. EGDA, 64% wt. EHA, 1% wt. TPO-L | 37 | 1) SLA printing 2) thermal sintering | Conducting products 37 Ω/cm |
| 20 | AgND + EtOxa (7.9% Ag metal) | 50% wt. EGDA, 49% wt. EHA, 1% wt. TPO-L | 52 | 1) SLA printing 2) thermal sintering | Non-Conducting products |
| 25 | AgND + EtOxa (7.9% Ag metal) | 50% wt. PEGDA250, 49% wt. EHA, 1% wt. TPO-L | 43 | 1) SLA printing 2) thermal sintering | Conducting products 7.6 Ω/cm |
| 29 | AgND + EtOxa (7.9% Ag metal) | 50% wt. TEGDA, 49% wt. EHA, 1% wt. TPO-L | 40 | 1) SLA printing 2) thermal sintering | Conducting products 13.16 Ω/cm |

TABLE 7-continued

Summary of Examples of 3D printing products that generate products with functionally graded compositions defined by the concentrations of about 35% to about 80% mol difunctional cross-linking agent of the resin mixture or about 10% to about 50% mol tetrafunctional cross-linking agent of the resin mixture.

| Example No. | Functional component | Resin | % mol cross-linking agent | Processing | Comment |
|---|---|---|---|---|---|
| 35 | AgND + EtOxa (7.9% Ag metal) | 65% wt. PEGDA575, 34% wt. EHA, 1% wt. TPO-L | 50 | 1) SLA printing 2) thermal sintering | Conducting products 21.04 Ω/cm |
| 38 | AgND + EtOxa (7.9% Ag metal) | 50% wt. PEGDA700, 49% wt. EHA, 1% wt. TPO-L | 32 | 1) SLA printing 2) thermal sintering | Conducting products 12.55 Ω/cm |
| 39 | AgND + EtOxa (7.9% Ag metal) | 60% wt. PEGDA700, 39% wt. EHA, 1% wt. TPO-L | 42 | 1) SLA printing 2) thermal sintering | Conducting products 28.44 Ω/cm |
| 40 | AgND + EtOxa (7.9% Ag metal) | 80% wt. PEGDA700, 19% wt. EHA, 1% TPO-L | 68 | 1) SLA printing 2) thermal sintering | Conducting products 25.94 Ω/cm |
| 43 | AgND + EtOxa (7.9% Ag metal) | 50% wt. BDDA, 49% wt. EHA, 1% wt. TPO-L | 48 | 1) SLA printing 2) thermal sintering | Conducting products 7.24 Ω/cm |
| 44 | AgND + EtOxa (7.9% Ag metal) | 65% wt. BDDA, 34% wt. EHA, 1% wt. TPO-L | 69 | 1) SLA printing 2) thermal sintering | Conducting products 100-500 Ω/cm |
| 46 | AgND + EtOxa (7.9% Ag metal) | 50% wt. HDDA, 49% wt. EHA, 1% wt. TPO-L | 45 | 1) SLA printing 2) thermal sintering | Conducting products 2.9 Ω/cm |
| 47 | AgND + EtOxa (7.9% Ag metal) | 65% wt. HDDA, 34% wt. EHA, 1% TPO-L | 65 | 1) SLA printing 2) thermal sintering | Conducting products 37.4 Ω/cm |
| 48 | AgND + EtOxa (7.9% Ag metal) | 50% wt. HDDA, 49% wt. EGMEA, 1% wt. TPO-L | 50 | 1) SLA printing 2) thermal sintering | Conducting products 112 Ω/cm |
| 49 | AgND + EtOxa (7.9% Ag metal) | 25% wt. DTMPTA, 74% wt. EHA, 1% wt. TPO-L | 16 | 1) SLA printing 2) thermal sintering | Conducting products KΩ/cm |

TABLE 8

Summary of Examples of 3D printing products that generate products with composites as defined by the concentrations of about 80% to about 99% mol difunctional cross-linking agent of the resin mixture.

| Example No. | Functional component | Resin | % mol cross-linking agent | Processing | Comment |
|---|---|---|---|---|---|
| 26 | AgND + EtOxa (7.9% Ag metal) | 99% wt. PEGDA250, 1% wt. TPO-L | 99 | 1) SLA printing 2) thermal sintering | Non-Conducting products |
| 30 | AgND + EtOxa (7.9% Ag metal) | 99% wt. TEGDA, 1% wt. TPO-L | 99 | 1) SLA printing 2) thermal sintering | Non-Conducting products |
| 41 | AgND + EtOxa (7.9% Ag metal) | 99% wt. PEGDA700, 1% wt. TPO-L | 98 | 1) SLA printing 2) thermal sintering | Non-conducting products |

Formulations Generating Coatings Vs Functionally Graded Compositions.

When 3D printing resins have multiple components, the morphology of the printed product may depend on the concentration of cross-linking agent.

With reference to the Examples 16-53, changes in morphology as a function of cross-linking agent concentrations for resins containing non-polymerizing functional and/or functional precursor components were observed. Where the non-polymerizing functional precursor component was silver neodecanoate, it may be converted to silver post printing by heating to elevated temperatures. Other examples include non-polymerizing functional nanoparticles, such as $TiO_2$, $F_2O_3$ and ZnO.

3D Printing of Polymer-Silver Structures.

Figure 8:
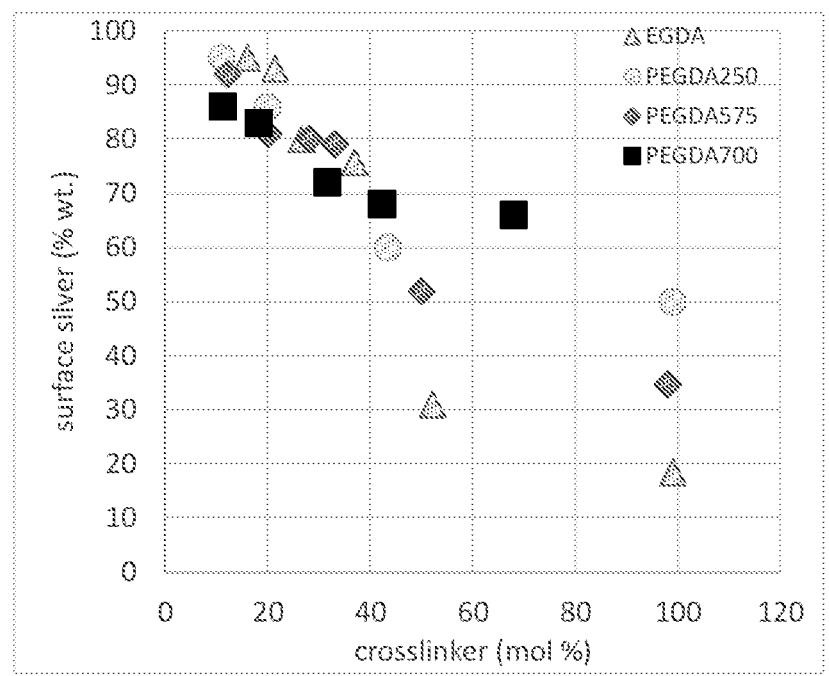
FIG. 8 shows the surface concentration of silver of 3D printed products made from resins with varying amounts of cross-linking agents. The formulations used to make these products are described in Examples 16-26 and 31-41.
Figure 9:
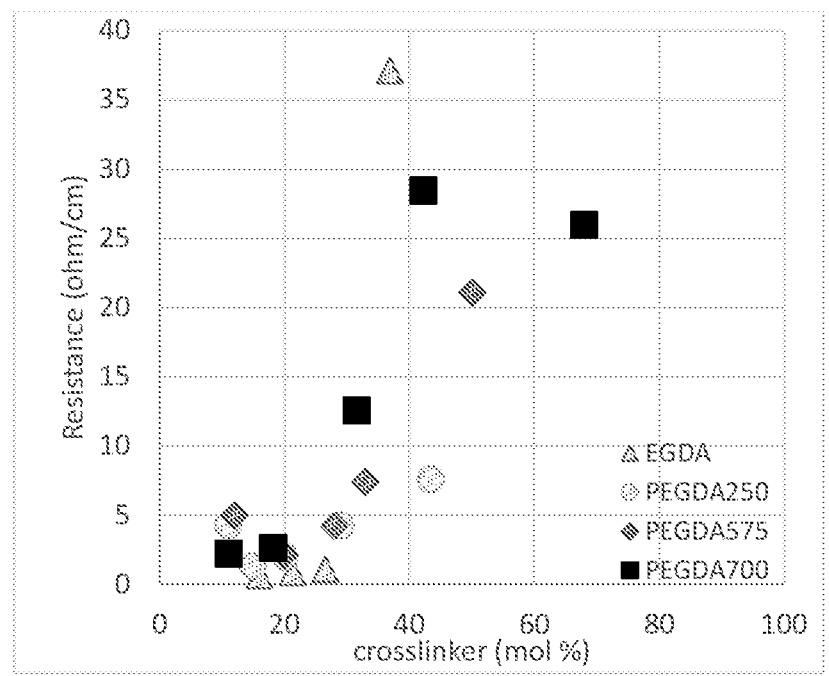
FIG. 9 shows the resistance of the silver coating on 3D printed products made from resins with varying amounts of cross-linking agents. The formulations used to make these products are described in Examples 16-26 and 31-41.
Figure 10:
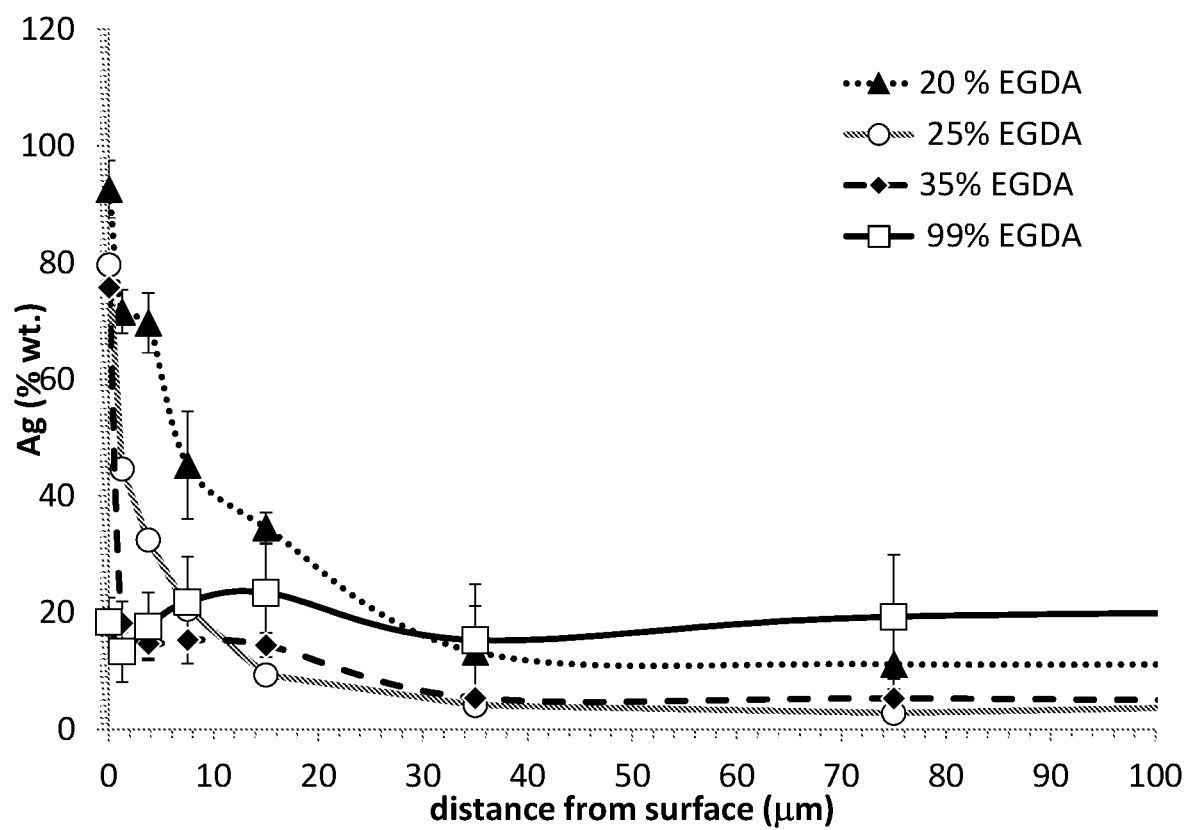
FIG. 10 shows the concentration of silver within a 3D printed cylinder. For samples made with 20-35% EGDA, a silver coating can form where the concentration of silver decreases with increased distance from the surface of the cylinder. For the sample made with 99% EDGA, the silver concentrations are substantially uniform across the cross-section of the product.

Using a difunctional cross-linking agent (e.g. EGDA, PEGDA250, PEGDA575 and PEGDA700), various morphologies in the printed product may be formed depending on the concentration of cross-linking agent. FIG. 8 shows the amount of silver (% wt) at the surface decreased with increased concentration of cross-linking agent. The concentration of silver at the surface can determine the resistance value of the printed product. As the concentration of cross-linking agent increases, the resistance of the silver coating increases due to the lower concentration of silver at the surface (FIG. 9). FIG. 10 illustrates the change in the concentration of silver in a 3D printed cylinder depending on the amount of EGDA cross-linking agent.

Example 54: 3D Printed Strain Sensors

A resin consisting of about 50% PEGDA575, about 49% EHA was prepared by mixing about 5.0 g of polyethyleneglycol diacrylate (Mn 575), about 4.9 g of 2-ethylhexylacrylate, and about 0.1 g of Ethyl (2,4,6-trimethylbenzoyl) phenylphosphinate into a 20 mL scintillation vial. The mixture was mixed using a vortex mixer at about 3200 rpm for about 30 seconds. The resin was SLA printed then thermally sintered at about 250° C. temperature (program) for about 1 hour using reflow oven under nitrogen with about 500 ppm oxygen.

Next, a resin consisting of about 35% PEGDA250, about 64% EHA was prepared by mixing about 3.5 g of polyethyleneglycol diacrylate Mn 250, about 6.4 g of 2-ethylhexylacrylate, and about 0.1 g of Ethyl (2,4,6-trimethylbenzoyl) phenylphosphinate into a 20 mL scintillation vial. The mixture was mixed using a vortex mixer at about 3200 rpm for about 30 seconds. The resin was SLA printed then thermally sintered at about 250° C. temperature (program) for about 1 hour using reflow oven under nitrogen with about 500 ppm oxygen.

The final resin composition was prepared by mixing about 2.5 g of silver neodecanoate dissolved in about 0.552 mL of 2-ethyl-2-oxazoline using a planetary mixer at about 2000 rpm for about 4 min followed by about 2200 rpm for about 30 seconds. To the yellow, viscous silver solution was added about 9.21 g of the acrylate mixed resin (about 7.5 ml (about 50% PEGDA575, about 49% EHA)+about 2.5 ml (about 35% PEGDA250, about 64% EHA)). The combined mixture was then vortex mixed for about 2 minutes at about 3200 rpm. The resin was SLA printed into 3D truss products and then thermally sintered at about 250° C. temperature (program) for about 1 hour using reflow oven under nitrogen with about 500 ppm oxygen.

Example 55: 3D Printed Products with Multimaterial Resin of Silver Precursor, Graphene and Acrylate Resin (7.88% Ag+0.2% Graphene Products Using Mixed Resin (7.5 ml (50% PEGDA575, 49% EHA)+2.5 ml (35% PEGDA250, 64% EHA))

About 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 0.245 g of graphene and about 9.18 g of the acrylate mixed resin (about 7.5 ml (about 50% PEGDA575, about 49% EHA)+about 2.5 ml (about 35% PEGDA250, about 64% EHA)). The combined mixture was then vortex mixed for about 2 minutes at about 3200 rpm and sonicated for about 15 mins. The resin was SLA printed into 3D truss products and then thermally sintered at about 250° C. temperature (program) for about 1 hour using reflow oven under nitrogen with about 500 ppm oxygen.

Conducting structures: ~5-10 Ω/cm resistance, silver is phase separated (e.g. coated)

Example 56: 3D Printed Products with Multimaterial Resin of Silver Precursor, Graphene, Barium Strontium Titanate and Acrylate Resin (7.88% Ag+0.2% Graphene+0.5% BST Products Using Mixed Resin (7.5 ml (50% PEGDA575, 49% EHA)+2.5 ml (35% PEGDA250, 64% EHA))

About 2.5 g of silver neodecanoate were dissolved in about 0.552 mL of 2-ethyl-2-oxazoline using a planetary mixer at about 2000 rpm for about 4 min followed by about 2200 rpm for about 30 seconds. To the yellow, viscous silver solution was added about 0.245 g of graphene, about 0.0613 g of functionalised barium strontium titanate (BST) and about 9.12 g of the acrylate mixed resin (about 7.5 ml (about 50% PEGDA575, about 49% EHA)+about 2.5 ml (about 35% PEGDA250, about 64% EHA)). The combined mixture was then vortex mixed for about 2 minutes at about 3200 rpm and sonicated for about 15 mins. The resin was SLA printed into 3D truss products and then thermally sintered at about 250° C. temperature (program) for about 1 hour using reflow oven under nitrogen with about 500 ppm oxygen.

Conducting structures: ~5-10 Ω/cm resistance, silver is phase separated

Graded Silver as Strain Sensors

Figure 11:
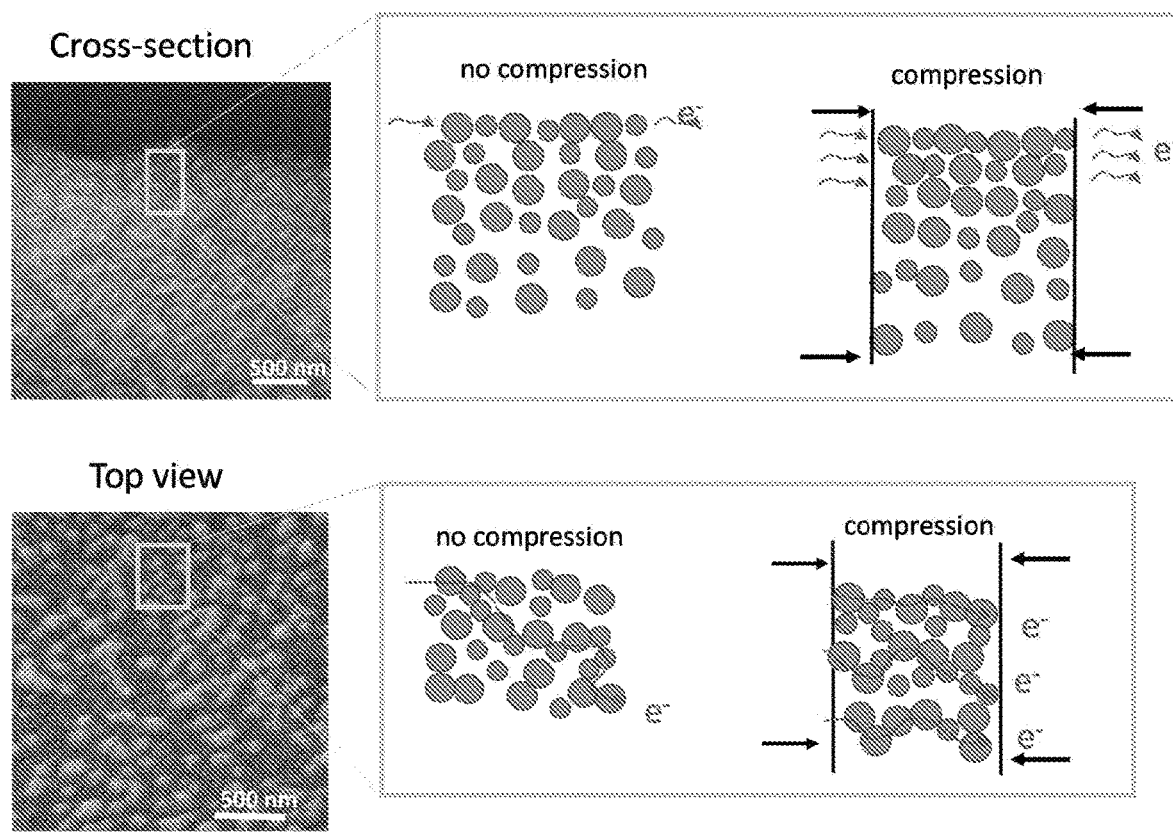
FIG. 11 shows SEM images and schematic of a strain sensor made from a 3D printed product. The 3D silver product was prepared using the resin composition described in Example 54. As the strain sensor is compressed, the silver nanoparticles made contact and increased the conductivity of the silver film.
Figure 12:
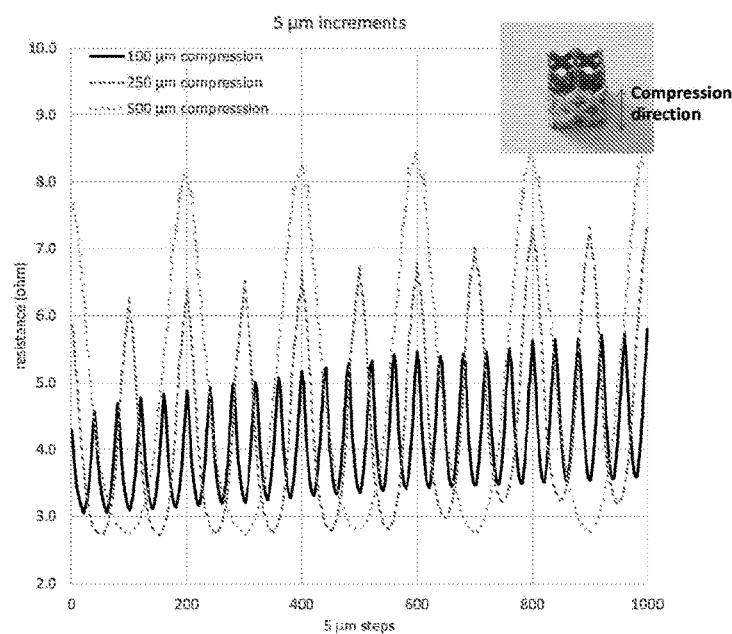
FIG. 12 shows the results of a cycling experiment where the electrical resistance of a 3D printed strain sensor was compressed by various length scales. As the sample is compressed, the resistance drops. The 3D silver product was prepared using the formulation described in Example 54.

For samples made with an intermediate concentration of difunctional cross-linking agent (about 35% to about 80% mol), the products formed a graded composition with a high concentration of silver particles in the polymer near the surface of the product and decreasing in concentration away from the surface of the product. The morphology of silver particles made it possible to generate a strain sensor as described in FIG. 11. As the product was compressed, the silver nanoparticles embedded in the product make contact increasing the electrical conductivity of the sample as shown in FIG. 12.

Example 57: Evaluation of the Antibacterial Behaviors of 3D Printed Ag Product and the Control Resin Product without Ag Through Halo Inhibition Zone Tests Silver has been known to possess a broad-spectrum against bacteria and limited toxicity towards mammalian cells. Nano-silver particles of which antibacterial and antifungal properties have been shown in various in vitro and in vivo studies are used in many medical and dental fields for the prevention of infection. Currently, nano-silver particles have been applied to a wide range of health-care products, such as burn dressings, water purification systems, and dental and medical devices. For example silver incorporated in orthodontic brackets will be useful in dentistry. 3D printed functional products of this kind can be produced according to the formulations and methods of the present disclosure.

Control Product: (about 35% PEGDA575, about 64% EHA) Resin: about 3.5 g of polyethyleneglycol diacrylate Mn 575, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. The resin was SLA printed then thermally sintered at about 250° C. temperature (program) for about 1 hour using reflow oven under nitrogen with about 500 ppm oxygen.

About 0.5% Ad Products: Ag Precursor+(about 35% PEGDA575, about 64% EHA) Resin: about 3.5 g of polyethyleneglycol diacrylate Mn 575, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 0.158 g of silver neodecanoate were dissolved in about 0.035 mL of 2-ethyl-2-oxazoline using a planetary mixer at about 2000 rpm for about 4 min followed by about 2200 rpm for about 30 seconds. To the yellow, viscous silver solution was added about 12.08 g of the acrylate mixture from the first vial. The combined mixture was then vortex mixed for about 2 minutes at about 3200 rpm. The resin was SLA printed and then thermally sintered at 250° C. temperature (program) for 1 hour using reflow oven under nitrogen with about 500 ppm oxygen.

About 1.0% Ag Products: Ag Precursor+(about 35% PEGDA575, about 64% EHA) Resin: about 3.5 g of polyethyleneglycol diacrylate Mn 575, about 6.4 g of 2-ethylhexylacrylate, and about 0.1 g of Ethyl (2,4,6-trimethylbenzoyl) phenylphosphinate were added into a 20 mL scintillation vial. The mixture was mixed using a vortex mixer at about 3200 rpm for about 30 seconds. In a separate vial, about 0.317 g of silver neodecanoate were dissolved in about 0.070 mL of 2-ethyl-2-oxazoline using a planetary mixer at about 2000 rpm for about 4 min followed by about 2200 rpm for about 30 seconds. To the yellow, viscous silver solution was added about 11.88 g of the acrylate mixture from the first vial. The combined mixture was then vortex mixed for about 2 minutes at about 3200 rpm. The resin was SLA printed and then thermally sintered at about 250° C. temperature (program) for about 1 hour using reflow oven under nitrogen with about 500 ppm oxygen.

Figure 13:
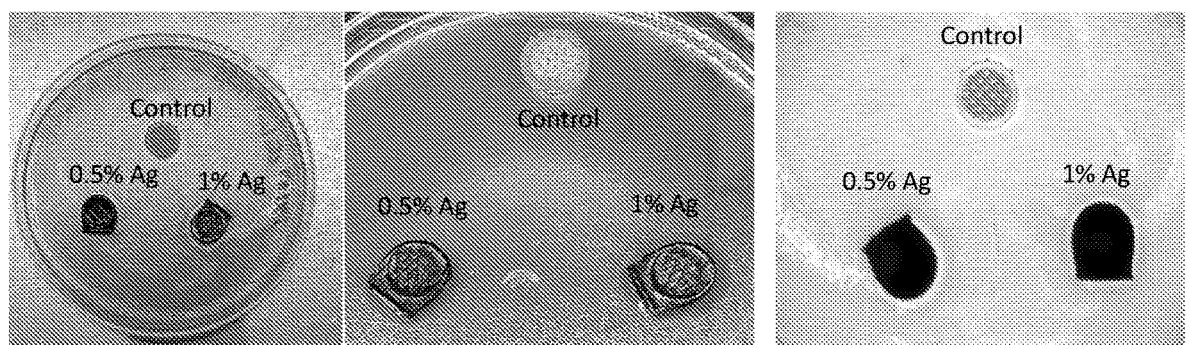
FIG. 13 shows representative photographs of the bacterial inhibition zones created by the different scaffolds against *E. coli*. *E. coli* was plated on LB agar at ~1×109 cfu/ml, 18 hr growth. The 3D products were prepared using the formulation described in Example 57.
Figure 14:
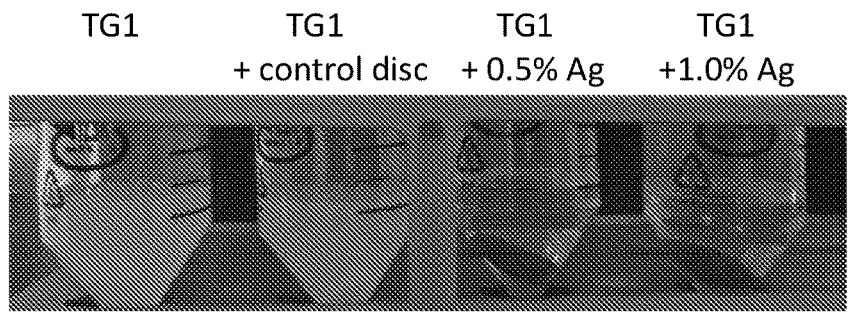
FIG. 14 shows representative photographs of antibacterial performance of different scaffolds against TG1 (*E. coli*). 24 hr growth of TG1 with 3D silver products and control product. The 3D silver products were prepared using the formulation described in Example 57.
Figure 15:
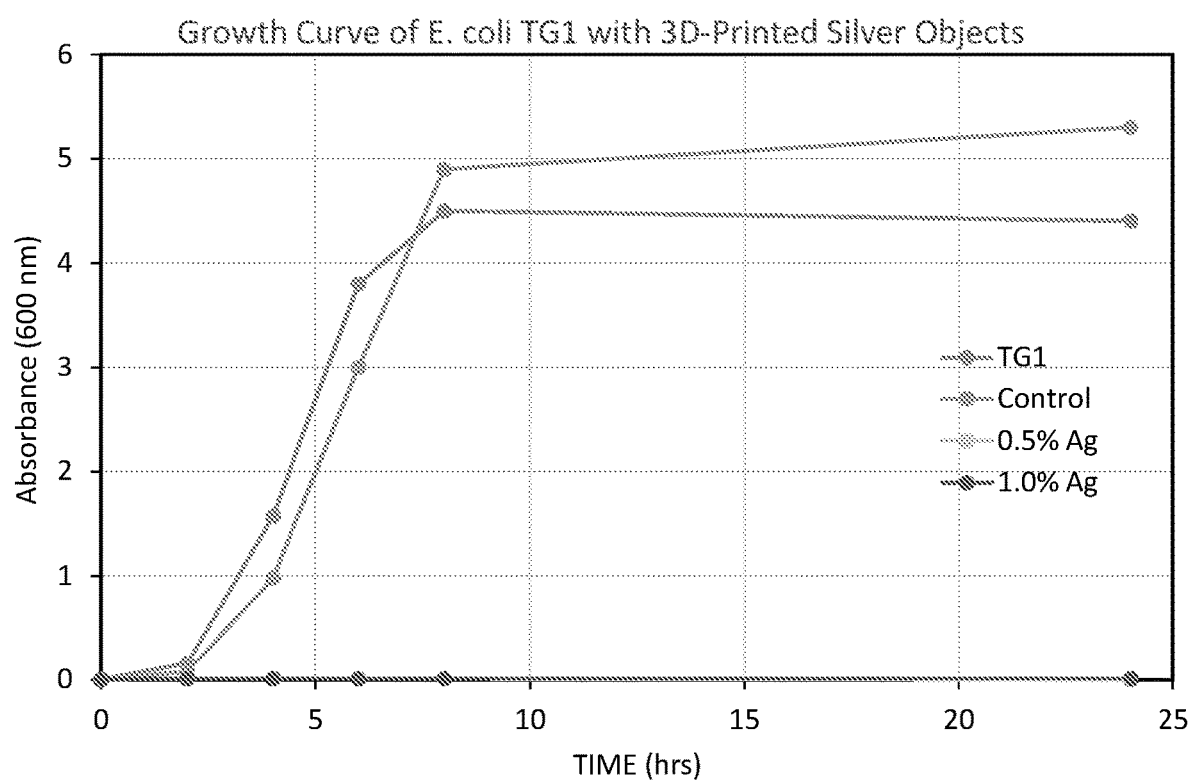
FIG. 15 shows a growth curve of *E. coli* TG1 with 3D silver products and control product. The 3D silver products were prepared using the formulation described in Example 57.
Figure 16:
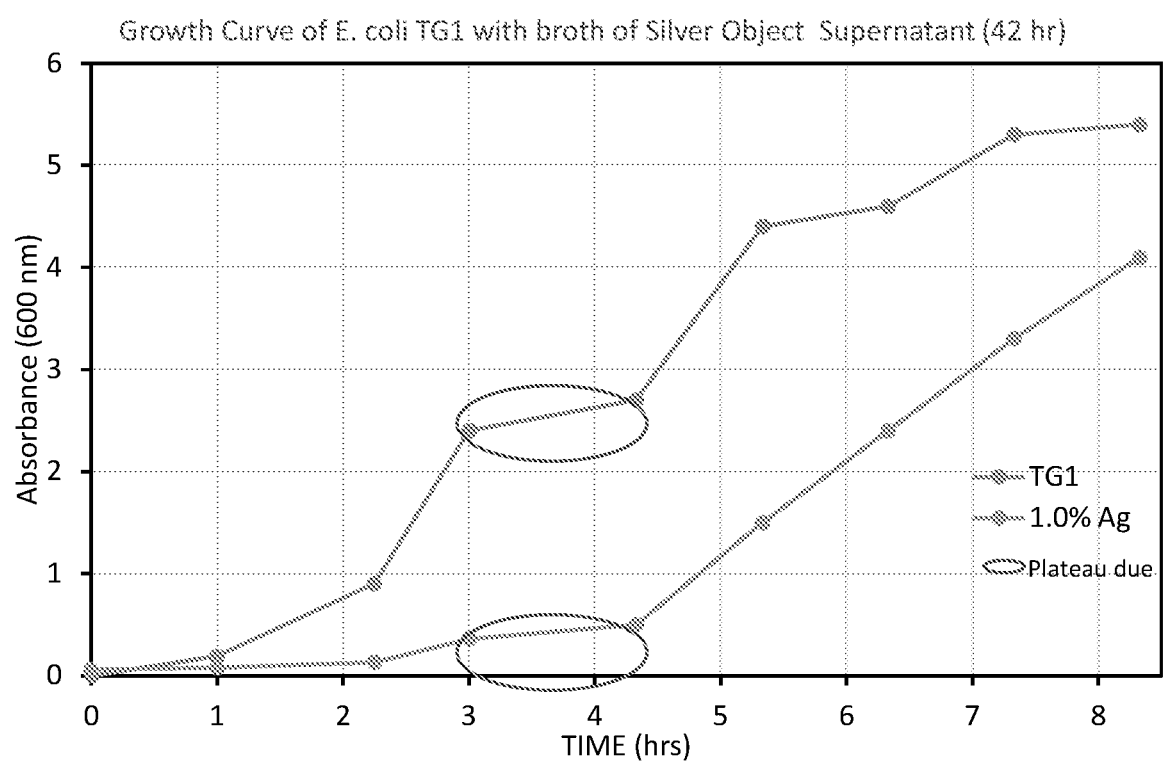
FIG. 16 shows a growth curve of *E. coli* TG1 with broth of silver product supernatant (42 hr). The 3D silver products were prepared using the formulation described in Example 57.

The procedure used to conduct the antimicrobial tests and obtain the results shown in FIGS. 13-16 are described in Balouiri et al. Journal of PharmaceuticalAnalysis 6 (2016) 71-79 and Belkhair et al. RSC Adv., 2015, 5, 40932-40939, both of which are herein incorporated by reference in their entirety. As shown in FIG. 13, there is bacterial growth inhibition in the Ag products compared to controls that do not contain Ag in the zones that arise in proximity to scaffolds. FIG. 13 shows evaluation of the antibacterial behaviors of a 3D printed Ag object and a control resin object without Ag through halo inhibition zone tests on *E. coli* plated agar plates. In the proximity of the 3D objects with Ag, growth is inhibited due to Ag leaching. FIG. 14 shows bacterial growth on the 3D object with and without Ag in culture. FIG. 15 shows bacterial growth kinetics with the 3D object with and without Ag in a liquid culture. FIG. 16 shows bacterial growth kinetics of the supernatant from the FIG. 15 study in liquid culture without 3D objects. In all examples, the Ag object shows bacterial growth inhibition as reflected by the lower absorbance values. In FIG. 15, the control provided the highest absorbance readings over time.

Example 58: SLA Printing of Hydrophobic Tiles Using Fluorinated Monomers

Molecular coatings can be generated from slow polymerizing monomers (methacrylates) in a resin containing mostly fast polymerizing acrylates. In one embodiment, fluorinated methacrylates were used to make a fluorinated hydrophobic coating from a resin containing primarily non-fluorinated acrylates. The resulting products are useful for anti-fouling/anti-microbial and de-icing applications.

Three series of resins containing varying concentrations of fluorinated monomer, 2-ethylhexyl acrylate and trimethylolpropane triacrylate were prepared according to Tables 9, 10 and 11. Ethyl (2,4,6-trimethylbenzoyl) phenylphosphinate was used as a photoinitiator in all resins. The resins were SLA printed into tiles 1 cm×1 cm×0.2 cm in size using a Peopoly Moai SLA 3D printer with a about 210 mW laser and laser setting of about 75. Once printed, the tiles were removed from the build plate and washed in ethanol. The contact angles of the 3D printed tiles and the UV-cured films were measured using a 5 µL drop of water.

TABLE 9

Resin formulations using 1H, 1H-perfluorooctyl methacrylate.

| % wt. 2-ethylhexylacrylate | % wt. 1H,1H-PERFLUOROOCTYL METHACRYLATE | % wt. trimethylolpropane triacrylate | % wt. ethyl (2,4,6-trimethylbenzoyl) phenylphosphinate |
|---|---|---|---|
| 0 | 0 | 98 | 2 |
| 1 | 1 | 96 | 2 |
| 5 | 5 | 88 | 2 |
| 10 | 10 | 78 | 2 |
| 20 | 20 | 58 | 2 |
| 30 | 30 | 38 | 2 |
| 40 | 40 | 18 | 2 |

TABLE 10

Resin formulations using 2,2,3,4,4,4-hexafluorobutyl acrylate.

| % wt. 2,2,3,4,4,4-HEXAFLUOROBUTYL ACRYLATE | % wt. trimethylolpropane triacrylate | % wt. ethyl (2,4,6-trimethylbenzoyl) phenylphosphinate |
|---|---|---|
| 1.0 | 98.0 | 1.0 |
| 5.0 | 94.0 | 1.0 |
| 10.0 | 89.0 | 1.0 |
| 20.0 | 79.0 | 1.0 |
| 30.0 | 69.0 | 1.0 |
| 40.0 | 59.0 | 1.0 |

TABLE 11

Resin formulations using 2,2,3,4,4,4-hexafluorobutyl methacrylate.

| % wt. 2,2,3,4,4,4-HEXAFLUOROBUTYL METHACRYLATE | % wt. trimethylolpropane triacrylate | % wt. ethyl (2,4,6-trimethylbenzoyl) phenylphosphinate |
|---|---|---|
| 1.0 | 98.0 | 1.0 |
| 5.0 | 94.0 | 1.0 |
| 10.0 | 89.0 | 1.0 |
| 20.0 | 79.0 | 1.0 |
| 30.0 | 69.0 | 1.0 |

Figure 21:
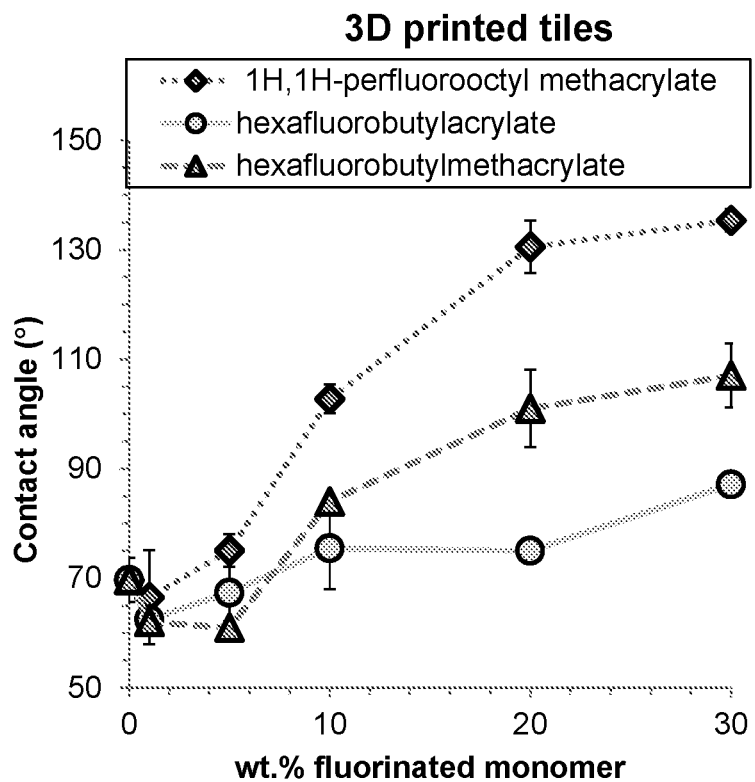
FIG. 21 shows the contact angle of 3D printed tiles printed using photoresins with three different fluorinated monomers. The 3D printed tiles were prepared using the formulation described in Example 58.

The results in FIG. 21 are the contact angles of tiles printed from the photoresins containing a fluorinated monomer of varying concentrations. The results show that as the weight fraction of fluorinated monomer increases, the contact angles of the surfaces of the tiles increases. The photoresins with fluorinated methacrylates (i.e. 1H, 1H-perfluorooctyl methacrylate and 2,2,3,4,4,4-hexafluorobutyl methacrylate) have greater contact angles at lower concentrations of % wt. fluorinated monomer in comparison to the fluorinated acrylate (i.e. 2,2,3,4,4,4-hexafluorobutyl acrylate). Without being bound by theory, this result may be due to the lower polymerization rates of methacrylates in comparison to acrylates that cause these monomers to polymerize at later stages during the printing process and cause these monomers to concentrate at the surface of the product.

Figure 22:
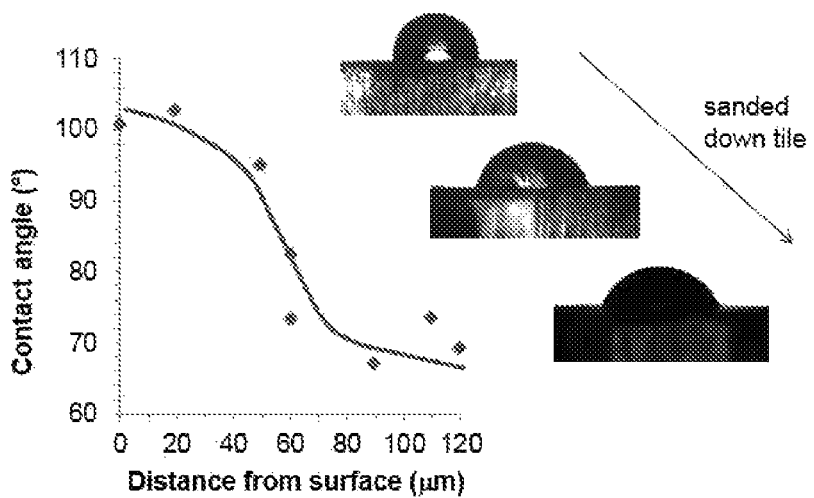
FIG. 22 shows the contact angle of 3D printed tiles, printed using 20% wt. 2,2,3,4,4,4-hexafluorobutyl methacrylate, as a function of depth of the tile. The 3D printed tiles were prepared using the formulation described in Example 58.

FIG. 22 illustrates the changes in contact angles as layers of polymers are removed for a tile printed using about 20% wt. 2,2,3,4,4,4-hexafluorobutyl methacrylate. The results show that the contact angle of the tile decreased as a function of the depth of the tile, an indication that the fluorinated component was concentrated at the surface of the tile.

Other Examples May Also Include the Following Items:

1. A method for making a product, the method comprising:
    a) combining at least one first component and at least one polymerizable component to form a composition; and
    b) polymerizing the at least one polymerizable component to form at least one polymer, wherein at least two phases are formed from the at least one first component and the at least one polymer,
    wherein the at least one first component comprises at least one functional component, at least one functional precursor component, or combinations thereof, and
    wherein the product is a functional product, a functional precursor product, or a combination of a functional and functional precursor product.
2. The method of item 1, wherein the polymerizing in b) comprises photopolymerization.
3. The method of item 1 or 2, wherein the composition further comprises at least one photoinitiator.
4. The method of any one of items 1 to 3, wherein the polymerizing in b) is achieved via 3D printing.
5. The method of item 4, wherein the 3D printing uses photoactivation.
6. The method of item 3 or 4, wherein the 3D printing is vat polymerization.
7. The method of any one of items 4 to 6, wherein the 3D printing is stereolithographic (SLA) printing, digital light processing (DLP) or volumetric 3D printing.
8. The method of any one of items 1 to 7, wherein the composition is substantially homogeneous.
9. The method of any one of items 1 to 8, wherein the composition is a substantially homogeneous mixture.
10. The method of any one of items 1 to 9, further comprising c) sintering and/or pyrolyzing.
11. The method of item 10, further comprising c) sintering.
12. The method of item 10 or 11, wherein the sintering is at least one of thermal sintering, UV-VIS radiation sintering, and laser sintering.
13. The method of any one of items 1 to 9, wherein the at least one first component comprises the at least one functional precursor component, the method further comprising c) converting the at least one functional precursor component into at least one second functional component.
14. The method of item 13, wherein the at least one second functional component is different from the at least one functional component.
15. The method of item 13 or 14, wherein the converting comprises sintering and/or pyrolyzing.
16. The method of item 15, wherein the converting comprises sintering.
17. The method of item 15 or 16, wherein the sintering is at least one of thermal sintering, UV-VIS radiation sintering, and laser sintering.
18. The method of any one of items 1 to 17, wherein, upon polymerization, the at least one first component phase separates and migrates towards an area where the concentration of the at least one polymerizable component is greater.
19. The method of any one of items 1 to 18, wherein the at least two phases is two phases.
20. The method of item 19, wherein the two phases comprises a first phase and a second phase, wherein the first phase comprises the at least one polymer and the second phase comprises the at least one first component.
21. The method of any one of items 1 to 18, wherein the at least two phases further comprises an interface between the first phase and the second phase, wherein the interface has a concentration gradient of the at least one first component, whereby the concentration of the at least one first component decreases with distance away from the second phase towards the first phase.
22. The method of any one of items 1 to 21, wherein each of the phases comprise concentration gradients, composites, and/or coatings.
23. The method of any one of items 1 to 21, wherein at least one of the phases is a coating.
24. The method of any one of items 1 to 22, wherein the at least two phases is a concentration gradient.
25. The method of any one of items 1 to 22, wherein the at least two phases is a composite.
26. The method of any one of items 1 to 25, wherein each of the phases is a discrete phase.
27. The method of any one of items 1 to 26, wherein the at least one polymerizable component comprises at least one monomer and/or at least one oligomer.

28. The method of item 27, wherein the at least one monomer and/or at least one oligomer is selected from acrylates.

29. The method of item 27 or 28, wherein the at least one monomer and/or at least one oligomer is ethyleneglycol methyl ether acrylate, N,N-diisobutyl-acrylamide, N-vinylpyrrolidone, (meth)acryloyl morpholine, 7-amino-3,7-dimethyloctyl, (meth)acrylate, isobutoxymethyl (meth) acrylamide, isobornyloxyethyl (meth)acrylate, isobornyl (meth) acrylate, 2-ethylhexyl acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth) acrylate, lauryl (meth)acrylate, dicyclopentadiene (meth)acrylate, dicyclopentenyloxyethyl (meth)acrylate, dicyclopentenyl (meth) acrylate, N,N-dimethyl (meth)acrylamide tetrachlorophenyl (meth)acrylate, 2-tetrachlorophenoxyethyl (meth)acrylate, tetrahydrofurfuryl (meth)acrylate, tetrabromophenyl (meth) acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth) acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth) acrylate, alkoxylated alkyl phenol acrylate, (poly)caprolactone acrylate ester from methylol-tetrahydrofuran, (poly) caprolactone acrylate ester from alkylol-dioxane, ethylene glycol phenyl ether acrylate, and/or methacryloxypropyl terminated polydimethylsiloxane.

30. The method of item 27, wherein the at least one monomer and/or at least one oligomer is 3,4-epoxyclyclohexylmethyl 3,4-epoxycylcohexanecarboxylate, and/or epoxycyclohexylethyl terminated polydimethylsiloxane.

31. The method of item 27, wherein the at least one monomer and/or at least one oligomer is 2-ethylhexyl acrylate and/or ethyleneglycol methyl ether acrylate.

32. The method of any one of items 27 to 31, wherein the at least one monomer is selected from mono-functional monomers.

33. The method of any one of items 27 to 32, wherein the at least one polymerizable component further comprises at least one cross-linking agent.

34. The method of any one of items 1 to 26, wherein the at least one polymerizable component comprises at least one cross-linking agent.

35. The method of item 33 or 34, wherein the at least one polymerizable component comprises from about 10% to about 99% by weight of the at least one cross-linking agent based on the weight of the composition without the at least one first component, optionally, from about 15% to about 99% by weight of the at least one cross-linking agent based on the weight of the composition without the at least one first component.

36. The method of item 33, wherein the at least one polymerizable component comprises from about 1% to about 90% by weight of the at least one monomer and/or at least one oligomer and about 10% to about 99% by weight of the at least one cross-linking agent based on the weight of the composition without the at least one first component, optionally, from about 1% to about 85% by weight of the at least one monomer and/or at least one oligomer and about 15% to about 99% by weight of the at least one cross-linking agent based on the weight of the composition without the at least one first component.

37. The method of any one of items 33 to 36, wherein the at least one cross-linking agent is a methacrylic compound, an acrylic compound, a vinyl compound, and/or an allyl compound.

38. The method of item 37, wherein the at least one cross-linking agent is 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, diacrylic urethane oligomers (reaction products of isocyanate terminate polyol and 2-hydroethylacrylate), tris(2-hydroxyethyl)isocyanurate trimethacrylate, tris(2-hydroxyethyl)isocyanurate triacrylate, trimethylolpropane trimethacrylate, trimethylolpropane triacrylate, pentaerythritol triacrylate, pentaerythritol tetraacrylate, di(trimethylolpropane) tetraacrylate, ethoxylated pentaerythritol tetraacrylate, dipentaerythritol pentaacrylate, pentaacrylate ester, ethylene glycol di(meth) acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth)acrylate, EO modified trimethylolpropane tri(meth)acrylate, PO modified trimethylolpropane tri(meth)acrylate, tripropylene glycol di(meth) acrylate, neopentyl glycol di(meth)acrylate, both terminal (meth)acrylic acid adduct of bisphenol A diglycidyl ether, 1,4-butanediol di(meth)acrylate, 1,6-hexanediol di(meth) acrylate, pentaerythritol tri(meth)acrylate, pentaerythritol tetra(meth)acrylate, polyester di(meth)acrylate, polyethylene glycol di(meth)acrylate, dipentaerythritol hexa(meth) acrylate, dipentaerythritolpenta(meth)acrylate, dipentaerythritol tetra(meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, and/or triethylene glycol dithiol.

39. The method of any one of items 33 to 36, wherein the at least one cross-linking agent is ethylene glycol diacrylate, polyethylene glycol diacrylate, tetraethyleneglycol diacrylate, butanediol diacrylate, hexanediol diacrylate, and/or di(trimethylolpropane) tetraacrylate.

40. The method of any one of items 33 to 39, wherein the at least one cross-linking agent has two or more functional groups, optionally, di-, tri-, or tetra-functional groups.

41. The method of any one of items 33 to 40, wherein the concentration of the at least one cross-linking agent and the rate at which the at least one monomer polymerizes is selected such that a product comprising a composite is formed.

42. The method of item 41, wherein the concentration of the at least one cross-linking agent is from about 80% to about 99% mol based on the mol of the composition.

43. The method of any one of items 33 to 40, wherein the concentration of the at least one cross-linking agent and the rate at which the at least one monomer polymerizes is selected such that the at least one monomer and the at least one first component diffuse towards the surface of the product to form a product comprising a coating.

44. The method of item 43, wherein the concentration of the at least one crosslinking agent is less than about 35% mol based on the mol of the composition, wherein the concentration of the at least one crosslinking agent is about 10% to about 35% mol based on the mol of the composition, or wherein the concentration of the at least one crosslinking agent is about 15% to about 35% mol based on the mol of the composition.

45. The method of any one of items 33 to 40, wherein the concentration of the at least one cross-linking agent and the rate at which the at least one monomer polymerizes is selected such that a product comprising a concentration gradient is formed.

46. The method of item 45, wherein the concentration of the at least one cross-linking agent is from about 35% to about 80% mol based on the mol of the composition.

47. The method of any one of items 33 to 40, wherein the concentration of the at least one first component at the surface of the product decreases with increased concentration of the at least one cross-linking agent.

48. The method of any one of items 33 to 47, wherein the ratio of the at least one monomer to the at least one cross-linking agent is about 9:1 to about 0:10 based on % by weight, about 9:1 to about 1:9 based on % by weight, about 8:2 to about 2:8 based on % by weight, about 7:3 to about 3:7 based on % by weight, about 6:4 to about 4:6 based on % by weight, about 5:5 to about 5:5 based on % by weight, about 4:6 to about 6:4 based on % by weight, about 3:7 to about 7:3 based on % by weight, about 2:8 to about 8:2 based on % by weight, or about 1:10 to about 9:1 based on % by weight.

49. The method of any one of items 33 to 48, wherein the ratio of the at least one monomer to the at least one cross-linking agent to the at least one photoinitiator, is from about 8.9:1:0.1 to about 0:9.9:0.1 based on % by weight of the at least one monomer to the at least one cross-linking agent to the at least one photoinitiator.

50. The method of any one of items 1 to 49, wherein the at least one polymerizable component comprises at least one resin, optionally, at least one acrylate based-resin.

51. The method of item 50, wherein the at least one resin comprises at least one commercial resin.

52. The method of any one of items 1 to 51, wherein the method is a 2D or 3D printing method.

53. The method of item 52, wherein the 3D printing is vat polymerization.

54. The method of item 52, wherein the 3D printing is stereolithographic (SLA) printing, digital light processing (DLP) or volumetric 3D printing.

55. The method of any one of items 1 to 54, wherein the at least one polymerizable component comprises at least one ceramic precursor.

56. The method of any one of items 1 to 55, wherein the at least one polymer has a modulus range of about 0.1 MPa to about 8000 MPa.

57. The method of any one of items 1 to 56, wherein the amount of the at least one polymerizable component is from about 10% to about 99% by weight based on the weight of the composition.

58. The method of item 57, wherein the amount of the at least one polymerizable component is from about 80% to about 99% by weight based on the weight of the composition.

59. The method of any one of items 1 to 58, wherein the at least one first component is substantially soluble in the at least one polymerizable component and is substantially insoluble when the at least one polymerizable component polymerizes.

60. The method of any one of items 1 to 59, wherein the at least one first component comprises the at least one functional component and the product is the functional product.

61. The method of any one of items 1 to 59, wherein the at least one first component comprises the at least one functional precursor component and the product is the functional precursor product.

62. The method of any one of items 1 to 59, wherein the at least one first component comprises the at least one functional component and the at least one functional precursor component and the product is the combination of the functional and functional precursor product.

63. The method of any one of items 1 to 62, wherein the at least one first component is selected from the group consisting of functional monomers, functional polymers, metal precursors, carbon nanotubes (CNT), graphene, metal alloy precursors, metalloid precursors, and combinations thereof.

64. The method of item 63, wherein the at least one first component comprises at least one functional monomer.

65. The method of item 64, wherein the at least one functional monomer has a hydrophobic property.

66. The method of item 64 or 65, wherein the at least one functional monomer is at least one fluorinated monomer.

67. The method of item 66, wherein the at least one fluorinated monomer comprises at least one fluorinated methacrylate.

68. The method of item 63, wherein the at least one first component comprises at least one functional polymer.

69. The method of item 63, wherein the at least one first component is selected from the group consisting of metal salts, metal oxides, metal coordination compounds, organometallic compounds, organometalloid compounds, and combinations thereof.

70. The method of item 63, wherein the at least one first component is selected from the group consisting of metal salts, metal oxides, metalloid salts, and combinations thereof.

71. The method of item 63, wherein the at least one first component is selected from the group consisting of metal carboxylates, metalloid carboxylates, and combinations thereof.

72. The method of item 71, wherein the metal carboxylates comprise from 1 to 20 carbon atoms.

73. The method of item 72, wherein the metal carboxylates comprise from 6 to 15 carbon atoms.

74. The method of item 72, wherein the metal carboxylates comprise from 8 to 12 carbon atoms.

75. The method of any one of items 71 to 74, wherein the carboxylate group of the metal carboxylates is an alkanoate.

76. The method of item 63, wherein the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof.

77. The method of any one of items 63 and 69 to 76, wherein the metal is selected from a transition metal.

78. The method of item 77, wherein the metal is selected from the group consisting of aluminum, silver, gold, platinum, titanium, and copper.

79. The method of any one of items 1 to 78, wherein the at least one first component is selected from nanowires, microparticles, nanoparticles, or combinations thereof.

80. The method of any one of items 1 to 63, wherein the at least one first component comprises graphene.

81. The method of any one of items 1 to 80, wherein the amount of the at least one first component is from about 0.1% to about 90% by weight based on the weight of the composition.

82. The method of item 81, wherein the amount of the at least one first component is from about 0.1% to about 20% by weight based on the weight of the composition.

83. The method of any one of items 1 to 82, wherein the at least two phases comprise a first and second phase, wherein the first phase further comprises at least one first component, wherein the at least one first component is the same or different from the at least one first component of the second phase.

84. The method of any one of items 1 to 83, wherein the product is a functional material.

85. The method of item 84, wherein the functional material is a functionally graded material (FGM).

86. The method of item 85, wherein the FGM is a functionally graded composite material (FGCM).

87. The method of any one of items 1 to 86, wherein the product is a 3D printable product.

88. The method of any one of items 1 to 87, wherein the product is a 3D printable composite product, optionally, non-conducting.

89. The method of any one of items 1 to 88, wherein the product has at least one functional property selected from chemical properties, mechanical properties, magnetic properties, optical properties, protective properties (e.g. heat, radiation, mechanical abrasion), electrical properties, electrochemical, catalytic properties, and/or combinations thereof.

90. The method of any one of items 1 to 89, wherein the product is multifunctional and/or is a precursor to being multifunctional.

91. The method of any one of items 1 to 90, wherein the product is at least one of stretchable, flexible, lightweight, porous, conductive, non-conductive, surface durable, increased surface area, hydrophobic, biocompatible, antibacterial, mould resistant, wear-resistant, heat resistant, cold resistant, improved surface properties (antifouling), reduce flame retardancy, and combinations thereof.

92. The method of any one of items 1 to 91, the composition further comprising at least one additive, optionally, selected from the group consisting of fillers, inhibitors, adhesion promoters, absorbers, dyes, pigments, anti-oxidants, carrier vehicles, heat stabilizers, flame retardants, thixotropic agents, flow control additives, dispersants, and/or combinations thereof, optionally, nanoparticles.

93. The method of any one of items 1 to 92, wherein the product is an antenna.

94. A product made by the method according to any one of items 1 to 93.

95. A product comprising:
i) a first phase comprising at least one polymer; and
ii) a second phase comprising at least one first component, wherein the at least one first component comprises at least one functional component, at least one functional precursor component, or combinations thereof, and
wherein the product is a functional product, a functional precursor product, or a combination of a functional and functional precursor product.

96. The product of item 95, further comprising iii) an interface between the first phase and the second phase, wherein the interface has a concentration gradient of the at least one first component, whereby the concentration of the at least one first component decreases with distance away from the second phase towards the first phase.

97. The product of item 95 or 96, wherein the product is a 2D or 3D printed product.

98. The product of item 97, wherein the product is a 3D printed product, optionally, 3D printed via vat polymerization.

99. The product of item 98, wherein the 3D printed product was printed via stereolithographic (SLA) printing, digital light processing (DLP) or volumetric 3D printing.

100. The product of any one of items 95 to 99, wherein the product has two phases.

101. The product of any one of items 95 to 99, wherein the product has three phases, wherein the first phase comprises the at least one polymer, the interface comprises the at least one polymer and the at least one first component, and the third phase comprises the at least one first component.

102. The product of any one of items 95 to 101, wherein each of the phases comprise concentration gradients, composites, and/or coatings, optionally, at least one of the phases is a coat.

103. The product of any one of items 95 to 102, wherein at least one of the phases of the product is a coat.

104. The product of any one of items 95 to 102, wherein the product is a concentration gradient.

105. The product of any one of items 95 to 102, wherein the product is a composite.

106. The product of any one of items 95 to 105, wherein each of the phases is a discrete phase.

107. The product of any one of items 95 to 106, wherein the at least one polymer is formed from at least one resin, optionally, at least one acrylate based-resin.

108. The product of item 107, wherein the at least one resin comprises at least one commercial resin, optionally, for 3D-printing.

109. The product of any one of items 95 to 108, wherein the at least one polymer has a modulus range of about 0.1 MPa to about 8000 MPa.

110. The product of any one of items 95 to 109, wherein the amount of the at least one polymer is from about 10% to about 99.9% by weight based on the weight of the product.

111. The product of item 110, wherein the amount of the at least one polymer is from about 80% to about 99.9% by weight based on the weight of the product.

112. The product of any one of items 95 to 111, wherein the at least one first component comprises the at least one functional component and the product is the functional product.

113. The product of any one of items 95 to 111, wherein the at least one first component comprises the at least one functional precursor component and the product is the functional precursor product.

114. The product of any one of items 95 to 111, wherein the at least one first component comprises the at least one functional component and the at least one functional precursor component and the product is the combination of the functional and functional precursor product.

115. The product of any one of items 95 to 114, wherein the at least one first component is selected from the group consisting of functional monomers, functional polymers, metal precursors, carbon nanotubes (CNT), graphene, metal alloy precursors, metalloid precursors, and combinations thereof.

116. The product of item 115, wherein the at least one first component comprises at least one functional monomer.

117. The product of item 116, wherein the at least one functional monomer has a hydrophobic property.

118. The product of item 116 or 117, wherein the at least one functional monomer is at least one fluorinated monomer.

119. The product of item 118, wherein the at least one fluorinated monomer comprises at least one fluorinated methacrylate.

120. The product of item 115, wherein the at least one first component comprises at least one functional polymer.

121. The product of item 115, wherein the at least one first component is selected from the group consisting of metal salts, metal oxides, metal coordination compounds, organometallic compounds, organometalloid compounds, and combinations thereof.

122. The product of item 115, wherein the at least one first component is selected from the group consisting of metal salts, metal oxides, metalloid salts, and combinations thereof.

123. The product of item 115, wherein the at least one first component is selected from the group consisting of metal carboxylates, metalloid carboxylates, and combinations thereof.

124. The product of item 123, wherein the metal carboxylates comprise from 1 to 20 carbon atoms.

125. The product of item 124, wherein the metal carboxylates comprise from 6 to 15 carbon atoms.

126. The product of item 124, wherein the metal carboxylates comprise from 8 to 12 carbon atoms.

127. The product of any one of items 123 to 126, wherein the carboxylate group of the metal carboxylates is an alkanoate.

128. The product of item 115, wherein the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof.

129. The product of any one of items 115 to 128, wherein the metal is selected from a transition metal.

130. The product of item 129, wherein the metal is selected from the group consisting of aluminum, silver, gold, platinum, titanium, and copper.

131. The product of any one of items 95 to 130, wherein the at least one first component is selected from nanowires, microparticles, nanoparticles, or combinations thereof.

132. The product of any one of items 95 to 114, wherein the at least one first component comprises graphene.

133. The product of any one of items 95 to 115, wherein the amount of the at least one first component is from about 0.1% to about 90% by weight based on the weight of the composition.

134. The product of item 116, wherein the amount of the at least one first component is from about 0.1% to about 20% by weight based on the weight of the composition.

135. The product of any one of items 95 to 134, wherein the second phase is a coating.

136. The product of any one of items 95 to 135, wherein the first phase is a core.

137. The product of any one of items 95 to 136, wherein the product is a functional material.

138. The product of item 137, wherein the functional material is a functionally graded material (FGM).

139. The product of item 138, wherein the FGM is a functionally graded composite material (FGCM).

140. The product of any one of items 95 to 139, wherein the product has at least one functional property selected from chemical properties, mechanical properties, magnetic properties, optical properties, protective properties (e.g. towards heat, radiation, mechanical abrasion), properties, electrical properties, electrochemical, catalytic properties, and/or combinations thereof.

141. The product of any one of items 95 to 140, wherein the product is multifunctional and/or is a precursor to being multifunctional.

142. The product of any one of items 95 to 141, wherein the product is at least one of stretchable, flexible, lightweight, porous, conductive, non-conductive, surface durable, increased surface area, hydrophobic, biocompatible, anti-bacterial, mould resistant, wear-resistant, heat resistant, cold resistant, improved surface properties (anti-fouling), reduce flame retardancy, and combinations thereof.

143. The product of any one of items 95 to 142, wherein the product is an antenna.

144. A device comprising the product of any one of items 94 to 143.

145. The device of item 144, wherein the device is an electronic device.

146. The device of item 145, wherein the electronic device is selected from a conductor, a sensor, a strain sensor, a semiconductor, a thin film transistor, an electrode, photocell, circuit, and/or combinations thereof.

147. An article comprising the product of any one of items 94 to 146.

148. The article of item 147, wherein the article is wearable.

149. The article of item 147 or 148, wherein the article is a textile.

150. Use of the product of any one of items 94 to 149 for any one of catalysis, sensing, electrochemical detection, EMI shielding, actuators and energy devices.

151. A formulation for making a product, the formulation comprising a composition having at least one first component and at least one polymerizable component, the at least one polymerizable component is polymerizable to form at least one polymer, wherein at least two phases are formed from the at least one first component and the at least one polymer, wherein the at least one first component comprises at least one functional component, at least one functional precursor component, or combinations thereof, wherein the product is a functional product, a functional precursor product, or a combination of a functional and functional precursor product.

152. The formulation of item 151, wherein the at least one polymerizable component is polymerizable via photopolymerization.

153. The formulation of item 151 or 152, wherein the composition further comprises at least one photoinitiator.

154. The formulation of any one of items 151 to 153, wherein the at least one polymerizable component is polymerizable via 3D printing.

155. The formulation of item 154, wherein the 3D printing is vat polymerization.

156. The formulation of item 155, wherein the 3D printing is stereolithographic (SLA) printing, digital light processing (DLP) or volumetric 3D printing.

157. The formulation of any one of items 151 to 156, wherein the composition is substantially homogeneous.

158. The formulation of any one of items 151 to 157, wherein the composition is a substantially homogeneous mixture.

159. The formulation of any one of items 151 to 158, wherein the formulation is capable of being sintered and/or pyrolyzed.

160. The formulation of item 159, wherein the formulation is capable of being sintered.

161. The formulation of item 159 or 160, wherein the formulation is capable of being thermal sintered, UV-VIS radiation sintered, and laser sintered.

162. The formulation of any one of items 151 to 161, wherein the at least one first component comprises the at least one functional precursor component, wherein the at least one functional precursor component is capable of being converted into at least one second functional component.

163. The formulation of item 162, wherein the at least one second functional component is different from the at least one functional component.

164. The formulation of any one of items 151 to 163, wherein, upon polymerization, the at least one first component phase is capable of separating and migrating towards an area where the concentration of the at least one polymerizable component is greater.

165. The formulation of any one of items 151 to 164, wherein the at least two phases is two phases.

166. The formulation of item 165, wherein the two phases comprises a first phase and a second phase, wherein the first phase comprises the at least one polymer and the second phase comprises the at least one first component.

167. The formulation of any one of items 151 to 166, wherein the at least two phases is three phases.

168. The formulation of any one of items 151 to 164 wherein the at least two phases further comprises an interface between the first phase and the second phase, wherein the interface has a concentration gradient of the at least one first component, whereby the concentration of the at least one first component decreases with distance away from the second phase towards the first phase.

169. The formulation of any one of items 151 to 168, wherein each of the phases comprise concentration gradients, composites, and/or coatings.

170. The formulation of any one of items 151 to 169, wherein at least one of the phases is a coating.

171. The formulation of any one of items 151 to 170, wherein each of the phases comprise concentration gradients, composites, and/or coatings.

172. The formulation of any one of items 151 to 170, wherein the at least two phases is a concentration gradient.

173. The formulation of any one of items 151 to 170, wherein the at least two phases is a composite.

174. The formulation of any one of items 151 to 173, wherein each of the phases is a discrete phase.

175. The formulation of any one of items 151 to 174, wherein the at least one polymerizable component comprises at least one monomer and/or at least one oligomer.

176. The formulation of item 175, wherein the at least one monomer and/or at least one oligomer is selected from acrylates.

177. The formulation of item 175 or 176, wherein the at least one monomer and/or at least one oligomer is ethyleneglycol methyl ether acrylate, N,N-diisobutyl-acrylamide, N-vinyl-pyrrolidone, (meth)acryloyl morpholine, 7-amino-3,7-dimethyloctyl, (meth)acrylate, isobutoxymethyl (meth)acrylamide, isobornyloxyethyl (meth)acrylate, isobornyl (meth)acrylate, 2-ethylhexyl acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth) acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl(meth)acrylate, 2-tribromophenoxyethyl (meth)acrylate, 2-hydroxyethyl (meth)acrylate, 2-hydroxypropyl (meth)acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth)acrylate, alkoxylated alkyl phenol acrylate, (poly)caprolactone acrylate ester from methylol-tetrahydrofuran, (poly)caprolactone acrylate ester from alkylol-dioxane, ethylene glycol phenyl ether acrylate, and/or methacryloxypropyl terminated polydimethylsiloxane.

178. The formulation of item 175, wherein the at least one monomer and/or at least one oligomer is 3,4-epoxycyclohexylmethyl 3,4-epoxycylcohexanecarboxylate, and/or epoxycyclohexylethyl terminated polydimethylsiloxane.

179. The formulation of item 175, wherein the at least one monomer and/or at least one oligomer is 2-ethylhexyl acrylate and/or ethyleneglycol methyl ether acrylate.

180. The formulation of any one of items 175 to 179, wherein the at least one monomer is selected from monofunctional monomers.

181. The formulation of any one of items 175 to 179, wherein the at least one polymerizable component further comprises at least one cross-linking agent.

182. The formulation of any one of items 1 to 174, wherein the at least one polymerizable component comprises at least one cross-linking agent.

183. The formulation of item 181 or 182, wherein the at least one polymerizable component comprises from about 10% to about 99% by weight of the at least one cross-linking agent based on the weight of the composition without the at least one first component, optionally, from about 15% to about 99% by weight of the at least one cross-linking agent based on the weight of the composition without the at least one first component.

184. The formulation of item 181, wherein the at least one polymerizable component comprises from about 1% to about 90% by weight of the at least one monomer and/or at least one oligomer and about 10% to about 99% by weight of the at least one cross-linking agent based on the weight of the composition without the at least one first component, optionally, from about 1% to about 85% by weight of the at least one monomer and/or at least one oligomer and about 15% to about 99% by weight of the at least one cross-linking agent based on the weight of the composition without the at least one first component.

185. The formulation of any one of items 181 to 184, wherein the at least one cross-linking agent is a methacrylic compound, an acrylic compound, a vinyl compound, and/or an allyl compound.

186. The formulation of item 185, wherein the at least one cross-linking agent is 2,2-bis(4-methacryloxyphenyl)propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, diacrylic urethane oligomers (reaction products of isocyanate terminate polyol and 2-hydroethylacrylate), tris(2-hydroxyethyl)isocyanurate trimethacrylate, tris(2-hydroxyethyl)isocyanurate triacrylate, trimethylolpropane trimethacrylate, trimethylolpropane triacrylate, pentaerythritol triacrylate, pentaerythritol tetraacrylate, di(trimethylolpropane) tetraacrylate, ethoxylated pentaerythritol tetraacrylate, dipentaerythritol pentaacrylate, pentaacrylate ester, ethylene glycol di(meth)acrylate, dicyclopentenyl di(meth)acrylate, triethylene glycol diacrylate, tetraethylene glycoldi(meth)acrylate, tricyclodecanediyl-dimethylene di(meth)acrylate, tris(2-hydroxyethyl) isocyanurate di(meth)acrylate, tris(2-hydroxyethyl) isocyanurate tri(meth)acrylate, caprolactone modified tris(2-hydroxyethyl)isocyanurate tri(meth)acrylate, trimethylolpropane tri(meth)acrylate, EO modified trimethylolpropane tri(meth)acrylate, PO modified trimethylolpropane tri(meth)acrylate, tripropylene glycol di(meth)acrylate, neopentyl glycol di(meth)acrylate, both terminal (meth)acrylic acid adduct of bisphenol A diglycidyl ether, 1,4-butanediol di(meth)acrylate, 1,6-hexanediol di(meth)acrylate, pentaerythritol tri(meth)acrylate, pentaerythritol tetra(meth)acrylate, polyester di(meth)acrylate, polyethylene glycol di(meth)acrylate, dipentaerythritol hexa(meth)acrylate, dipentaerythritolpenta(meth)acrylate, dipentaerythritol tetra(meth)acrylate, caprolactone modified dipentaerythritol hexa(meth)acrylate, caprolactone modified dipentaerythritol penta(meth)acrylate, ditrimethylolpropane tetra(meth)acrylate, hexanediol diacrylate, 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy)phenyl]propane, 2,2-bis[4-(2-hydroxy-3-methacryloxypropoxy)phenyl]propane, bis(2-methacryloxyethyl)N,N-1,9-nonylene biscarbamate, 1,4-cyclohexanedimethanol dimethacrylate, tris(2-hydroxyethyl)isocyanurate trimethacrylate, tris(2-hydroxyethyl)isocyanurate triacrylate, trimethylolpropane trimethacrylate, trimethylolpropane triacrylate pentaerythritol triacrylate, N,N'-methylenebisacrylamide, N,N'-methylenebisacrylamide, N,N'-(1,2-dihydroxyethylene)bisacrylamide, N-(1-hydroxy-2,2-dimethoxyethyl)acrylamide, divinylbenzene, tris(trimethylsilyl)silane, 1,4-butanediol divinyl ether, benzyl acrylate, benzyl methacrylate, vinyl benzoate, N-acryloylmorpholine, 1,10-decanediol diacrylate, and/or triethylene glycol dithiol.

187. The formulation of any one of items 181 to 184, wherein the at least one cross-linking agent is ethylene glycol diacrylate, polyethylene glycol diacrylate, tetraethyleneglycol diacrylate, butanediol diacrylate, hexanediol diacrylate, and/or di(trimethylolpropane) tetraacrylate.

188. The formulation of any one of items 181 to 187, wherein the at least one cross-linking agent has two or more functional groups, optionally, di-, tri-, or tetra-functional groups.

189. The formulation of any one of items 181 to 188, wherein the concentration of the at least one cross-linking agent and the rate at which the at least one monomer polymerizes is selected such that a product comprising a composite is formed.

190. The formulation of item 189, wherein the concentration of the at least one cross-linking agent is from about 80% to about 99% mol based on the mol of the composition.

191. The formulation of any one of items 181 to 188, wherein the concentration of the at least one cross-linking agent and the rate at which the at least one monomer polymerizes is selected such that the at least one monomer and the at least one first component diffuse towards the surface of the product to form a product comprising a coating.

192. The formulation of item 191, wherein the concentration of the at least one crosslinking agent is less than about 35% mol based on the mol of the composition, wherein the concentration of the at least one crosslinking agent is about 10% to about 35% mol based on the mol of the composition, or wherein the concentration of the at least one crosslinking agent is about 15% to about 35% mol based on the mol of the composition.

193. The formulation of any one of items 181 to 188, wherein the concentration of the at least one cross-linking agent and the rate at which the at least one monomer polymerizes is selected such that a product comprising a concentration gradient is formed.

195. The formulation of item 193, wherein the concentration of the at least one cross-linking agent is from about 35% to about 80% mol based on the mol of the composition.

196. The formulation of any one of items 181 to 195, wherein the concentration of the at least one first component at the surface of the product decreases with increased concentration of the at least one cross-linking agent.

197. The formulation of any one of items 181 to 196, wherein the ratio of the at least one monomer to the at least one cross-linking agent is about 9:1 to about 0:10 based on % by weight, about 9:1 to about 1:9 based on % by weight, about 8:2 to about 2:8 based on % by weight, about 7:3 to about 3:7 based on % by weight, about 6:4 to about 4:6 based on % by weight, about 5:5 to about 5:5 based on % by weight, about 4:6 to about 6:4 based on % by weight, about 3:7 to about 7:3 based on % by weight, about 2:8 to about 8:2 based on % by weight, or about 1:10 to about 9:1 based on % by weight.

198. The formulation of any one of items 181 to 197, wherein the ratio of the at least one monomer to the at least one cross-linking agent to the at least one photoinitiator, is from about 8.9:1:0.1 to about 0:9.9:0.1 based on % by weight of the at least one monomer to the at least one cross-linking agent to the at least one photoinitiator.

199. The formulation of any one of items 151 to 198, wherein the at least one polymerizable component comprises at least one resin, optionally, at least one acrylate based-resin.

200. The formulation of item 199, wherein the at least one resin comprises at least one commercial resin.

201. The formulation of any one of items 151 to 200, wherein the formulation is capable of being used in a 2D or 3D printing method.

202. The formulation of item 201, wherein the 3D printing is vat polymerization.

203. The formulation of item 202, wherein the 3D printing is stereolithographic (SLA) printing, digital light processing (DLP) or volumetric 3D printing.

204. The formulation of any one of items 151 to 203, wherein the at least one polymerizable component comprises at least one ceramic precursor.

205. The formulation of any one of items 151 to 204, wherein the at least one polymer has a modulus range of about 0.1 MPa to about 8000 MPa.

206. The formulation of any one of items 151 to 205, wherein the amount of the at least one polymerizable component is from about 10% to about 99% by weight based on the weight of the composition.

207. The formulation of item 206, wherein the amount of the at least one polymerizable component is from about 80% to about 99% by weight based on the weight of the composition.

208. The formulation of any one of items 151 to 207, wherein the at least one first component is substantially soluble in the at least one polymerizable component and is substantially insoluble when the at least one polymerizable component polymerizes.

209. The formulation of any one of items 151 to 208, wherein the at least one first component comprises the at least one functional component and the product is the functional product.

210. The formulation of any one of items 151 to 209, wherein the at least one first component comprises the at least one functional precursor component and the product is the functional precursor product.

211. The formulation of any one of items 151 to 209, wherein the at least one first component comprises the at least one functional component and the at least one functional precursor component and the product is the combination of the functional and functional precursor product.

212. The formulation of any one of items 151 to 211, wherein the at least one first component is selected from the group consisting of functional monomers, functional polymers, metal precursors, carbon nanotubes (CNT), graphene, metal alloy precursors, metalloid precursors, and combinations thereof.

213. The formulation of item 212, wherein the at least one first component comprises at least one functional monomer.

214. The formulation of item 213, wherein the at least one functional monomer has a hydrophobic property.

215. The formulation of item 213 or 214, wherein the at least one functional monomer is at least one fluorinated monomer.

216. The formulation of item 215, wherein the at least one fluorinated monomer comprises at least one fluorinated methacrylate.

217. The formulation of item 212, wherein the at least one first component comprises at least one functional polymer.

218. The formulation of item 212, wherein the at least one first component is selected from the group consisting of metal salts, metal oxides, metal coordination compounds, organometallic compounds, organometalloid compounds, and combinations thereof.

219. The formulation of item 212, wherein the at least one first component is selected from the group consisting of metal salts, metal oxides, metalloid salts, and combinations thereof.

220. The formulation of item 212, wherein the at least one first component is selected from the group consisting of metal carboxylates, metalloid carboxylates, and combinations thereof.

221. The formulation of item 220, wherein the metal carboxylates comprise from 1 to 20 carbon atoms.

222. The formulation of item 221, wherein the metal carboxylates comprise from 6 to 15 carbon atoms.

223. The formulation of item 221, wherein the metal carboxylates comprise from 8 to 12 carbon atoms.

224. The formulation of any one of items 220 to 223, wherein the carboxylate group of the metal carboxylates is an alkanoate.

225. The formulation of item 212, wherein the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof.

226. The formulation of any one of items 212 and 218 to 225, wherein the metal is selected from a transition metal.

227. The formulation of item 226, wherein the metal is selected from the group consisting of aluminum, silver, gold, platinum, titanium, and copper.

228. The formulation of any one of items 151 to 227, wherein the at least one first component is selected from nanowires, microparticles, nanoparticles, or combinations thereof.

229. The formulation of any one of items 151 to 212, wherein the at least one first component comprises graphene.

230. The formulation of any one of items 151 to 229, wherein the amount of the at least one first component is from about 0.1% to about 90% by weight based on the weight of the composition.

231. The formulation of item 230, wherein the amount of the at least one first component is from about 0.1% to about 20% by weight based on the weight of the composition.

232. The formulation of any one of items 151 to 231, wherein the at least two phases comprise a first and second phase, wherein the first phase further comprises at least one first component, wherein the at least one first component is the same or different from the at least one first component of the second phase.

233. The formulation of any one of items 151 to 232, wherein the product is a functional material.

234. The formulation of item 233, wherein the functional material is a functionally graded material (FGM).

235. The formulation of item 234, wherein the FGM is a functionally graded composite material (FGCM).

236. The formulation of any one of items 151 to 235, wherein the product is a 3D printable product.

237. The formulation of any one of items 151 to 236, wherein the product is a 3D printable composite product, optionally, non-conducting.

238. The formulation of any one of items 151 to 237, wherein the product has at least one functional property selected from chemical properties, mechanical properties, magnetic properties, optical properties, protective properties (e.g. heat, radiation, mechanical abrasion), electrical properties, electrochemical, catalytic properties, and/or combinations thereof.

239. The formulation of any one of items 151 to 238, wherein the product is multifunctional and/or is a precursor to being multifunctional.

240. The formulation of any one of items 151 to 239, wherein the product is at least one of stretchable, flexible, lightweight, porous, conductive, non-conductive, surface durable, increased surface area, hydrophobic, biocompatible, anti-bacterial, mould resistant, wear-resistant, heat resistant, cold resistant, improved surface properties (anti-fouling), reduce flame retardancy, and combinations thereof.

241. The formulation of any one of items 151 to 240, further comprising at least one additive, optionally, selected from the group consisting of fillers, inhibitors, adhesion promoters, absorbers, dyes, pigments, anti-oxidants, carrier vehicles, heat stabilizers, flame retardants, thixotropic agents, flow control additives, dispersants, and/or combinations thereof, optionally, nanoparticles.

242. The formulation of any one of items 151 to 241, wherein the product is an antenna.

243. Use of the formulation according to any one of items 151 to 242 for making the product.

We claim:

1. A method for making a 3D printed product, wherein the 3D printed product is a functional product, a functional precursor product, or a combination of a functional and functional precursor product, the method comprising:
    a) combining at least one first component and at least one polymerizable component to form a composition, wherein:
    i) the at least one first component comprises at least one functional component, at least one functional precursor component, or combinations thereof, wherein the amount of the at least one first component is from about 0.1% to about 20% by weight based on the weight of the composition; and
    ii) the at least one polymerizable component comprises at least one monomer and/or at least one oligomer, and at least one cross-linking agent,
    wherein the concentration of the at least one crosslinking agent is about 10% to about 35% mol based on the mol of the composition or the concentration of the at least one cross-linking agent is from about 80% to about 99% mol based on the mol of the composition; and
    b) polymerizing the at least one polymerizable component via 3D printing to form at least one polymer,
    wherein the at least one first component is substantially soluble in the at least one polymerizable component and is substantially insoluble when the at least one polymerizable component polymerizes, and
    during b), at least two phases separate and form from the at least one first component and the at least one polymer, wherein the at least two phases comprise a first phase comprising the at least one polymer, a second phase comprising the at least one first component, and an interface between the first phase and the second phase,
    wherein the interface has a concentration gradient of the first component, whereby the concentration of the first component decreases with distance away from the second phase towards the first phase.

2. The method of claim 1, wherein at least one of the following:
    (i) the polymerizing in b) comprises photopolymerization;
    (ii) the composition further comprises at least one photoinitiator; and
    (iii) the 3D printing uses photoactivation, the 3D printing is vat polymerization, or the 3D printing is stereolithographic (SLA) printing, digital light processing (DLP) or volumetric 3D printing.

3. The method of claim 1, wherein the composition is homogeneous, optionally, the composition is a homogeneous mixture; and/or further comprising c) sintering and/or pyrolyzing.

4. The method of claim 1, wherein the at least one first component comprises the at least one functional precursor component, the method further comprising c) converting the at least one functional precursor component into at least one second functional component, optionally, wherein at least one of the following:
    i) the at least one second functional component is different from the at least one functional component; and
    ii) the converting comprises sintering and/or pyrolyzing.

5. The method of claim 1, wherein:
    i) each of the first and second phases comprises another concentration gradient, a composite, or a coating layer;
    ii) at least one of the first and second phases is a coating layer;
    iii) at least one of the first and second phases comprises another concentration gradient;
    iv) at least one of the first and second phases is a composite; or
    v) each of the first and second phases is a discrete phase.

6. The method of claim 1, wherein at least one of the following:
    i) wherein at least one of the following:
    a. the at least one monomer and/or at least one oligomer is selected from acrylates;
    b. the at least one monomer and/or at least one oligomer is ethyleneglycol methyl ether acrylate, N,N-diisobutyl-acrylamide, N-vinyl-pyrrolidone, (meth)acryloyl morpholine, 7-amino-3,7-dimethyloctyl, (meth)acrylate, isobutoxymethyl (meth)acrylamide, isobornyloxyethyl (meth)acrylate, isobornyl (meth)acrylate, 2-ethylhexyl acrylate, 2-ethylhexyl (meth)acrylate, ethyldiethylene glycol (meth)acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl (meth)acrylamide tetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinyl caprolactam, phenoxyethyl (meth)acrylate, butoxyethyl (meth)acrylate, pentachlorophenyl (meth)acrylate, pentabromophenyl (meth)acrylate, polyethylene glycol mono-(meth)acrylate, methyl triethylene diglycol (meth)acrylate, alkoxylated alkyl phenol acrylate, (poly) caprolactone acrylate ester from methylol-tetrahydrofuran, (poly) caprolactone acrylate ester from alkylol-dioxane, ethylene glycol phenyl ether acrylate, and/or methacryloxypropyl terminated polydimethylsiloxane; or c. the at least one monomer and/or at least one oligomer is 2-ethylhexyl acrylate and/or ethyleneglycol methyl ether acrylate;

ii) the at least one polymerizable component comprises from about 10% to about 99% by weight of the at least one cross-linking agent based on the weight of the composition without the at least one first component; and iii) the at least one polymerizable component comprises from about 1% to about 90% by weight of the at least one monomer and/or at least one oligomer based on the weight of the composition without the at least one first component.

7. The method of claim 6, wherein at least one of the following:

i) the at least one cross-linking agent is 2,2-bis(4-methacryloxyphenyl) propane, 1,2-butanediol diacrylate, 1,4-butanediol diacrylate, ethylene glycol diacrylate, di(ethylene glycol) diacrylate, tetra(ethylene glycol) diacrylate, ethylene glycol dimethacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy) phenyl]propane, 2,2-bis[4-(2-hydroxy-3-methacryloxypropoxy) phenyl]propane, bis(2-methacryloxyethyl)N,N-1,9-nonylene biscarbamate, 1,4-cyclohexanedimethanol dimethacrylate, diacrylic urethane oligomers (reaction products of isocyanate terminate polyol and 2-hydroethylacrylate), tris(2-hydroxyethyl) isocyanurate trimethacrylate, tris(2-hydroxyethyl) isocyanurate triacrylate, trimethylolpropane trimethacrylate, trimethylolpropane triacrylate, pentaerythritol triacrylate, pentaerythritol tetraacrylate, di(trimethylolpropane) tetraacrylate, ethoxylated pentaerythritol tetraacrylate, dipentaerythritol pentaacrylate, pentaacrylate ester, ethylene glycol di(meth)acrylate, dicyclopentenyl di(meth)acrylate, triethylene glycol diacrylate, tetraethylene glycoldi(meth)acrylate, tricyclodecanediyl-dimethylene di(meth)acrylate, tris (2-hydroxyethyl) isocyanurate di(meth)acrylate, tris(2-hydroxyethyl) isocyanurate tri (meth)acrylate, caprolactone modified tris(2-hydroxyethyl) isocyanurate tri (meth)acrylate, trimethylolpropane tri (meth)acrylate, EO modified trimethylolpropane tri (meth)acrylate, PO modified trimethylolpropane tri (meth)acrylate, tripropylene glycol di(meth)acrylate, neopentyl glycol di(meth)acrylate, both terminal (meth)acrylic acid adduct of bisphenol A diglycidyl ether, 1,4-butanediol di(meth)acrylate, 1,6-hexanediol di(meth)acrylate, pentaerythritol tri (meth)acrylate, pentaerythritol tetra (meth)acrylate, polyester di(meth)acrylate, polyethylene glycol di(meth)acrylate, dipentaerythritol hexa(meth)acrylate, dipentaerythritolpenta (meth)acrylate, dipentaerythritol tetra(meth)acrylate, caprolactone modified dipentaerythritol hexa(meth)acrylate, caprolactone modified dipentaerythritol penta (meth)acrylate, ditrimethylolpropane tetra(meth)acrylate, hexanediol diacrylate, 2,2-bis(4-methacryloxyphenyl) propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol diacrylate, tetraethylene glycol dimethacrylate, 1,6-hexanediol diacrylate, neopentyl glycol diacrylate, polyethylene glycol diacrylate, polyethylene glycol dimethacrylate, tripropylene glycol diacrylate, 2,2-bis[4-(2-acryloxyethoxy) phenyl]propane, 2,2-bis[4-(2-hydroxy-3-methacryloxypropoxy) phenyl]propane, bis(2-methacryloxyethyl)N,N-1,9-nonylene biscarbamate, 1,4-cyclohexanedimethanol dimethacrylate, tris(2-hydroxyethyl) isocyanurate trimethacrylate, tris(2-hydroxyethyl) isocyanurate triacrylate, trimethylolpropane trimethacrylate, trimethylolpropane triacrylate pentaerythritol triacrylate, N,N'-methylenebisacrylamide, N,N'-methylenebisacrylamide, N,N'-(1,2-dihydroxyethylene) bisacrylamide, N-(1-hydroxy-2,2-dimethoxyethyl) acrylamide, divinylbenzene, tris (trimethylsilyl) silane, 1,4-butanediol divinyl ether, benzyl acrylate, benzyl methacrylate, vinyl benzoate, N-acryloylmorpholine, 1,10-decanediol diacrylate, and/or triethylene glycol dithiol;

ii) the at least one cross-linking agent is ethylene glycol diacrylate, polyethylene glycol diacrylate, tetraethyleneglycol diacrylate, butanediol diacrylate, hexanediol diacrylate, and/or di(trimethylolpropane) tetraacrylate;

iii) the at least one cross-linking agent has two or more functional groups, optionally, di-, tri-, or tetra-functional groups;

iv) the concentration of the at least one cross-linking agent and the rate at which the at least one monomer polymerizes is selected such that the 3D printed product comprising a composite is formed;

v) the concentration of the at least one cross-linking agent and the rate at which the at least one monomer polymerizes is selected such that the at least one monomer and the at least one first component diffuse towards a surface of the 3D printed product to form the 3D printed product comprising a coating; and vi) wherein the concentration of the at least one cross-linking agent is about 15% to about 35% mol based on the mol of the composition.

8. The method of claim 1, wherein the at least one polymerizable component comprises at least one resin, optionally, at least one acrylate based-resin.

9. The method of claim 1, wherein:

i) the at least one first component comprises the at least one functional component and the 3D printed product is the functional product;

ii) the at least one first component comprises the at least one functional precursor component and the 3D printed product is the functional precursor product; or iii) the at least one first component comprises the at least one functional component and the at least one functional precursor component and the 3D printed product is the combination of the functional and functional precursor product.

10. The method of claim 1, wherein:
i) the at least one first component is selected from the group consisting of functional monomers, functional polymers, metal precursors, carbon nanotubes (CNT), graphene, metal alloy precursors, metalloid precursors, and combinations thereof; optionally, the metal is selected from a transition metal, optionally, the metal is selected from the group consisting of aluminum, silver, gold, platinum, titanium, and copper;
ii) the at least one first component comprises at least one functional monomer; optionally, the at least one functional monomer has a hydrophobic property; and/or wherein the at least one functional monomer is at least one fluorinated monomer, optionally, the at least one fluorinated monomer comprises at least one fluorinated methacrylate;
iii) the at least one first component comprises at least one functional polymer;
iv) the at least one first component is selected from the group consisting of metal carboxylates, metalloid carboxylates, and combinations thereof, optionally, the metal carboxylates comprise from 8 to 12 carbon atoms and/or the carboxylate group of the metal carboxylates is an alkanoate; optionally, the metal is selected from a transition metal, optionally, the metal is selected from the group consisting of aluminum, silver, gold, platinum, titanium, and copper;
v) wherein the at least one first component is selected from the group consisting of metal formate, metal acetate, metal propionate, metal butyrate, metal pentanoate, metal hexanoate, metal heptanoate, metal ethylhexanoate, metal behenate, metal benzoate, metal oleate, metal octanoate, metal nonanoate, metal decanoate, metal neodecanoate, metal hexafluoroacetylacetonate, metal phenylacetate, metal isobutyrylacetate, metal benzoylacetate, metal pivalate metal oxalate and combinations thereof; optionally, the metal is selected from a transition metal, optionally, the metal is selected from the group consisting of aluminum, silver, gold, platinum, titanium, and copper;
vi) the at least one first component is selected from nanowires, microparticles, nanoparticles, or combinations thereof;
vii) the at least one first component comprises graphene.

11. The method of claim 1, wherein at least one of the following:
i) the 3D printed product has at least one functional property selected from chemical properties, mechanical properties, magnetic properties, optical properties, protective properties, electrical properties, electrochemical, catalytic properties, and/or combinations thereof;
ii) the 3D printed product is at least one of stretchable, flexible, lightweight, porous, conductive, non-conductive, surface durable, increased surface area, hydrophobic, biocompatible, anti-bacterial, mould resistant, wear-resistant, heat resistant, cold resistant, improved surface properties, reduce flame retardancy, and combinations thereof; and
iii) the 3D printed product is an antenna.

12. The method of claim 1, wherein each of the first and second phases is a coating layer.

13. The method of claim 1 wherein the ratio of the at least one monomer to the at least one cross-linking agent is about 9:1 to about 1:9 based on % by weight, about 8:2 to about 2:8 based on % by weight, about 7:3 to about 3:7 based on % by weight, about 6:4 to about 4:6 based on % by weight, about 5:5 to about 5:5 based on % by weight, about 4:6 to about 6:4 based on % by weight, about 3:7 to about 7:3 based on % by weight, about 2:8 to about 8:2 based on % by weight, or about 1:10 to about 9:1 based on % by weight.

14. The method of claim 6, wherein the composition further comprises at least one photoinitiator and the ratio of the at least one monomer to the at least one cross-linking agent to the at least one photoinitiator, is from about 8.9:1:0.1 to about 0:9.9:0.1 based on % by weight of the at least one monomer to the at least one cross-linking agent to the at least one photoinitiator.

15. The method of claim 1, wherein the at least one first component is selected from metal precursors.

16. The method of claim 15, wherein at least one of the metal precursors is reduced to a corresponding metal by reduction of the metal precursor in the presence of a reducing agent.

17. The method of claim 16, wherein the reducing agent is selected from oxazolines.

\* \* \* \* \*